(12) United States Patent
Aio et al.

(10) Patent No.: US 11,296,914 B2
(45) Date of Patent: Apr. 5, 2022

(54) COMMUNICATION DEVICE AND COMMUNICATION METHOD

(71) Applicant: Sony Corporation, Tokyo (JP)

(72) Inventors: Kosuke Aio, Kanagawa (JP); Yuelin Ma, Kanagawa (JP); Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/627,358

(22) PCT Filed: May 1, 2018

(86) PCT No.: PCT/JP2018/017382
§ 371 (c)(1),
(2) Date: Dec. 30, 2019

(87) PCT Pub. No.: WO2019/008888
PCT Pub. Date: Jan. 10, 2019

(65) Prior Publication Data
US 2020/0127877 A1    Apr. 23, 2020

(30) Foreign Application Priority Data

Jul. 6, 2017    (JP) .............................. JP2017-132719

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0051* (2013.01); *H04L 5/14* (2013.01); *H04W 72/0453* (2013.01)

(58) Field of Classification Search
None
See application file for complete search history.

(56) References Cited

U.S. PATENT DOCUMENTS 9,160,595 B2    10/2015    Kenney et al.
2004/0233838 A1*  11/2004    Sudo ..................... H04L 5/0023
                                                              370/208
(Continued)

FOREIGN PATENT DOCUMENTS

JP    2003-249908 A    9/2003
JP    2010-533456 A    10/2010
(Continued)

OTHER PUBLICATIONS

Extended European Search Report dated Jun. 17, 2020 in European Application No. 18827475.7.

(Continued)

*Primary Examiner* — Gregory B Sefcheck
*Assistant Examiner* — Suk Jin Kang
(74) *Attorney, Agent, or Firm* — Xsensus, LLP

(57) ABSTRACT

A communication device and a communication method that transmit and receive wireless packets are provided.
A communication device includes a control unit that determines a subcarrier to be a null tone according to information applied to a packet and a transmission unit that generates a multi-carrier signal in which the determined subcarrier is set as a null tone and wirelessly transmits the signal. The control unit determines a position of a subcarrier and the number of subcarriers to be a null tone or a position of a subcarrier in correspondence with the information and, in addition, changes a subcarrier to be a null tone according to temporal variation of the information.

18 Claims, 36 Drawing Sheets

(51) Int. Cl.
*H04L 5/14* (2006.01)
*H04W 72/04* (2009.01)

(56) References Cited

U.S. PATENT DOCUMENTS

| | | | |
|---|---|---|---|
| 2006/0031583 A1* | 2/2006 | Fujii | H04L 27/2656 709/246 |
| 2008/0013500 A1 | 1/2008 | Laroia | |
| 2009/0016285 A1 | 1/2009 | Li et al. | |
| 2009/0019169 A1 | 1/2009 | Li | |
| 2009/0028255 A1* | 1/2009 | Shaw | H04L 5/0048 375/260 |
| 2009/0092193 A1* | 4/2009 | Fujita | H04L 27/366 375/260 |
| 2010/0061223 A1* | 3/2010 | Kim | H04L 5/0044 370/208 |
| 2010/0329374 A1* | 12/2010 | Pi | H04L 5/0048 375/260 |
| 2011/0003551 A1* | 1/2011 | Kameno | H04W 52/325 455/62 |
| 2012/0076101 A1* | 3/2012 | Kojima | H04W 72/0453 370/329 |
| 2014/0071916 A1* | 3/2014 | Yoon | H04W 8/005 370/329 |
| 2015/0280953 A1* | 10/2015 | Porat | H04L 27/2627 370/330 |
| 2015/0365922 A1* | 12/2015 | Suh | H04L 5/0053 370/329 |
| 2016/0119047 A1 | 4/2016 | Lee | |
| 2016/0218844 A1* | 7/2016 | Suh | H04L 5/0037 |
| 2016/0226638 A1* | 8/2016 | Azizi | H04L 27/362 |
| 2016/0233998 A1* | 8/2016 | Sun | H04B 17/345 |
| 2016/0286404 A1* | 9/2016 | Rico Alvarino | H04L 5/001 |
| 2016/0286551 A1 | 9/2016 | Lee | |
| 2016/0359598 A1* | 12/2016 | Montreuil | H04L 5/0041 |
| 2017/0019160 A1* | 1/2017 | Giannakis | H04L 25/0202 |
| 2017/0048086 A1* | 2/2017 | Subramanian | H04L 25/0236 |
| 2017/0231009 A1* | 8/2017 | Wang | H04W 72/0453 |
| 2017/0265240 A1* | 9/2017 | Chen | H04L 5/0044 |
| 2017/0288848 A1* | 10/2017 | Lei | H04L 27/2656 |
| 2018/0035416 A1* | 2/2018 | Yi | H04W 72/0406 |
| 2018/0054343 A1* | 2/2018 | Suzuki | H04L 5/0007 |
| 2018/0084566 A1* | 3/2018 | Wang | H04W 74/006 |
| 2018/0270030 A1* | 9/2018 | Montreuil | H04L 5/0041 |
| 2018/0287758 A1* | 10/2018 | Azizi | H04L 1/00 |
| 2019/0109684 A1* | 4/2019 | Chen | H04L 5/003 |
| 2019/0149293 A1* | 5/2019 | Suh | H04L 5/0037 370/329 |
| 2019/0159207 A1* | 5/2019 | Chen | H04L 5/0053 |
| 2019/0253296 A1* | 8/2019 | Chen | H04L 5/0076 |
| 2019/0260553 A1* | 8/2019 | Porat | H04L 5/0057 |
| 2019/0273588 A1* | 9/2019 | Montreuil | H04L 27/2602 |
| 2019/0305906 A1* | 10/2019 | Lee | H04W 72/1263 |
| 2020/0244503 A1* | 7/2020 | Bala | H04L 5/0007 |
| 2020/0280414 A1* | 9/2020 | Suh | H04L 27/2602 |
| 2020/0344022 A1* | 10/2020 | Lee | H04W 72/1263 |
| 2021/0105114 A1* | 4/2021 | Yum | H04L 5/0048 |

FOREIGN PATENT DOCUMENTS

| | | |
|---|---|---|
| JP | 2014531813 A | 11/2014 |
| RU | 2 574 335 C2 | 2/2016 |
| WO | 2004/047348 A1 | 6/2004 |
| WO | 2016/154516 A1 | 9/2016 |

OTHER PUBLICATIONS

International Search Report and Written Opinion dated Jul. 17, 2018 for PCT/JP2018/017382 filed on May 1, 2018, 8 pages including English Translation of the International Search Report.

* cited by examiner

| S8 | S7 | S6 | S5 | S4 | S3 | S2 | S1 |
|---|---|---|---|---|---|---|---|

(b)

| S5 | S1 |
|---|---|
| S6 | S2 |
| S7 | S3 |
| S8 | S4 |

(c)

| S5 | S1 |
|---|---|
| S6 | S2 |
| S7 | S3 |
| N | N |
| S8 | S4 |

(d)

| S5 | S1 |
|---|---|
| S6 | S2 |
| P | P |
| S7 | S3 |
| N | N |
| S8 | S4 |

*FIG. 15*

| POSITION | INFORMATION NAME | INFORMATION |
|---|---|---|
| $b_1$ | PRESENCE/ABSENCE OF NULL TONE INFORMATION | 0: NO INFORMATION TRANSMISSION BY NULL TONE<br>1: WITH INFORMATION TRANSMISSION BY NULL TONE |
| $b_2$ TO $b_7$ | BSS IDENTIFIER | IDENTIFIER INFORMATION FOR EACH BSS (CORRESPONDING TO SIX BITS) |
| $b_8$ TO $b_{13}$ | REMAINING TRANSMISSION TIME | NUMBER OF REMAINING OFDM SYMBOLS OF PACKET (UNITS OF EIGHT, CORRESPONDING TO SIX BITS) |
| $b_{14}$ TO $b_{17}$ | TRANSMISSION POWER | TRANSMISSION POWER VALUE INFORMATION (CORRESPONDING TO FOUR BITS) |
| $b_{18}$ | UL/DL FLAG | 0: DL COMMUNICATION / 1: UL COMMUNICATION |
| ⋮ | ⋮ | ⋮ |
| $b_n$ | PARITY BIT | ERROR CORRECTION CODE (CORRESPONDING TO ONE BIT) |

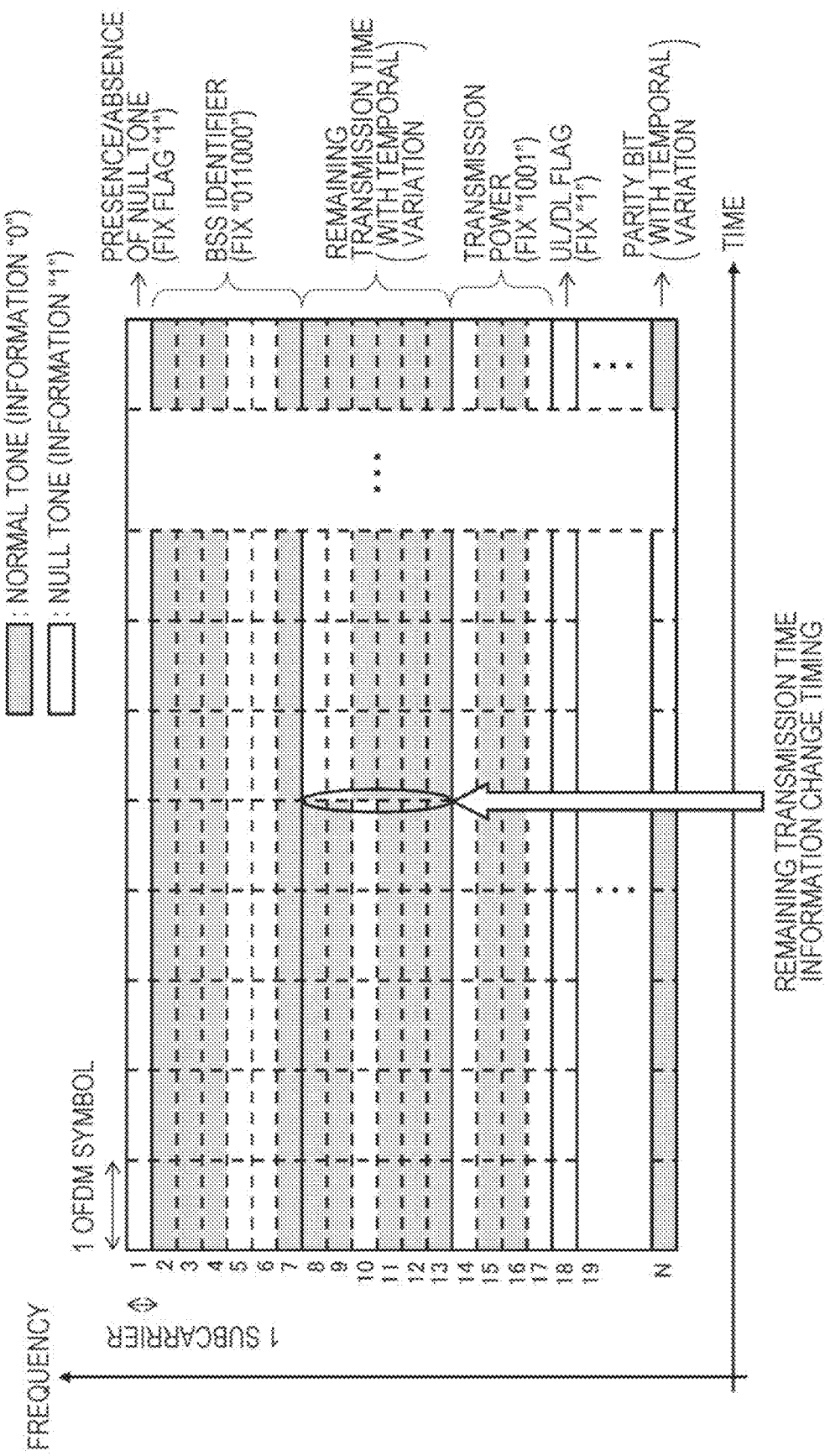

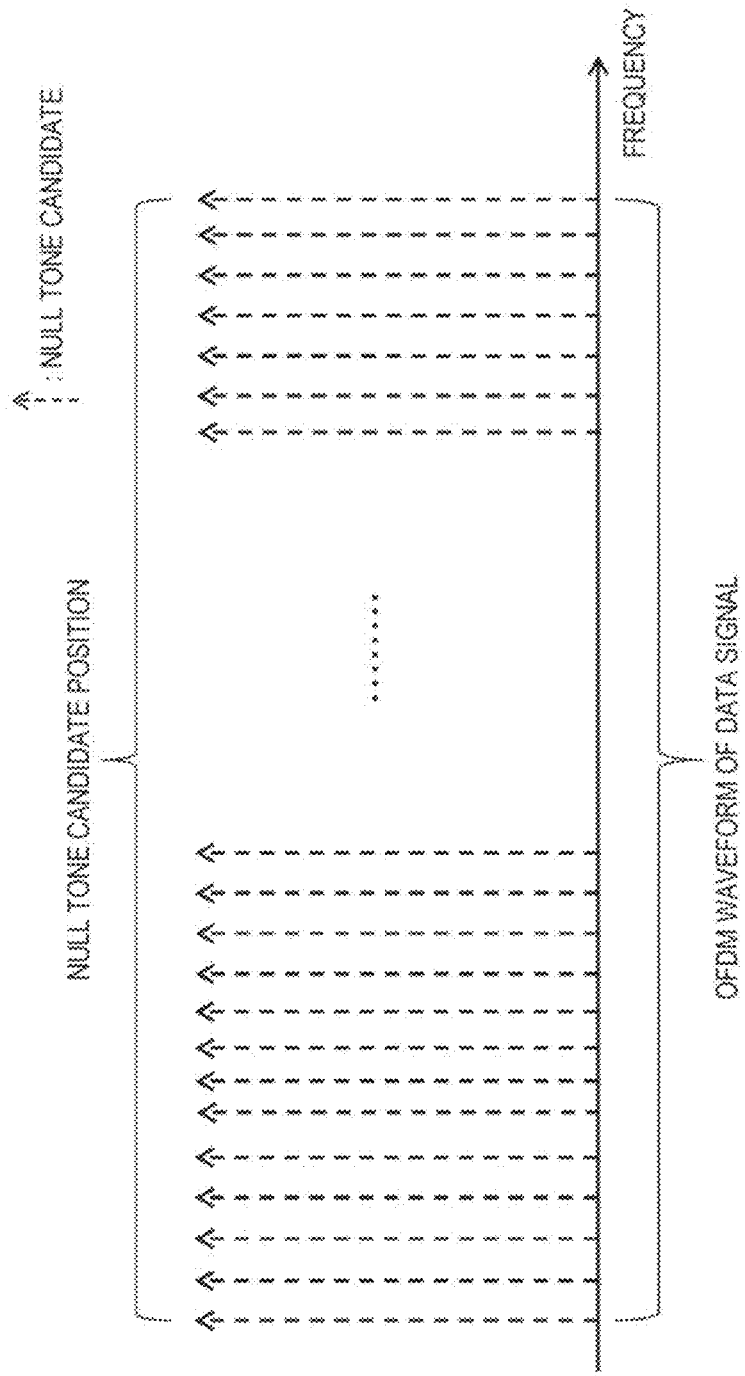

FIG. 26

| POSITION(k) WHERE $b_k=1$ | INFORMATION NAME | INFORMATION |
|---|---|---|
| 1 | PRESENCE/ABSENCE OF NULL TONE INFORMATION | 0: NO INFORMATION TRANSMISSION BY NULL TONE<br>1: WITH INFORMATION TRANSMISSION BY NULL TONE |
| 2 TO 65 | BSS IDENTIFIER | IDENTIFIER INFORMATION FOR EACH BSS (CORRESPONDING TO SIX BITS) |
| 66 TO 129 | REMAINING TRANSMISSION TIME | NUMBER OF REMAINING OFDM SYMBOLS OF PACKET (UNITS OF EIGHT, CORRESPONDING TO SIX BITS) |
| 130 TO 145 | TRANSMISSION POWER | TRANSMISSION POWER VALUE INFORMATION (CORRESPONDING TO FOUR BITS) |
| 146 | UL/DL FLAG | 0: DL COMMUNICATION/1: UL COMMUNICATION |
| ⋮ | ⋮ | ⋮ |
| N | PARITY BIT | ERROR CORRECTION CODE (CORRESPONDING TO ONE BIT) |

FIG. 33

| POSITION | INFORMATION NAME | INFORMATION |
|---|---|---|
| $b_1$ | PRESENCE/ABSENCE OF NULL TONE INFORMATION | 0: NO INFORMATION TRANSMISSION BY NULL TONE<br>1: WITH INFORMATION TRANSMISSION BY NULL TONE |
| $b_2$ TO $b_7$ | BSS IDENTIFIER | IDENTIFIER INFORMATION FOR EACH BSS (CORRESPONDING TO SIX BITS) |
| $b_8$ TO $b_{13}$ | REMAINING TRANSMISSION TIME | NUMBER OF REMAINING OFDM SYMBOLS OF PACKET (UNITS OF EIGHT, CORRESPONDING TO SIX BITS) |
| $b_{14}$ | UL RECEIVABLE FLAG | 0: STA CANNOT TRANSMIT UL SIGNAL<br>1: STA CAN TRANSMIT UL SIGNAL |
| ... | ... | ... |
| $b_N$ | PARITY BIT | ERROR CORRECTION CODE (CORRESPONDING TO ONE BIT) |

FIG. 38

COMMUNICATION DEVICE AND COMMUNICATION METHOD

CROSS-REFERENCE TO RELATED APPLICATIONS

The present application is based on PCT filing PCT/JP2018/017382, filed May 1, 2018, which claims priority to JP 2017-132719, filed Jul. 6, 2017, the entire contents of each are incorporated herein by reference.

TECHNICAL FIELD

The technology disclosed herein relates to a communication device and a communication method for transmitting and receiving wireless packets.

BACKGROUND ART

A wireless local area network (LAN) terminal standardized by IEEE802.11 uses a carrier sense multiple access/collision avoidance (CSMA/CA) in which each terminal acquires transmission opportunities in an autonomous decentralized manner. Specifically, the terminal waits for transmission (backoff) for a random time. Furthermore, in a case where a surrounding radio wave environment is observed (carrier sense) during the backoff and a radio wave having power equal to or more than a signal detection threshold is detected, the backoff is stopped, and packet transmission is prevented. With this mechanism including the backoff and the carrier sense, the terminal avoids packet collisions while acquiring the transmission opportunities in an autonomous decentralized manner.

In IEEE802.11ax, which is currently standardized, various methods are considered to solve a problem in that transmission prevention by the signal detection is excessively set. Specifically, a method has been studied for determining whether or not the terminal transmits a packet and setting a transmission parameter such as transmission power and a transmission time on the basis of the information regarding the received signal.

Furthermore, regarding an In-Band Full Duplex terminal (terminal that can simultaneously perform transmission and reception in same frequency, referred to as "FD terminal" below) that is studied to be practically used in the future, an effect for doubling communication resources by receiving a packet transmitted from the other terminal even when transmitting a packet is expected. At this time, by acquiring information regarding the packet transmitted from the FD terminal, the other terminal can determine whether or not the packet can be transmitted to the FD terminal.

CITATION LIST

Patent Document

Patent Document 1: Japanese Patent Application Laid-Open No. 2003-249908

SUMMARY OF THE INVENTION

Problems to be Solved by the Invention

An object of the technology disclosed herein is to provide a communication device and a communication method that transmit and receive wireless packets.

Solutions to Problems

A first aspect of the technology disclosed herein is a communication device including a control unit that determines a subcarrier to be a null tone according to information applied to a packet and a transmission unit that generates a multi-carrier signal in which the determined subcarrier is set as a null tone and wirelessly transmits the signal.

The control unit determines the positions and the number of subcarriers to be the null tones in a range of a null tone candidate position that is determined in the multi-carrier signal in advance. Alternatively, the control unit fixes the number of subcarriers to be null tones and determines the position of the subcarrier to be the null tone corresponding to the information. Furthermore, the control unit changes a subcarrier to be a null tone according to temporal variation of the information. Then, the control unit determines a subcarrier to be a null tone according to the information including at least one of a BSS identifier, transmission time information, transmission power information, a flag that identifies uplink communication or downlink communication, or a flag indicating whether or not a packet can be received.

Furthermore, a second aspect of the technology disclosed herein is a communication method including a control step of determining a subcarrier to be a null tone according to information applied to a packet and a transmission step of generating a multi-carrier signal in which the determined subcarrier is set as a null tone and wirelessly transmitting the signal.

Furthermore, a third aspect of the technology disclosed herein is a communication device including a determination unit that determines a subcarrier to be allocated to a null tone from a received multi-carrier signal and a control unit that acquires information on a basis of a null tone determination result by the determination unit.

The control unit acquires the information on a basis of a position of a subcarrier and the number of subcarriers determined to be a null tone by the determination unit. Alternatively, the control unit acquires the information on a basis of a position of a subcarrier determined to be a null tone by the determination unit. Then, it is possible that, in a case where the number of subcarriers to be null tones by the determination unit is other than an expected number, the control unit determines that determination is wrong. Furthermore, it is possible that the control unit determines whether or not the information is successfully acquired on a basis of a code for detecting or correcting an error included in the acquired information.

The control unit further performs packet transmission control on a basis of the acquired information. For example, the control unit determines whether or not a packet transmission by spatial reuse can be performed or adjusts a transmission parameter of the packet on a basis of the acquired information. Alternatively, the control unit can determine whether or not a packet can be transmitted to a Full Duplex terminal or adjust a transmission parameter of the packet on a basis of the null tone determination result by the determination unit on a multi-carrier signal received from the Full Duplex terminal.

Furthermore, a fourth aspect of the technology disclosed herein includes a determination step of determining a subcarrier to be allocated to a null tone from a received multi-carrier signal and a control step of acquiring information on a basis of a null tone determination result by the determination step.

Effects of the Invention

According to the technology disclosed herein, a communication device and a communication method that transmit and receive wireless packets can be provided.

Note that the effects described in the present specification are only exemplary, and the effect of the present invention is not limited to those. Furthermore, there is a case where the present invention has a further additional effect other than the effects described above.

Other purpose, characteristics, and advantages of the technology disclosed herein would be obvious by the detailed description based on the embodiment described later and the attached drawings.

BRIEF DESCRIPTION OF DRAWINGS

FIG. 4 is a diagram illustrating an example of signal generation in the OFDM signal generator 211 illustrated in FIG. 3.

FIG. 15 is a diagram illustrating a relationship between a position of a null tone and control information according to the first embodiment.

FIG. 16 is a diagram illustrating an example of temporal variation of subcarriers according to the first embodiment.

FIG. 25 is a diagram illustrating an example of a null tone candidate position in a third embodiment.

FIG. 26 is a diagram illustrating a relationship between a position of a null tone and control information according to the third embodiment.

FIG. 33 is a diagram exemplifying a relationship between a position of a null tone and control information in the fourth embodiment.

FIG. 38 is a diagram illustrating an example of signal generation in the OFDM signal generator 211 illustrated in FIG. 37.

MODE FOR CARRYING OUT THE INVENTION

Figure 1:
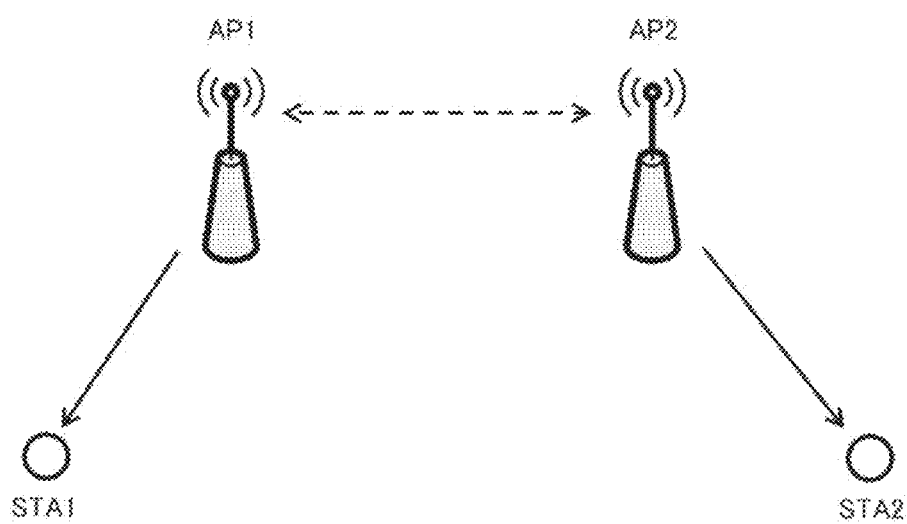
FIG. 1 is a diagram illustrating an exemplary configuration of a wireless communication system.

Hereinafter, embodiments of the technology disclosed in the present specification will be described in detail with reference to the drawings.

In a current wireless LAN terminal, information necessary for packet transmission determination and transmission parameter adjustment as described above is included in a preamble signal provided at a head of a packet. All the wireless LAN terminals which have detected the signal can acquire the information in the preamble signal. However, for example, even if a certain wireless LAN terminal receives a signal transmitted from another wireless LAN terminal, in a case where the certain wireless LAN terminal executes another processing (for example, transmission of packet or reception of other packets) at that time, the wireless LAN terminal cannot receive the preamble signal. When the reception of the preamble signal is missed once, the above information cannot be acquired from the middle of the packet, and it is not possible to determine the transmission and adjust the transmission parameter. Such a situation is predicted to be more serious in a case where the wireless LAN terminals are arranged at high density and a high traffic amount is applied. Therefore, it can be said that an opportunity for transmitting the necessary information by the wireless LAN terminal to the other wireless LAN terminal by using only the preamble signal and acquiring the necessary information from the other wireless LAN terminal is limited.

For the above reasons, it is desirable that the wireless LAN terminal transmit information so that the other wireless LAN terminal can acquire the necessary information even from the middle of the packet, without depending on the preamble signal. However, since a current wireless LAN terminal executes processing such as synchronization and channel estimation by using a preamble signal, the current wireless LAN terminal cannot execute such processing from the middle of the packet. That is, with the configuration of the current wireless LAN terminal, it is very difficult to detect and demodulate an orthogonal frequency division multiplexing (OFDM) signal without using a preamble signal.

For example, a wireless communication system has been proposed in which a transmitter notifies a receiver of a control signal by using a vacant frequency of the OFDM signal (for example, refer to Patent Document 1). However, in such a system, it is necessary to reserve resources even in a case where the transmitter does not transmit the control signal. Therefore, it is difficult for other inefficient wireless LAN terminal that cannot establish synchronization to read the control signal. Therefore, the wireless LAN terminal needs to acquire the necessary control information even though the data is not demodulated after detecting the OFDM signal, for a packet in which the preamble signal cannot be acquired.

To solve the above problems, in the present specification, a transmitter and a transmission method are proposed that determine a subcarrier to be a null tone (Null Tone) according to information applied to a packet, generate an OFDM signal in which the determined subcarrier is set as a null tone, and perform packet communication. The null tone here refers to a tone signal (subcarrier) having no power.

The information applied to the packet by the null tone is, for example, a basic service set (BSS) identifier, transmission time information, transmission power information, an uplink (UL)/downlink (DL) flag, and the like.

As a method for setting the position and the number of subcarrier to be allocated to a null tone, two patterns can be exemplified. One method is a method for fixing a range of subcarriers that can be allocated to the null tones in the OFDM signal (hereinafter, also referred to as "null tone candidate position") and making the positions and the number of actual null tones have information. Another method is a method for fixing the number of null tones allocated in the OFDM signal and makes the position of the null tone have information.

According to the time-varying information, the position or the number of subcarriers to which the null tones are allocated in the OFDM signal can be changed. A minimum unit of the null tone may be a single subcarrier or a plurality of subcarriers. Furthermore, in a case where there is a plurality of streams, the same subcarriers in the respective streams are set as the null tones. This is to prevent a situation in which the subcarriers overlaps due to the plurality of streams and the reception side cannot detect the null tone.

Furthermore, to solve the above problems, in the present specification, a receiver and a reception method are proposed that obtain necessary information by detecting an OFDM signal of a packet in which a preamble signal cannot be acquired by simple synchronization, measuring reception power of each subcarrier, and detecting the number and the positions of the null tones.

After specifying a timing of the OFDM symbol by the simple synchronization, a reception terminal measures reception power of a specific subcarrier. Here, normalized reception power obtained by dividing the reception power of the subcarrier by reception power of the entire OFDM symbol may be used. Furthermore, it is possible that reception power of each of a plurality of symbols is measured by using a normalized power value and a peak value.

Furthermore, the receiver may determine the null tone by using the reception power of each subcarrier according to either one of the following methods (a) and (b).

(a) A reception power value measured in the subcarrier that is a null tone candidate is compared with a threshold, and it is determined that the null tone candidate is a null tone.

(b) A relative value between the reception power value measured in the subcarrier that is a null tone candidate and reception power measured in a subcarrier that is a reference tone (Reference Tone) is compared with a threshold, and it is determined that the null tone candidate is a null tone. However, it is assumed that the reference tone be a tone signal (subcarrier) having power.

(c) However, in a case where null tones more than the determined number are detected from the single OFDM symbol, it is determined that the null tone determination fails.

In the following description, some embodiments relating to the technology proposed herein will be described.

A first to third embodiments are embodiments relating to the spatial reuse technology under consideration in IEEE802.11ax. Although the embodiments have respectively different methods for transmitting and acquiring the information, the embodiments have basically the same problems to be solved, the effects, and configurations of the systems and the devices.

Furthermore, a fourth embodiment is an application example regarding a communication system using a full duplex (FD) terminal.

First Embodiment

In FIG. 1, an exemplary configuration of a wireless communication system according to a first embodiment is schematically illustrated. The illustrated system includes two AccessPoints (AP: base station) and two STAtions (STA: slave unit). However, it is assumed that a BSS 1 include an AP 1 and a STA 1 subordinate to the AP 1 and a BSS 2 include an AP 2 and a STA 2 subordinate to the AP 2. Furthermore, in the illustrated system, the AP 1 performs DL communication with the STA 1, and the AP 2 performs DL communication with the STA 2. The AP 1 and the AP 2 have a positional relationship where the AP 1 and the AP 2 can mutually detect signals.

Note that the wireless communication system to which the technology disclosed herein can be applied is not limited to the exemplary configuration illustrated in FIG. 1. As long as a system has a configuration in which a plurality of communication devices which establishes connection exists and a communication device exists as a peripheral terminal with respect to each of the plurality communication devices, the positional relationship between the communication devices is not particularly limited, and the technology disclosed herein can be similarly applied.

Figure 2:
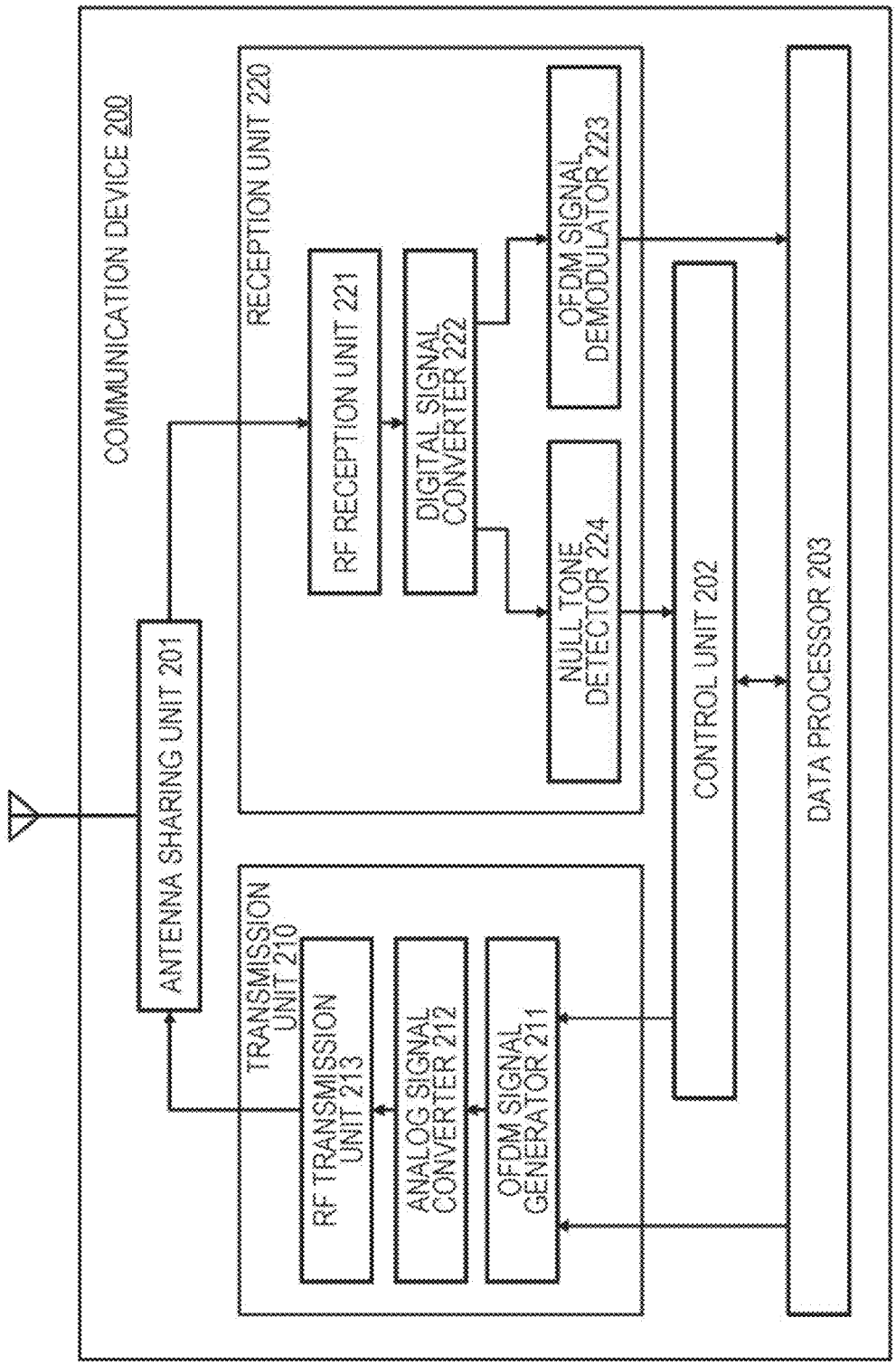
FIG. 2 is a diagram illustrating an exemplary configuration of a communication device 200.

In FIG. 2, an exemplary configuration of a communication device 200 to which the technology disclosed herein can be applied is illustrated. The illustrated communication device 200 includes an antenna sharing unit 201, a transmission unit 210, a reception unit 220, a control unit 202, and a data processor 203. The communication device 200 can operate as one of the AP or the STA under a wireless environment as illustrated in FIG. 1. It should be understood that the AP and the STA have a similar basic device configuration.

The data processor 203 processes a data signal used for communication. Specifically, the data processor 203 executes processing for generating a data signal to be transmitted in a packet and extracting a data signal from a demodulated received signal. Furthermore, information to be put on the preamble signal is generated in the data processor 203.

The control unit 202 comprehensively controls an overall operation of the communication device 200. In particular, in the present embodiment, the control unit 202 determines a position of a subcarrier to be allocated to a null tone on the basis of information transmitted by using the null tone and controls operations of the transmission unit 210 and the reception unit 220 of the communication device 200 on the basis of information acquired from the null tone detection result.

The transmission unit 210 generates a packet to be transmitted via an antenna from the data signal generated by the data processor 202. The transmission unit 210 can be mainly divided into an OFDM signal generator 211, an analog signal converter 212, and a radio frequency (RF) transmission unit 213.

The OFDM signal generator 211 generates an OFDM signal on the basis of the data signal generated by the data processor 202. Furthermore, in a case where the OFDM signal generator 211 acquires the information regarding the position of the subcarrier to be allocated to the null tone from the control unit 203, the OFDM signal generator 211 generates the OFDM signal in which a designated subcarrier is set as a null tone (that is, with no power).

The analog signal converter 212 performs DA conversion from the OFDM signal generated by the OFDM signal generator 211 to an analog signal.

The RF transmission unit 213 performs frequency conversion (up-conversion) and power amplification on the analog signal generated by the analog signal converter 212 and generates a transmission signal output from the antenna.

The antenna sharing unit 201 emits the transmission signal generated by the transmission unit 210 in the air as electromagnetic waves via the antenna. Furthermore, the antenna sharing unit 201 passes the electromagnetic waves received via the antenna to the reception unit 220 as a received signal.

The reception unit 220 extracts data and acquires control information from the received signal received via the antenna. The reception unit 220 is mainly divided into an RF reception unit 221, a digital signal converter 222, an OFDM signal demodulator 223, and a null tone detector 224. Note that a main feature of the present embodiment is that the reception unit 220 includes the null tone detector 224.

The RF reception unit 221 performs frequency conversion (down-conversion) and power amplification on the received signal received via the antenna and converts the received signal into an analog signal which is easily converted into a digital signal. Although not illustrated in FIG. 2, the RF reception unit 221 includes a low noise amplifier (LNA). This LNA can control a gain to a reception intensity according to auto gain control (AGC). The gain of the LNA is adjusted according to reception power of the signal detected by the OFDM detector 223 or the null tone detector 224.

The digital signal converter 222 AD converts the analog signal processed by the RF reception unit 221 into a digital signal.

After detecting the preamble signal at the head of the packet, the OFDM signal demodulator 223 executes processing such as synchronization acquisition, channel estimation, phase correction, and the like on the OFDM signal by using the preamble signal and demodulates the data signal from the OFDM signal. The demodulated data is sent to the data processor 203.

The null tone detector 224 detects an OFDM signal from the received signals. After the successful detection, the null tone detector 224 measures reception power of a specific subcarrier and determines a null tone. The determination result regarding the null tone is passed to the control unit 202. Then, the control unit 202 extracts the control information applied to the packet from the determination result of the null tone detector 224.

Hereinafter, a configuration of each of the OFDM signal generator 211 on the side of the transmission unit 210, and the OFDM signal demodulator 223 and the null tone detector 224 on the side of the reception unit 220 will be described in detail.

Figure 3:
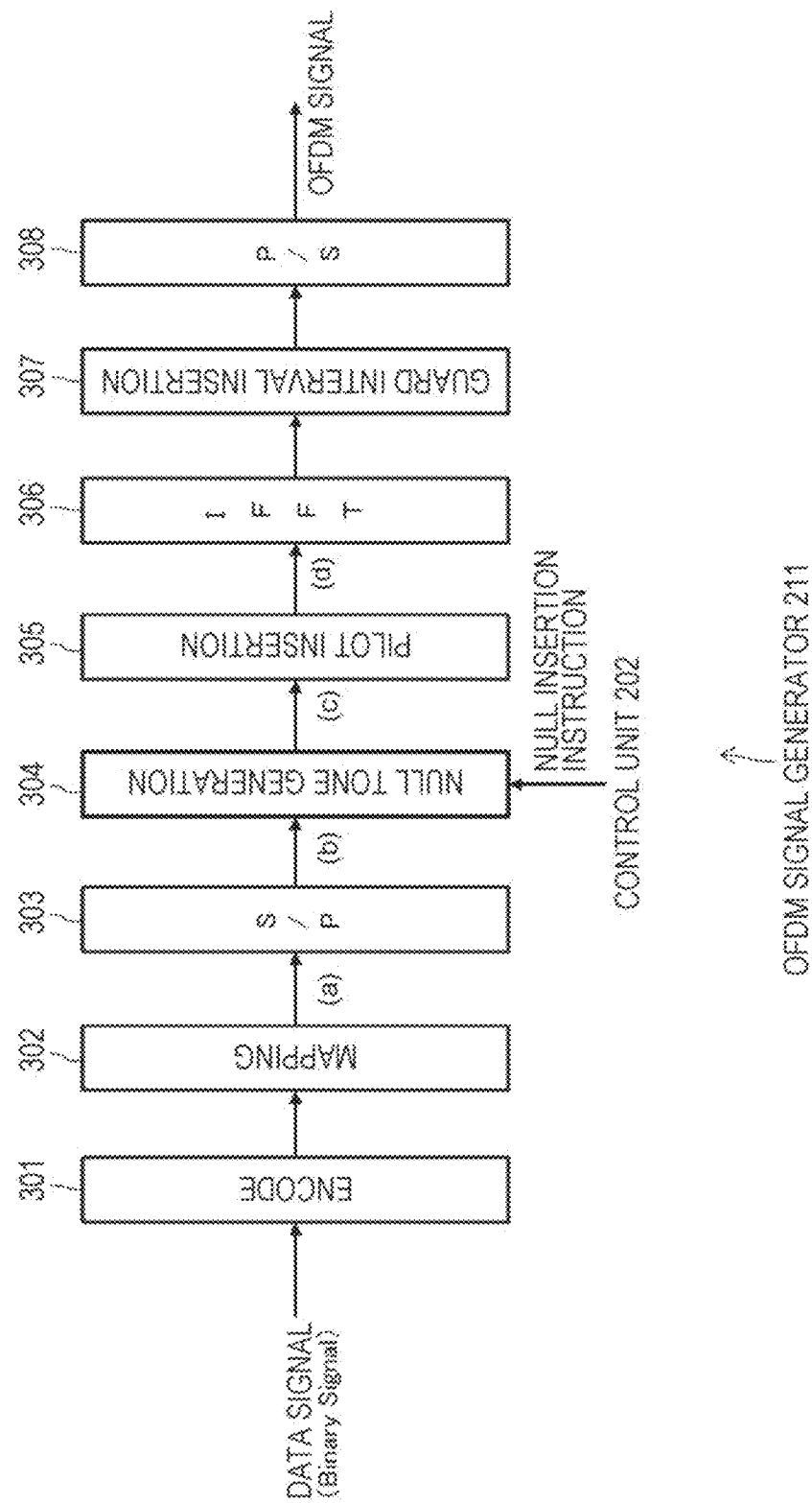
FIG. 3 is a diagram illustrating an exemplary configuration of an OFDM signal generator 211.

In FIG. 3, an exemplary configuration of the OFDM signal generator 211 is illustrated. The illustrated OFDM signal generator 211 includes an encoder 301, a mapping unit 302, a serial/parallel (S/P) converter 303, a null tone generator 304, a pilot insertion unit 305, an inverse Fourier transform (IFFT) unit 306, a guard interval (GI) insertion unit 307, and a parallel/serial (P/S) converter 308. Note that a feature of the present embodiment is that the OFDM signal generator 211 includes the null tone generator 304.

The encoder 301 executes encoding processing, for example, according to an encoding method in according with the definition of IEEE802.11 on the data signal (binary signal) applied from the data signal processor 202 to the transmission unit 210. Subsequently, the mapping unit 302 executes mapping processing such as signal point arrangement (for example, QPSK, 16QAM, and 64QAM) on the encoded data signal.

The serial/parallel converter 303 converts the modulated data signal into a parallel signal and classifies each piece of the modulated data on a frequency axis and a time axis. In response to a null insertion instruction from the control unit 202, the null tone generator 304 inserts a null into each parallel signal so that a null tone, that is, a subcarrier having no power is positioned at a desired position of the subcarrier. Subsequently, the pilot insertion unit 305 inserts a pilot signal used for channel estimation into each parallel signal.

The inverse Fourier transform (IFFT) unit 306 converts each subcarrier arranged in a frequency domain into the data signal on the time axis. Subsequently, the guard interval (GI) insertion unit 307 inserts a guard interval obtained by partially copying an OFDM time signal (symbol) into the head of the OFDM symbol so as to reduce interference caused by multipath delay. Then, the parallel/serial converter 308 converts each parallel signal which has been classified on the frequency axis and the time axis and on which the above processing has been executed into a serial signal again, and an actual OFDM signal is generated.

In FIG. 4, an example of signal generation in the OFDM signal generator 211 of the transmission unit 210 illustrated in FIG. 3 is illustrated.

FIG. 4(a) illustrates modulation data S1 to S8 encoded by the encoder 301 and mapped by the mapping unit 302.

FIG. 4(b) illustrates a result of classifying each of the pieces of modulation data S1 to S8 on the frequency axis and the time axis by the serial/parallel converter 303. As illustrated in FIG. 4(b), two OFDM symbols including S1 to S4 and S5 to S8 are transmitted. However, data signals S1 to S4 are respectively transmitted on different subcarriers, and similarly, data signals S5 to S8 are respectively transmitted on different subcarriers.

FIG. 4(c) illustrates a result of inserting a null tone signal into each serial/parallel converted OFDM signal by the null tone generator 304. The null tone generator 304 inserts "NULL" so that the data signal is not placed at the position of the subcarrier determined by the control unit 202. In FIG. 4(c), a fourth subcarrier from the top of each OFDM signal in which N is written is "NULL".

FIG. 4(d) illustrates a result of inserting the pilot signal into each OFDM signal, in which "NULL" is inserted by the null tone generator 304, by the pilot insertion unit 305. In FIG. 4(d), a third subcarrier from the top of each OFDM signal in which P is written is a pilot signal. Furthermore, a fifth subcarrier from the top of each OFDM signal in which N is written in FIG. 4(d) is a subcarrier having no power, that is, a null tone.

In consideration of the number of null tones and the number of pilot signals to be inserted at the post stage, it is necessary for the serial/parallel converter 303 to calculate the number of subcarriers on which the data signal is provided in a single OFDM symbol and to perform serial/parallel conversion. Moreover, in consideration the insertion of the pilot signal at the post stage, it is necessary for the null tone generator 304 to determine the position at which "NULL" is inserted at this stage (or by null tone generator 304) so as to arrange the null tone at the position of the subcarrier finally determined by the control unit 202.

Figure 37:
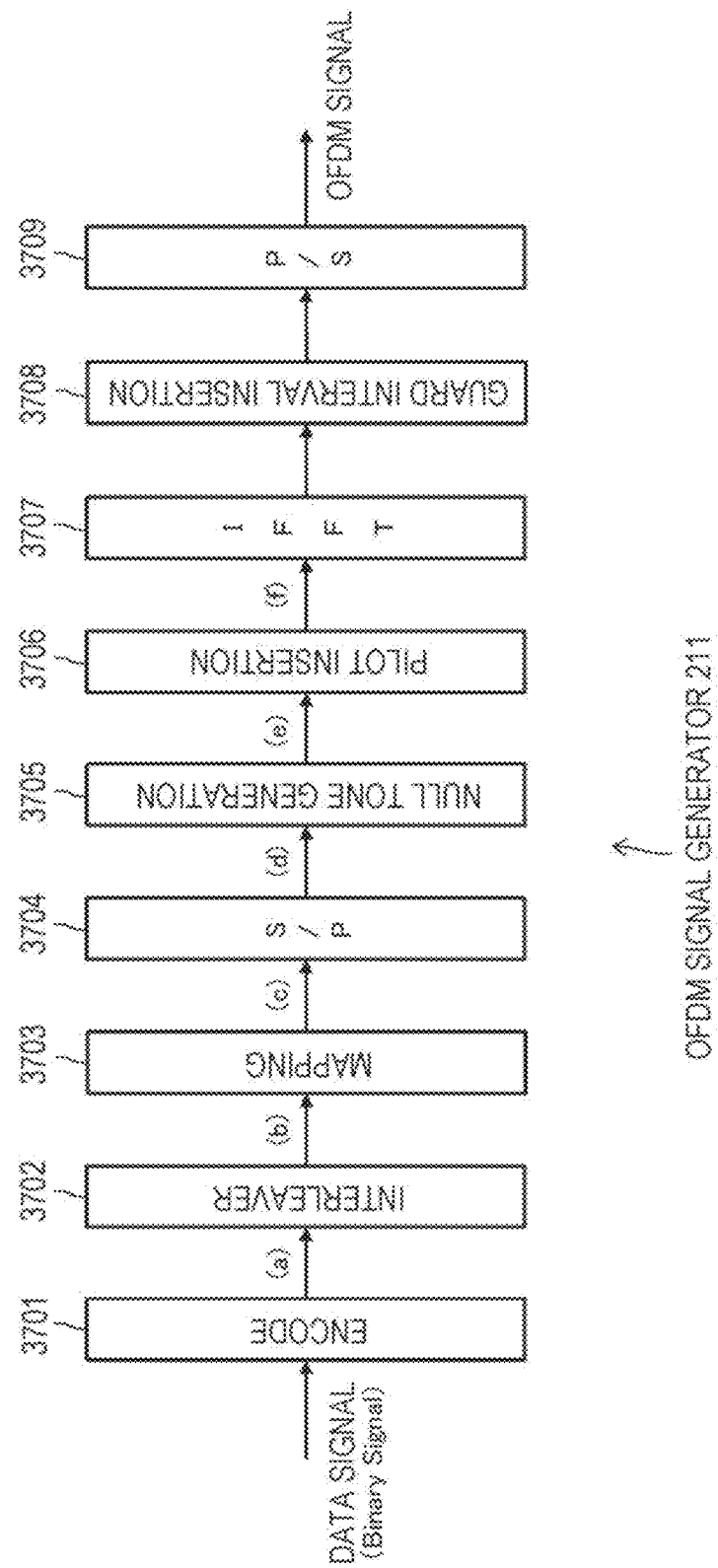
FIG. 37 is a diagram illustrating an exemplary configuration of an OFDM signal generator 211.

Furthermore, in FIG. 37, another exemplary configuration of the OFDM signal generator 211 is illustrated. The illustrated OFDM signal generator 211 includes an encoder 3701, an interleaver 3702, a mapping unit 3703, a serial/parallel (S/P) converter 3704, a null tone generator 3705, a pilot insertion unit 3706, an inverse Fourier transform (IFFT) unit 3707, a guard interval insertion unit 3708, and a parallel/serial (P/S) converter 3709. Note that a feature of the present embodiment is that the OFDM signal generator 211 includes the null tone generator 3705.

The encoder 3701 executes encoding processing, for example, according to an encoding method in according with the definition of IEEE802.11 on the data signal (binary signal) applied from the data signal processor 202 to the transmission unit 210. The subsequent interleaver 3702 rearranges (interleave) the order of the data signals so that data series is discontinuous, and the mapping unit 3703 executes mapping processing such as the signal point arrangement (for example, QPSK, 16QAM, and 64QAM) on the encoded data signal.

The serial/parallel converter 3704 converts the modulated data signal into a parallel signal and classifies each piece of the modulated data on a frequency axis and a time axis. The null tone generator 3705 punctures (delete output bit) on the data signal allocated to such a subcarrier so that the null tone, that is, the subcarrier having no power is positioned at the desired position of the subcarrier in response to the null insertion instruction from the control unit 202. This processing is similar to punctured processing used for encoding. Although the data signal allocated to the subcarrier is not output, if the interleaver 3702 generates the discontinuous data series in advance, the reception side can decode (Viterbi decoding) the data into the original data on the basis of the relationship with preceding and subsequent pieces of data. Therefore, although a required signal to noise ration (SNR) is increased, it is possible to prevent deterioration in a data rate according to the generation of the null tone. Subsequently, the pilot insertion unit 3706 inserts a pilot signal used for channel estimation and the like into each parallel signal.

The inverse Fourier transform (IFFT) unit 3707 converts each subcarrier arranged in a frequency domain into the data signal on the time axis. Subsequently, the guard interval insertion unit 3708 inserts a guard interval obtained by partially copying an OFDM time signal (symbol) into the head of the OFDM symbol so as to reduce interference caused by multipath delay. Then, the parallel/serial converter 3709 converts each parallel signal which has been classified on the frequency axis and the time axis and on which the above processing has been executed into a serial signal again, and an actual OFDM signal is generated.

Figure 38:
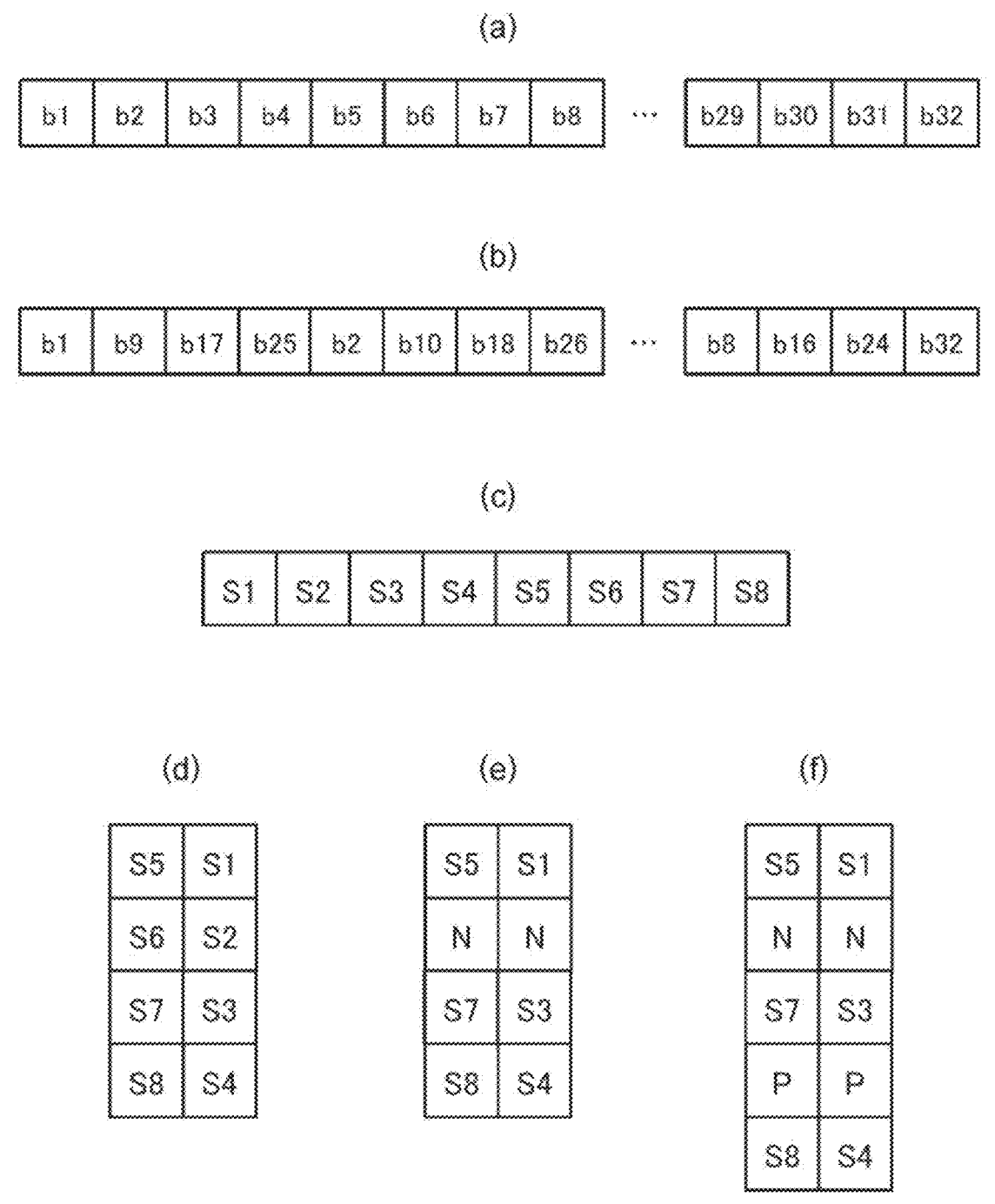

In FIG. 38, an example of signal generation in the OFDM signal generator 211 of the transmission unit 210 illustrated in FIG. 37 is illustrated. However, in FIG. 38, for simple description, it is assumed to transmit a 32-bit encoded data signal by using four subcarriers, and in addition, it is assumed to transmit four-bit information (that is, 16QAM modulation) by using a single subcarrier.

FIG. 38(a) illustrates 32-bit data signals b1 to b32 encoded by the encoder 3701.

FIG. 38(b) illustrates a result of rearrangement of the data signals for each symbol by the interleaver 3702. This processing is not limited to a rearrangement rule illustrated in FIG. 38(b), and there is no problem as long as the data series is processed not to be continuous.

FIG. 38(c) illustrates modulation data S1 to S8 encoded and mapped by the mapping unit 3703. In FIG. 38(c), the modulation data S1 is modulation data obtained by mapping bits b1, b9, b17, and b25 by 16QAM modulation, and the modulation data S2 is modulation data obtained by mapping the bits b2, b10, b18, and b26 by 16QAM modulation.

FIG. 38(d) illustrates a result of classifying each of the pieces of modulation data S1 to S8 on the frequency axis and the time axis by the serial/parallel converter 3704. As illustrated in FIG. 4(b), two OFDM symbols including S1 to S4 and S5 to S8 are transmitted. However, data signals S1 to S4 are respectively transmitted on different subcarriers, and similarly, data signals S5 to S8 are respectively transmitted on different subcarriers.

FIG. 38(e) illustrates a result of generating a null tone signal for each serial/parallel converted OFDM signal by the null tone generator 3705. The null tone generator 3705 executes puncturing processing so as not to place the data signals at the positions of the subcarriers S2 and S6 determined by the control unit 202 and replaces the subcarriers with "NULL". In FIG. 38(e), a second subcarrier from the top of each OFDM signal in which N is written is a subcarrier having no power, that is, a null tone.

FIG. 38(f) illustrates a result of inserting a pilot signal into each OFDM signal, in which the null tone is generated by the null tone generator 3705, by the pilot insertion unit 3706. In FIG. 38(f), a fourth subcarrier from the top of each OFDM signal in which P is written is a pilot signal. Furthermore, a second subcarrier from the top of each OFDM signal in which N is written in FIG. 38(f) is a subcarrier having no power, that is, a null tone.

In consideration of the number of null tones and the number of pilot signals to be inserted at the post stage, it is necessary for the serial/parallel converter 3704 to calculate the number of subcarriers provided on the data signal in a single OFDM symbol and to perform serial/parallel conversion. Moreover, in consideration the insertion of the pilot signal at the post stage, it is necessary for the null tone generator 3705 to determine the position at which "NULL" is inserted at this stage (or by null tone generator 3705) so as to arrange the null tone at the position of the subcarrier finally determined by the control unit 202.

Here, as in the modulation data S2 and S6 in FIG. 38, information in the data signal replaced with the null to generate the null tone by the puncturing processing is not transmitted on the OFDM signal. If the reception side can accurately demodulate other modulation data, it is possible to decode these pieces of punctured information. For example, since the modulation data S2 is a signal mapped by the bits b2, b10, b18, and b25, if data before or after interleaving processing (case of b2, b1, and b3) can be accurately acquired, information that has not been transmitted can be acquired by decoding processing such as Viterbi decoding. The same applies to the modulation data S6. Such puncturing processing is processing that is generally used in encoding. In the present embodiment, by using this puncturing processing for generation of the null tone, an OFDM signal having a null tone can be generated without deteriorating the data rate although the required SNR is increased.

Note that, when the communication device 200 operates as the reception side and decodes the OFDM signal having the null tone generated by the puncturing processing to the data signal, it is desirable that the information regarding the subcarrier to be the null tone be acquired in advance so as not to extract data from the subcarrier that becomes the null tone in the OFDM signal demodulator 223 (subcarrier modulator 509 described later). Therefore, the communication device 200 on the side of transmitting the OFDM signal having the null tone generated by the puncturing processing may transmit the information regarding the subcarrier to be the null tone to the preamble signal and the like.

In the present embodiment, it is possible to express information to be transmitted according to the arrangement of the subcarriers to which the null tones are allocated in the OFDM signal (position, the number, or combination of position and number of null tones). Therefore, the control unit 202 determines the position of the subcarrier to be the null tone according to the information applied to the packet, and the OFDM signal generator 211 illustrated in FIGS. 3 and 37 generates the OFDM signal in which the determined subcarrier is set as the null tone.

With this operation, the communication device 200 can transmit information other than original transmission data by applying the information to the packet in a form, in which the null tone is arranged in the OFDM signal, at the time of transmission. For example, control information that is originally described in the preamble signal can be transmitted by using the null tone in a data portion after the preamble. Of course, it is possible to apply the information by arranging the null tone in the OFDM signal of the preamble portion, not the data portion.

Figure 5:
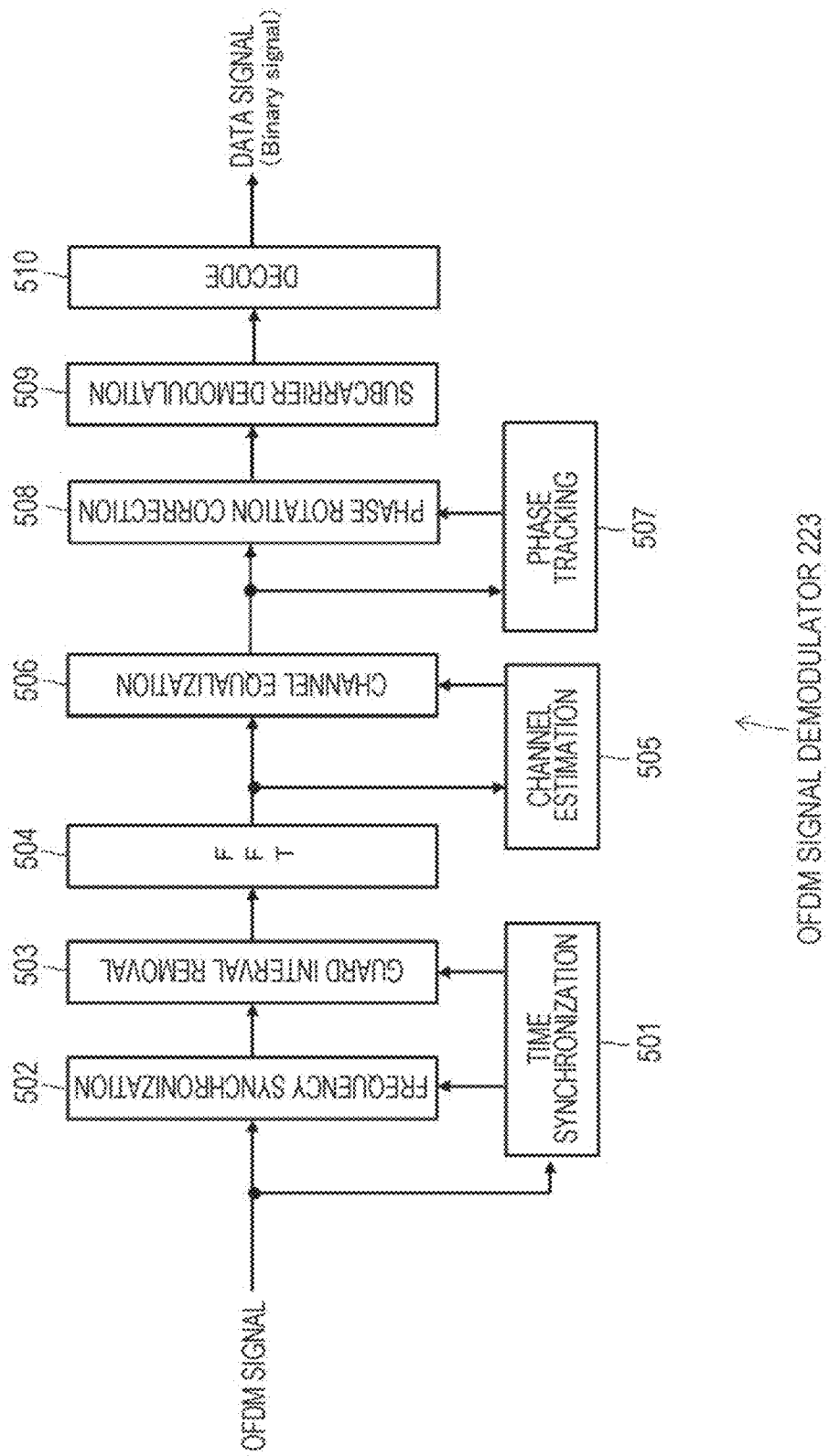
FIG. 5 is a diagram illustrating an exemplary configuration of an OFDM signal demodulator 223.

In FIG. 5, an exemplary configuration of the OFDM signal demodulator 223 of the reception unit 220 is illustrated. The illustrated OFDM signal demodulator 223 includes a time synchronization processor 501, a frequency synchronization processor 502, a guard interval (GI) remover 503, a fast Fourier transform (FFT) unit 504, a channel estimation unit 505, a channel equalizer 506, a phase tracking unit 507, a phase rotation corrector 508, a subcarrier demodulator 509, and a decoder 510.

First, the time synchronization processor 501 detects a symbol timing of the OFDM signal generated by the digital signal converter 223 (time synchronization), and then, the frequency synchronization processor 502 performs frequency synchronization on the basis of the detected timing. Then, the guard interval remover 503 removes a guard interval added to a head of a data transmission section (OFDM symbol) on the basis of the timing of the OFDM symbol detected by the time synchronization processor 501. The fast Fourier transform unit 504 performs fast Fourier transform on the OFDM symbol from which the guard interval has been removed and converts the data signal on the time axis into the subcarriers arranged in the frequency domain.

After the OFDM signal can be separated into subcarriers by the FFT processing, the channel estimation unit 505 estimates a channel, and the channel equalizer 506 executes channel equalization processing such as residual frequency offset correction, channel tracking, and the like on the basis of the channel estimation result.

The phase tracking unit 507 tracks a phase of the signal on which the channel equalization has been performed, and the phase rotation corrector 508 executes processing for correcting a phase rotation of the received signal on the basis of the phase tracking result. Then, the subcarrier demodulator 509 executes demodulation processing for each subcarrier, and the decoder 510 executes decoding processing corresponding to the encoder 301 at the time of transmission. The data signal (binary signal) decoded in this way is sent to the data processor 203. Note that the channel equalization by the channel equalizer 506 and the phase rotation correction processing by the phase rotation corrector 508 are executed to enhance demodulation accuracy.

Here, all of the time synchronization, the frequency synchronization, the channel estimation, and the phase tracking performed in WLAN are processing by using the preamble signal (more specifically, short training sequence (STF) signal or long training sequence (LTF) signal including known pattern provided at head of preamble signal).

With the configuration of the OFDM signal demodulator 223 illustrated in FIG. 5, if the preamble signal at the head of the packet is missed, it is difficult to establish synchronization from the middle of the packet, and it is difficult to detect an OFDM signal. Furthermore, even if the OFDM signal demodulator 223 can detect the OFDM signal although missing the preamble signal, the processing of channel estimation and the processing of the phase tracking cannot be executed. Therefore, the demodulation accuracy is significantly lowered. That is, it is not possible for the OFDM signal demodulator 223 to demodulate the OFDM signal from the middle of the packet and extract an original data signal.

Therefore, in the communication device 200 according to the present embodiment, the reception unit 220 includes the null tone detector 224 in order to realize means for detecting the OFDM signal even from the middle of the packet and acquiring the control information. The null tone detector 224 detects a null tone arranged in the OFDM signal. As described above, information is expressed according to the position of the subcarrier allocated to the null tone in the OFDM signal. Then, the control unit 202 can extract the control information applied to the packet on the basis of the determination result of the null tone detector 224.

Figure 6:
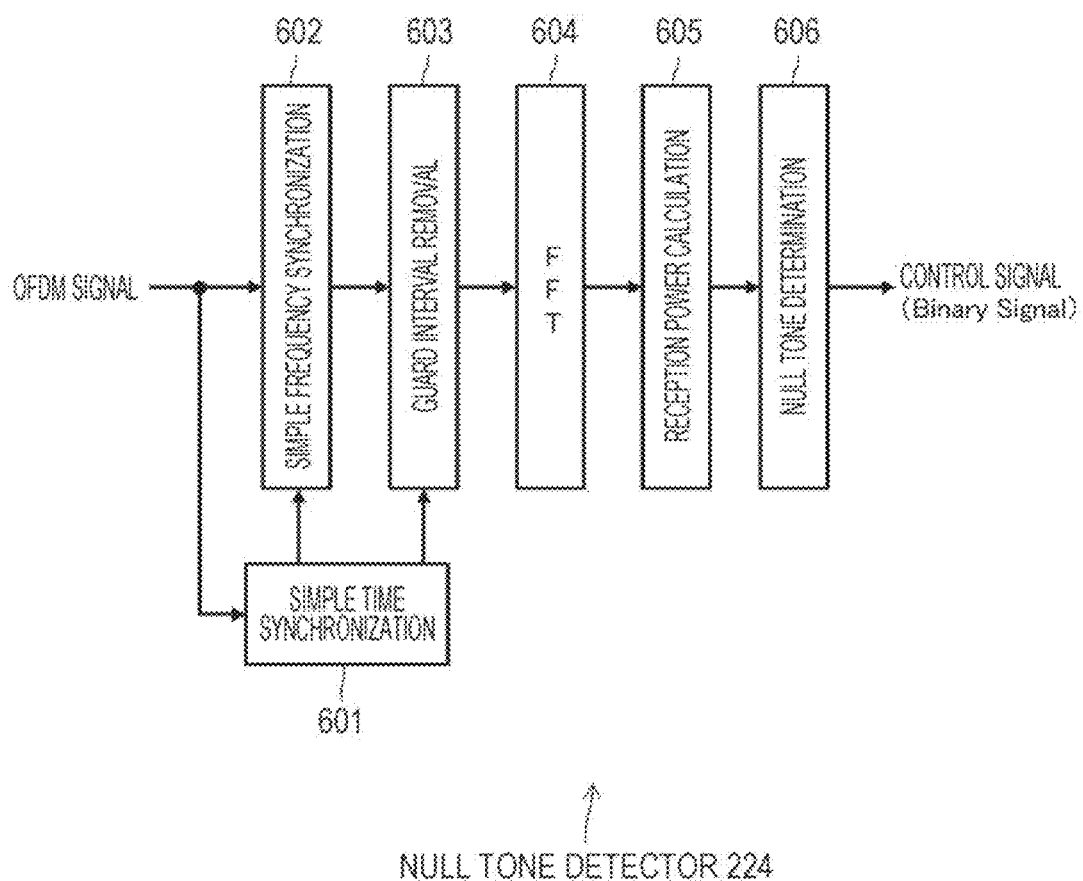
FIG. 6 is a diagram illustrating an exemplary configuration of a null tone detector 224.

In FIG. 6, an exemplary configuration of the null tone detector 224 is illustrated. The illustrated null tone detector 224 includes a simple time synchronization processor 601, a simple frequency synchronization processor 602, a guard interval (GI) remover 603, a fast Fourier transform (FFT) unit 604, a reception power calculation unit 605, and a null tone determination unit 606.

The simple time synchronization processor 601 detects an approximate symbol timing of an OFDM signal generated by the digital signal converter 222 and simply acquires time synchronization. Next, the simple frequency synchronization processor 602 acquires simple frequency synchronization on the basis of the symbol timing that can be detected by the simple time synchronization processor 601. In order to calculate reception power of each subcarrier when the null tone signal is detected at the post stage of the null tone detector 224, it is necessary to perform FFT calculation on an OFDM symbol. Therefore, it is necessary to detect a timing of the OFDM symbol. As described later, the simple time synchronization processor 601 and the simple frequency synchronization processor 602 execute simple synchronization processing by autocorrelation of the received OFDM signal by using periodicity of the guard interval.

After that, the guard interval remover 603 removes a guard interval from the OFDM symbol on the basis of the timing of the OFDM symbol detected by the simple time synchronization processor 601, and the fast Fourier transform unit 604 performs fast Fourier transform on the OFDM symbol from which the guard interval has been removed, and converts the data signal on the time axis into subcarriers arranged in the frequency domain. Then, after the signal can be separated into subcarriers by the FFT processing, the reception power calculation unit 605 calculates the reception power of the specific subcarrier, and the null tone determination unit 606 determines whether or not each subcarrier is a null tone. As described later, in a case where a null tone candidate position is determined in the OFDM signal in advance, the calculation of the reception power and the null tone determination are performed only regarding the subcarrier in a range of the candidate position.

The determination result of the null tone determination unit 606 is sent to the control unit 202. Then, the control unit 202 acquires the control information on the basis of the determination result of the null tone. The control unit 202 extracts the control information applied to the packet according to the arrangement of the subcarrier to which the null tone is allocated in the OFDM signal. This point will be described later in detail. The null tone determination unit 606 determines the null tone without demodulating the received signal. Therefore, in the present embodiment, it should be fully understood that the reception unit 220 can acquire the control information from the packet without demodulating the received signal.

The control unit 202 determines behaviors, parameters, and the like of the transmission unit 210 and the reception unit 220 of the communication device 200 according to the control information acquired on the basis of the detected null tone. For example, the control unit 202 controls processing operations such as transmission of the packet by spatial reuse, packet transmission to a FD terminal, and the like according to the acquired control information. This point will be described later in detail.

Main features of the simple time synchronization processor 601 and the simple frequency synchronization processor 602 illustrated in FIG. 6 are that the known pattern at the head of the preamble signal is not used. Specifically, the simple time synchronization processor 601 and the simple frequency synchronization processor 602 execute simple synchronization processing by autocorrelation of the received OFDM signal by using periodicity of the guard interval. Although such simple synchronization processing is inferior in the synchronization accuracy and convergence time than the synchronization processing executed by the OFDM signal demodulator 223, the simple synchronization processing does not need the preamble signal. Therefore, the simple synchronization processing has an advantage that the OFDM signal can be detected from the middle of the packet by the null tone detector 224.

The null tone detector 224 only determines whether or not the subcarrier is a null tone or a normal tone signal according to a power level by the reception power calculation unit 605 at the post stage and does not demodulate and does not decode the OFDM signal. Therefore, it is considered that it is sufficiently possible to detect the OFDM signal by the simple synchronization processing. In the first place, the null tone does not have information unlike the normal tone signal. Since the control unit 202 extracts the control information on the basis of the arrangement of the null tones determined by the null tone determination unit 606 in the OFDM signal, it is not necessary to demodulate the data. Therefore, the null tone detector 224 does not need advanced synchronization accuracy, and does not need to perform processing such as channel estimation, phase correction, and the like necessary for improving the demodulation accuracy.

Note that the number of OFDM symbols necessary for each of the simple time synchronization processing, the simple frequency synchronization processing, and the null tone determination is not particularly limited. For example, the simple time synchronization processing and the simple frequency synchronization processing may be repeated only by a plurality of symbols to enhance the synchronization accuracy. Furthermore, in the null tone determination, it is possible to measure the reception power of the plurality of symbols and use the normalized power and peak power for determination so as to correctly make a determination in consideration of a change in the calculated reception power (for example, change in amplitude caused by modulation). Normalized reception power obtained by dividing the reception power of the subcarrier by reception power of the entire OFDM symbol may be used.

Furthermore, the guard interval remover 603 and the fast Fourier transform unit 604 in the null tone detector 224 illustrated in FIG. 6 perform operations same as the operation of the OFDM signal demodulator 223 illustrated in FIG. 5. Therefore, the null tone detector 224 and the OFDM signal demodulator 223 may use a common circuit for at least one of the guard interval removal or the fast Fourier transform.

Next, detailed configurations of the simple time synchronization processor 601 and the simple frequency synchronization processor 602 in the null tone detector 224 will be described.

Figure 7:
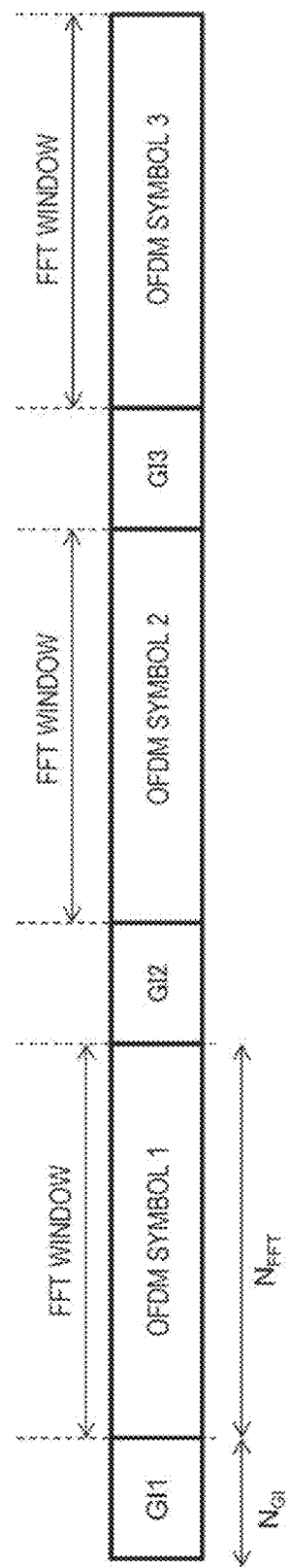
FIG. 7 is a diagram illustrating an exemplary configuration of an OFDM signal.

In FIG. 7, an exemplary configuration of the OFDM signal is illustrated. In the illustrated OFDM signal, a guard interval (GI) is attached in front of each OFDM symbol. In FIG. 7, the reference $N_{GI}$ indicates the number of FFT samples of the guard interval, and the reference $N_{FFT}$ indicates the number of FFT samples of effective OFDM.

In order to calculate the reception power of each subcarrier by the null tone detector 224, it is necessary to perform the FFT calculation on only the OFDM symbol. Therefore, it is necessary to detect the timing of each OFDM symbol.

Here, since the guard interval is generated by copying the latter half of the OFDM symbol, if the autocorrelation of the guard interval is continuously calculated and a peak point of the autocorrelation can be acquired, it is possible to detect the timing of the OFDM symbol.

Figure 8:
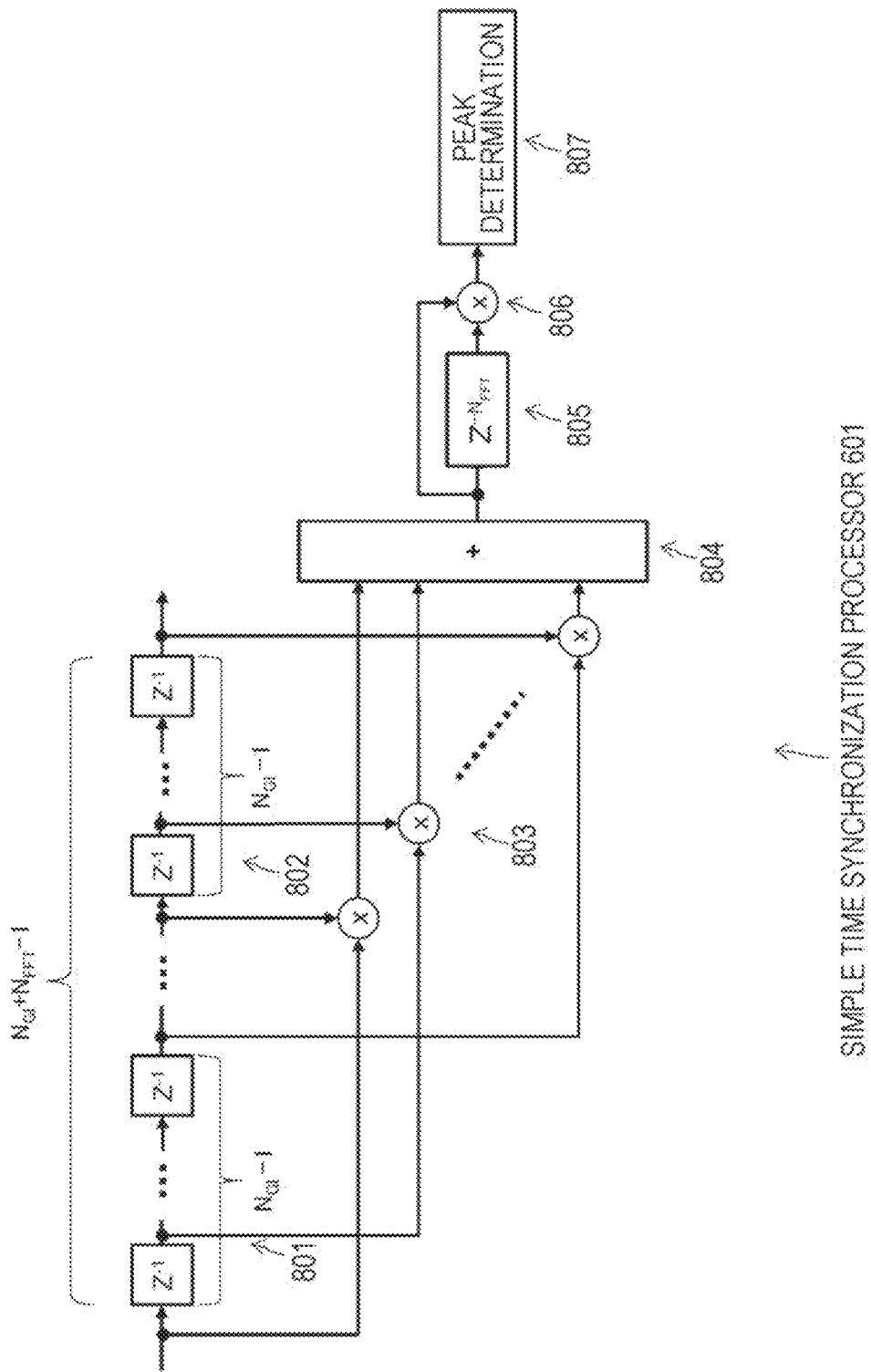
FIG. 8 is a diagram illustrating an exemplary configuration of a simple time synchronization processor 601.

In FIG. 8, an exemplary configuration of the simple time synchronization processor 601 in the null tone detector 224 is illustrated. The illustrated simple time synchronization processor 601 calculates the autocorrelation with a signal obtained by delaying the input OFDM signal by $N_{FFT}$ for each point by using the periodicity of the guard interval and detects a peak timing from the result obtained by adding the autocorrelation results of the signals for $N_{GI}$.

In FIG. 8, the reference $N_{GI}$ indicates the number of FFT samples of the guard interval, and the reference $N_{FFT}$ indicates the number of FFT samples of the effective OFDM. Furthermore, the reference $z^{-1}$ indicates a delay device that make a delay by one sample. A reference number 802 indicates a group of $(N_{GI}-1)$ delay devices. The group of $(N_{GI}-1)$ delay devices holds a sample signal that is delayed than that of the group of $(N_{GI}-1)$ delay devices indicated by a reference number 801 by $(N_{GI}+N_{FFT}-1)$ samples corresponding to an expected period.

A multiplier group indicated by a reference number 803 multiplies delay signals corresponding to each other (that is, delayed by expected period) respectively held by the delay device groups 801 and 802. Then, an adder indicated by a reference number 804 obtains the sum of the multiplication results by the multiplier group 803.

A multiplier 806 multiplies an output of the adder 804 by an output of the adder 804 obtained by delaying the above output by the number of FFT samples $N_{FFT}$ of the effective OFDM by a delay device 805 so as to maximize the peak of the autocorrelation. In this way, a peak determination unit 807 determines a peak position of the auto correlation.

Figure 9:
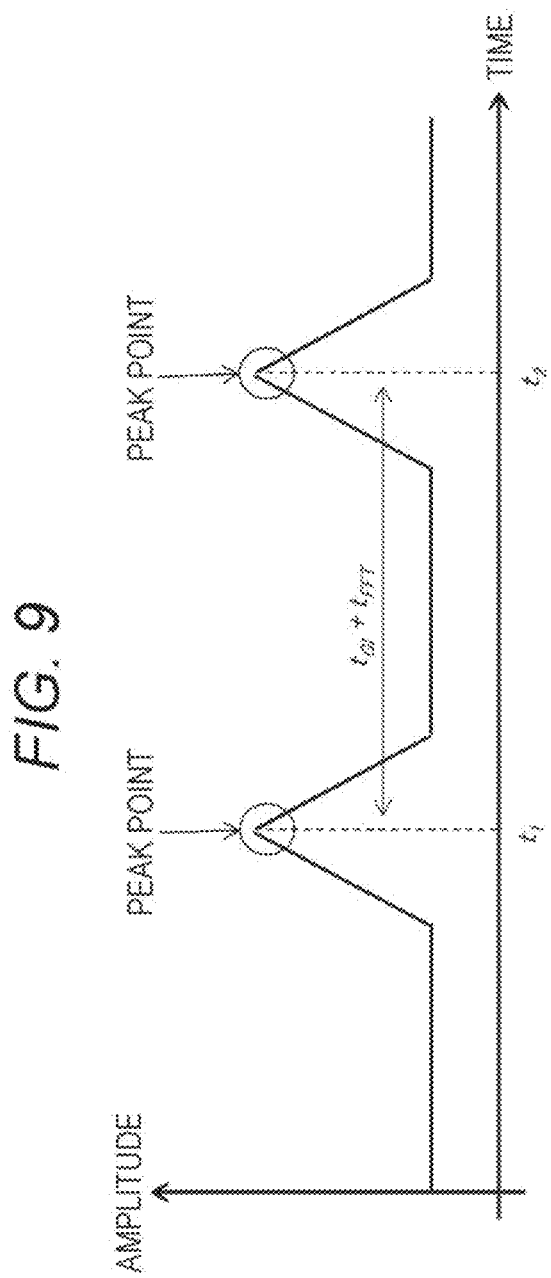
FIG. 9 is a diagram illustrating an example of detection of a symbol timing by the simple time synchronization processor 601 illustrated in FIG. 8.

In FIG. 9, an example of detection of the symbol timing by the simple time synchronization processor 601 illustrated in FIG. 8 is illustrated. However, in FIG. 9, the reference $t_{GI}$ indicates time corresponding to the number of FFT samples of the guard interval, and the reference $t_{FFT}$ indicates time corresponding to the number of FFT samples of the effective OFDM.

With reference to the exemplary configuration of the OFDM signal illustrated in FIG. 7, when the autocorrelation of the guard interval in the OFDM symbol is continuously calculated, it is expected that an amplitude starts to increase at the time when the input to the simple time synchronization processor 601 is the head of the guard interval and the autocorrelation calculation result reaches the peak at the time when the input is made at the end of the guard interval, that is, the start of the OFDM symbol. Therefore, the simple time synchronization processor 601 can detect some peak points ($t_1$, $t_2$). When the simple time synchronization processor 601 can detect the peak points ($t_1$, $t_2$) at an expected period ($t_{GI}+t_{FFT}$) as illustrated in FIG. 9, the simple time synchronization processor 601 determines that the OFDM signal is successfully detected.

Note that, by repeatedly executing such simple time synchronization processing in combination with simple frequency synchronization processing as described later, it is possible to enhance OFDM symbol detection accuracy.

Figure 10:
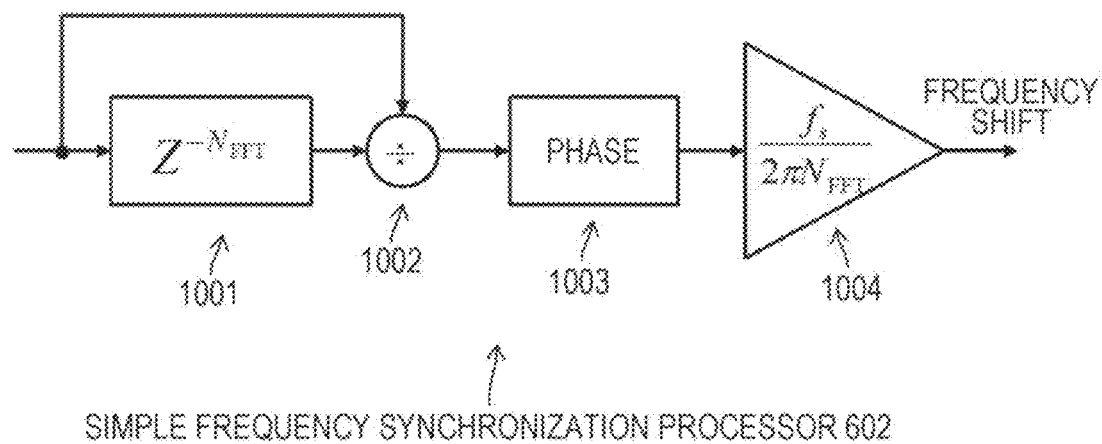
FIG. 10 is a diagram illustrating an exemplary configuration of a simple frequency synchronization processor 602.

In FIG. 10, an exemplary configuration of the simple frequency synchronization processor 602 in the null tone detector 224 is illustrated. Similarly to the simple time synchronization processor 601, the simple frequency synchronization processor 602 calculates a frequency shift from a phase shift by using the periodicity of the guard interval and corrects the frequency shift.

A processing operation of the simple time synchronization processor 601 illustrated in FIG. 10 will be described. A divider 1002 divides the received signal of the guard interval by the received signal of the guard interval in a previous period that is delayed by the number of FFT samples $N_{FFT}$ of the effective OFDM by a delay device 1001. Here, it is assumed that a received signal of a guard interval at time t be $x(t)e^{\Delta j\omega t}$ and a received signal after one period, that is, the number of FFT samples $N_{FFT}$ of the effective OFDM be $x(t+N_{FTT})e^{\Delta j\omega t}$. However, $e^{\Delta j\omega t}$ represents a frequency phase shift in a complex plane. In consideration of the periodicity of the guard interval (that is, received waveform x(t) and $x(t+N_{FTT})$ are the same), only the phase shift $e^{\Delta j\omega t}$ remains as the result of the division by the divider 1002. A phase shifter 1003 at the post stage converts result of complex calculation into a phase, and in addition, a frequency converter 1004 converts a phase shift into a frequency shift and outputs the converted frequency shift.

Note that, by repeatedly executing the simple time synchronization processing in combination with the simple frequency synchronization processing, it is possible to enhance the OFDM symbol detection accuracy.

The symbol timing detection accuracy based on the autocorrelation of the guard interval is not as high as that of the synchronization processing using the preamble signal. However, the above symbol timing detection accuracy is sufficient for performing the null tone determination processing on the basis of the reception power without demodulating the received signal.

As described above, when the simple time synchronization processor 601 and the simple frequency synchronization processor 602 detect the timing of the OFDM symbol, the subcarriers are separated from each other by performing the FFT calculation by the FFT unit 604 after removing the guard interval attached before the OFDM symbol by the guard interval remover 603. Then, by calculating the reception power of each subcarrier, the null tone determination unit 606 can determine whether the subcarrier is the null tone having no power or the normal tone signal that has power and transmits data.

For example, reception power of a k-th subcarrier in the null tone candidate position can be obtained by the following formula (1). However, in this formula, x indicates a signal in a time domain representing a received signal waveform, and $N_{FFT}$ indicates a FFT length of a single OFDM signal. By specifying a start timing of the OFDM symbol, it is possible to accurately measure the reception power of the subcarrier of each OFDM signal.

[Math. 1]

$$\left| \sum_{i=0}^{N_{FFT}-1} x(t) e^{-j\frac{2\pi nk}{N_{FFT}}} \right|^2 \quad (1)$$

Furthermore, to enhance the null tone detection accuracy, the normalized reception power obtained by dividing the reception power of the subcarrier by the reception power of the entire OFDM symbol may be used to determine whether or not the subcarrier is a null tone by the null tone determination unit 606. For example, the reception power calculation unit 605 can obtain normalized reception power of the k-th subcarrier in the null tone candidate position according to the following formula (2).

[Math. 2]

$$\frac{\left|\sum_{i=0}^{N_{FFT}-1} x(t)e^{-j\frac{2\pi nk}{N_{FFT}}}\right|^2}{2\pi \sum_{i=0}^{N_{FFT}-1} |x(t)|^2} \quad (2)$$

The advantages of the communication device 200 illustrated in FIG. 2 will be summarized here. Usually, in order to demodulate the OFDM signal and extract data, it is necessary to perform accurate time synchronization and frequency synchronization on the OFDM signal. In order to enhance the demodulation accuracy, the channel estimation and the phase correction are further required. Since such processing is normally executed by using the known pattern included in the preamble signal of the packet, with a configuration of a conventional wireless terminal, it is not possible or extremely difficult to acquire the control information from the middle of the packet without the preamble signal. On the other hand, the communication device 200 according to the present embodiment can determine whether or not each subcarrier is the null tone as long as the timing of the OFDM symbol can be specified, and the processing such as the advanced synchronization, the channel estimation, the phase correction, and the like necessary at the time of demodulation are unnecessary. Therefore, the communication device 200 can acquire the control information applied to the packet even when receiving a signal from the middle of the packet. Then, the communication device 200 can perform, for example, the packet transmission determination by the spatial reuse and the transmission parameter adjustment on the basis of the control information that can be acquired.

Subsequently, a specific wireless communication operation will be described.

Figure 11:
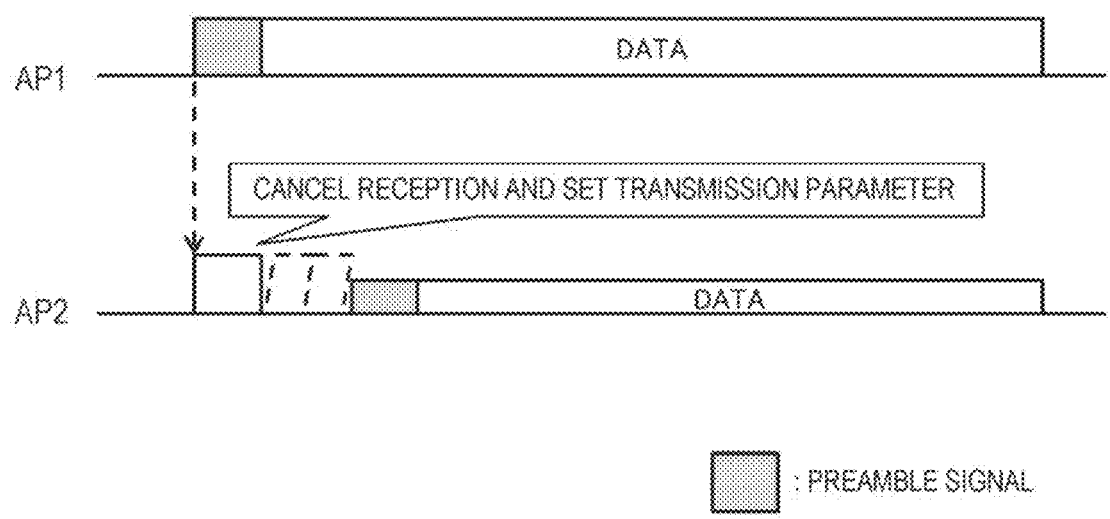
FIG. 11 is a diagram illustrating an exemplary communication sequence to perform spatial reuse under consideration in IEEE802.11ax.

In FIG. 11, an exemplary communication sequence for spatial reuse under consideration in IEEE802.11ax is illustrated. However, here, the wireless communication environment illustrated in FIG. 1 is assumed. Furthermore, the horizontal axis in FIG. 11 is a time axis, and a white rectangle on each axis indicates a frame transmitted from the communication device at the time corresponding to the position on the horizontal axis. Furthermore, a front end of a dotted arrow vertically extending from the frame indicates a destination of the frame. Furthermore, there is a case where a height of the rectangle indicating the frame expresses transmission power.

When the AP 1 starts to transmit a packet, the AP 2 receives a preamble signal in the packet transmitted from the AP 1 and acquires information regarding a spatial reuse operation described in the preamble signal (hereinafter, also referred to as "SR information"). As the SR information, for example, a BSS identifier is included. In a case where the AP 2 can determine that the packet is not a packet transmitted from a BSS to which the AP 2 belongs on the basis of the BSS identifier described in the preamble signal of the packet received from the AP 1, the AP 2 can terminate the reception of the packet.

Moreover, the AP 2 can calculate transmission power, transmission time, and the like that do not interfere with packet transmission of the AP 1 from the reception power of the packet from the AP 1 and other SR information (for example, transmission power of packet, duration information, and the like) and start to transmit a packet by using a set transmission parameter even during the packet transmission by the AP 1. In FIG. 11, a state is illustrated in which the AP 2 lowers the transmission power and transmits a data frame by spatial reuse.

With such spatial reuse technology, the AP 1 and the AP 2 can simultaneously transmit packets in a state where the transmission of the AP 1 does not affect the transmission of the AP 2. Therefore, it can be expected to improve throughput of a system by improvement in a transmission opportunity.

Figure 12:
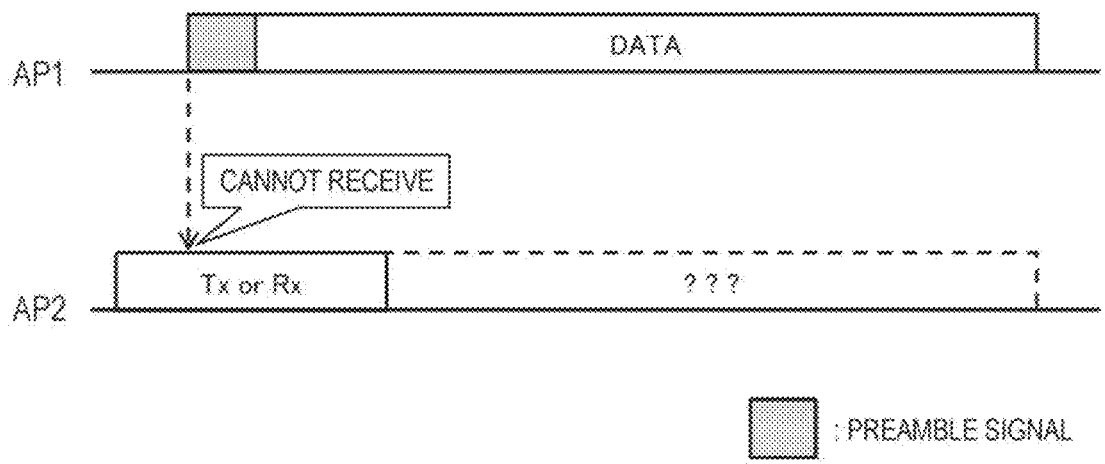
FIG. 12 is a diagram illustrating an exemplary communication sequence in which the spatial reuse cannot be performed on the basis of SR information described in a preamble signal.

In FIG. 12, an exemplary communication sequence in a case where the spatial reuse cannot be performed on the basis of the SR information described in the preamble signal is illustrated. However, here, the wireless communication environment illustrated in FIG. 1 is assumed. Furthermore, the horizontal axis in FIG. 11 is a time axis, and a white rectangle on each axis indicates a frame transmitted from the communication device at the time corresponding to the position on the horizontal axis. Furthermore, a front end of a dotted arrow vertically extending from the frame indicates a destination of the frame.

When receiving the packet transmitted from the AP 1, in order to determine whether or not the packet can be transmitted and determine a transmission parameter, it is necessary for the AP 2 to receive the preamble signal in the packet and acquire the SR information (as described above). However, in a case where the AP 2 executes other processing (for example, during packet transmission (Tx) or reception of other packet (Rx)) when the AP 1 starts to transmit the packet, the AP 2 cannot acquire the preamble signal of the packet transmitted from the AP 1. Furthermore, at the time of completing the other processing, the AP 2 misses the preamble signal of the transmission packet from the AP 1. Therefore, the AP 2 cannot acquire the SR information and cannot determine whether or not the transmission can be performed and cannot set the transmission parameter.

The AP 2 can recognize the packet transmitted from the AP 1 as an interference signal having no information. Therefore, the AP 2 can determine whether or not the transmission can be performed using an energy detection threshold at the time of completing the other processing. However, in a case where interference signal power caused by the transmission packet from the AP 1 is equal to or more than the energy detection threshold, the AP 2 cannot transmit a packet and loses an opportunity to perform the spatial reuse.

On the other hand, in a case where the interference signal power caused by the transmission packet from the AP 1 falls below the energy detection threshold, the AP 2 can transmit the packet by the spatial reuse. However, the AP 2 cannot recognize what kind of signal the interference signal is. Therefore, the AP 2 cannot appropriately adjust the transmission parameter and, for example, there is a possibility to start transmission with the maximum transmission power to interfere (prevent) the packet transmission of the AP 1. Therefore, when the AP 2 transmits a packet by the spatial reuse, the AP 2 needs to acquire the SR information and appropriately adjust the transmission parameter.

Note that, in the exemplary communication sequence illustrated in FIG. 12, after the AP 1 completes the transmission of the preamble signal, the AP 2 completes the transmission or the reception. However, even when the AP 2 has completed the transmission or the reception while the AP 1 is transmitting the preamble signal, the AP 2 similarly recognize the transmission packet from the AP 1 only as an interference signal.

In short, even when the AP 2 misses the reception of the preamble signal of the transmission packet from the AP 1, it is desirable to acquire the necessary SR information even from the middle of the packet. By acquiring the necessary SR information even from the middle of the packet, the AP 2 can increase the opportunities to perform the spatial reuse.

The communication device 200 according to the present embodiment transmits the packet that can transfer the necessary SR information even from the middle of the packet (not preamble signal) at the time of transmission. Furthermore, the communication device 200 according to the present embodiment can acquire the necessary SR information even from the middle of the packet when the reception of the preamble signal is missed at the time of reception. Therefore, by forming a wireless communication system by a wireless terminal having a device configuration illustrated in FIG. 2, it is possible to increase the opportunities to perform the spatial reuse in the entire system and improve the throughput.

Specifically, the communication device 200 according to the present embodiment, at the time of transmission, determines a subcarrier to be a null tone according to the SR information to be applied to the packet, generates an OFDM signal in which the determined subcarrier is set as the null tone, and performs packet communication. The SR information includes a BSS identifier, transmission time information, transmission power information, and uplink (UL)/downlink (DL) flags.

As a method for setting the position and the number of null tones, two patterns can be exemplified. One method is a method for fixing the null tone candidate position and makes the position and the number of actual null tones have information. Another method is a method for fixing the number of null tones and makes the position of the null tone have information.

According to the time-varying information, the positions or the number of null tones can be changed. A minimum unit of the null tone may be a single subcarrier or a plurality of subcarriers. Furthermore, in a case where there is a plurality of streams, the same subcarriers in the respective streams are set as the null tones. This is to prevent a situation in which the subcarriers overlaps due to the plurality of streams and the reception side cannot detect the null tone.

Furthermore, at the time of reception of the packet that transmits information by the null tone as described above, even when the communication device 200 according to the present embodiment cannot receive the preamble signal, the communication device 200 can obtain the SR information by detecting the OFDM signal of the packet by the simple synchronization, measuring the reception power of each subcarrier, and detecting the position and the number of null tones.

Here, when the communication device 200 obtains the SR information from the middle of the packet, the communication device 200 specifies a timing of the OFDM symbol by simple synchronization. Thereafter, when reception power of a specific subcarrier is measured, it is possible to normalize a plurality of symbols and measure the subcarrier reception power.

Furthermore, when the communication device 200 obtains the SR information from the middle of the packet, the null tone may be determined by using the reception power of each subcarrier according to any one of the following methods (a) and (b).

(a) Reception power measured in the subcarrier that is a null tone candidate is compared with a threshold, and it is determined that the null tone candidate is a null tone.

(b) A relative value between a reception power value measured in the subcarrier that is a null tone candidate and reception power measured in a subcarrier that is a reference tone (tone on which power is constantly applied) is compared with a threshold, and it is determined that the null tone candidate is a null tone.

(c) However, in a case where null tones more than the determined number are detected from the single OFDM symbol, it is determined that the null tone determination fails.

Figure 13:
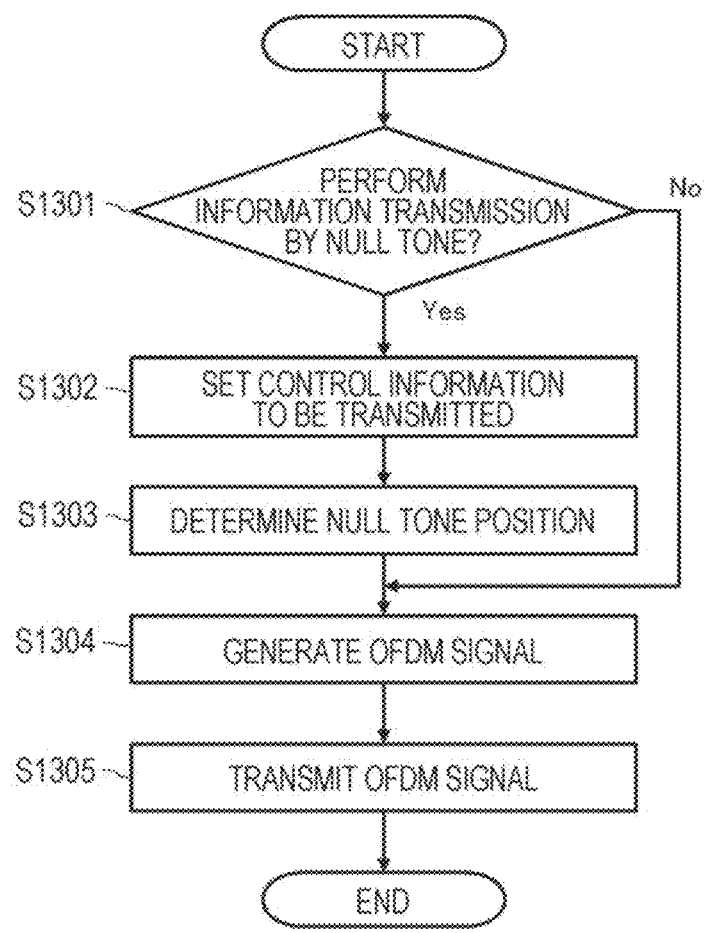
FIG. 13 is a flowchart illustrating an operation procedure at the time of transmission by the communication device 200.

An operation of the transmission unit 210 of the communication device 200 according to the present embodiment will be described. In FIG. 13, an operation procedure at the time of transmission by the communication device 200 is illustrated in a form of a flowchart.

First, the control unit 202 checks whether or not to perform information transmission by the null tone (step S1301).

Here, in a case where the information transmission by the null tone is performed (Yes in step S1301), the control unit 202 sets control information to be transmitted (step S1302). Then, the control unit 202 determines which subcarrier in the OFDM signal is set as the null tone, that is, the positions and the number of subcarriers to which the null tone is allocated (step S1303). When the control unit 202 desires to transmit the SR information by the null tone, the SR information is expressed by the positions and the number of subcarriers to which the null tone is allocated.

Next, the OFDM signal generator 211 generates an OFDM signal such that a subcarrier at the position determined by the control unit 202 is set as a null tone (step S1304). The configuration of the OFDM signal generator 211 that generates the OFDM signal including the null tone is as described above with reference to FIG. 3. Alternatively, in a case where it is determined not to perform the information transmission by the null tone (No in step S1301), the OFDM signal generator 211 generates an OFDM signal that does not include a null tone.

Then, the analog signal converter 212 DA converts the generated OFDM signal into an analog signal, and the RF transmission unit 213 up-converts the analog signal generated by the analog signal converter 212 into an RF signal and performs power amplification. Thereafter, the RF signal is emitted from an antenna into the air via the antenna sharing unit 201 as electromagnetic waves, and the OFDM signal is transmitted after back-off is completed (step S1305).

Note that, in the above step S1301, the control unit 202 may determine whether or not to perform the information transmission by the null tone by using, for example, a success rate of packet transmission, an acquisition rate of a preamble signal transmitted from other BSS, and the like as determination materials.

For example, when the success rate of the packet transmission is low, the communication device 200 can determine that a packet collision has occurred because a wireless terminal belonging to the other BSS does not acquire a preamble signal of a packet transmitted from the wireless terminal. In such a case, the communication device 200 determines to perform the information transmission by the null tone so that the wireless terminal belonging to the other BSS can acquire the necessary control information (for example, SR information) even from the middle of the packet transmitted from the wireless terminal.

Figure 14:
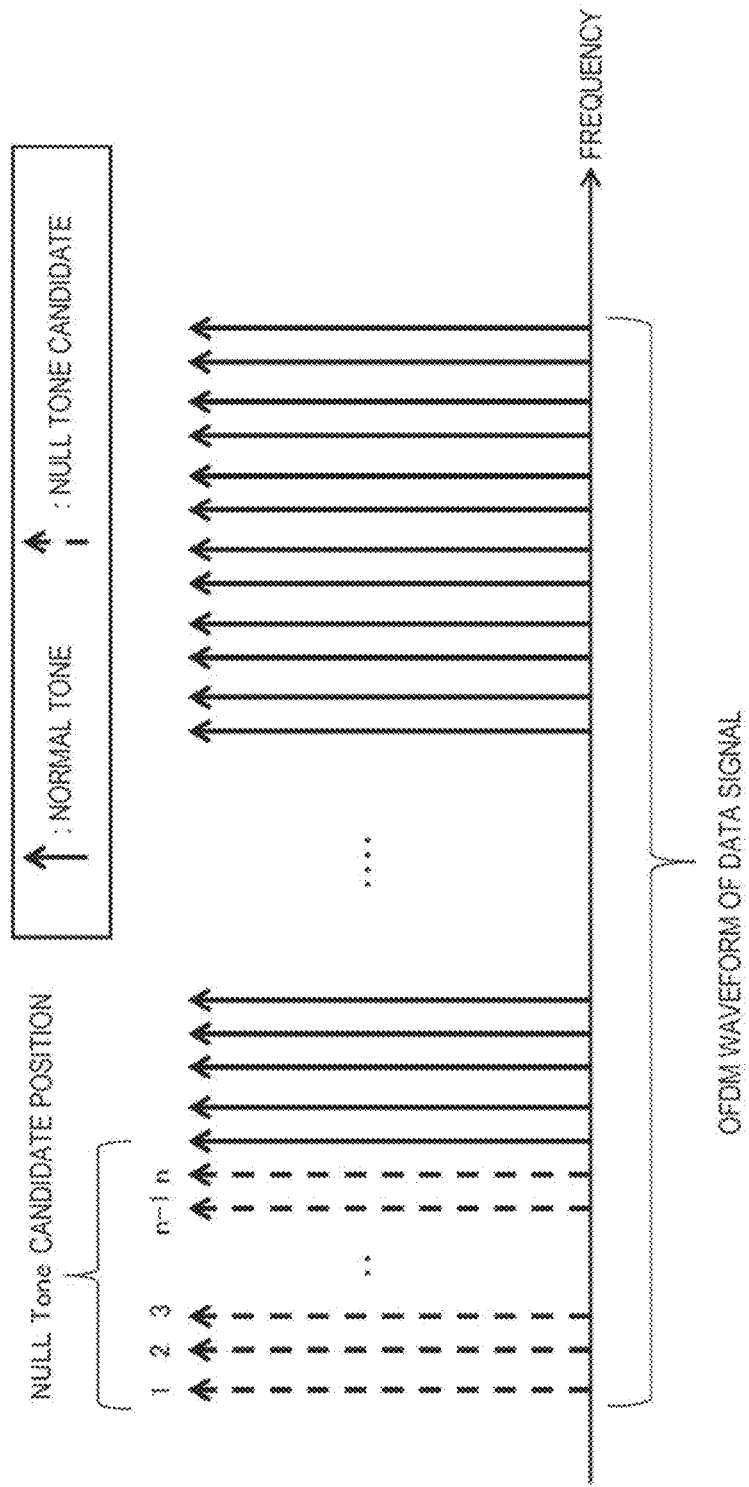
FIG. 14 is a diagram illustrating an example of a null tone candidate position in a first embodiment.

In FIG. 14, an example of the null tone candidate position according to the first embodiment is illustrated. However, the horizontal axis represents a frequency, and the vertical axis represents a power level. Furthermore, each vertical arrow in FIG. 14 indicates a tone signal on each subcarrier in the OFDM signal. A solid arrow represents a normal tone (subcarrier constantly used for data or pilot signal), and a dotted arrow represents a null tone candidate position (position of subcarrier that may be null tone used for information transmission). Furthermore, each of numbers 1 to n respectively attached to the dotted arrows in FIG. 14 means the position of the subcarrier in the null tone candidate positions.

In the example illustrated in FIG. 14, a range of a head subcarrier to an n-th subcarrier in the OFDM signal is allocated to the null tone candidate positions. That is, n null tone candidate positions are arranged in one place. Depending on whether or not each subcarrier at the null tone candidate position is a null tone, information corresponding to one bit can be transmitted. Here, in a case where all the n subcarriers are not null tones, conventional data transmission using the OFDM signal is not changed. Therefore, an information amount that can be transmitted by the null tone using n subcarriers is $2^n-1$ types.

In actual, the position of the subcarrier to be the null tone is determined on the basis of the information transmitted by the control unit 202. Then, the OFDM signal generator 211 generates an OFDM signal such that the subcarrier specified as the null tone by the control unit 202 (that is, tone signal having no power) is set as a null tone and a subcarrier other than that is set as a normal tone signal on which the data signal is provided as conventional.

In FIG. 15, an example of a relationship between the position of the null tone and the control information according to the present embodiment is illustrated. In FIG. 15, each piece of information to be transmitted is represented by a bit sequence ($b_1$ to $b_n$). Then, in a case where $b_k$="1" is transmitted, in a case where a k-th subcarrier in the null tone candidate position is allocated to the null tone and $b_k$="0" is transmitted, the OFDM signal is generated as setting the k-th subcarrier in the null tone candidate position as a normal tone signal.

In the example illustrated in FIG. 15, as the control information to be transmitted by the null tone, the SR information is exemplified such as a flag indicating presence or absence of null tone information, the BSS identifier (corresponding to six bits), remaining transmission time (corresponding to six bits), transmission power (corresponding to four bits), an UL/DL flag, and the like. These pieces of control information are respectively allocated to a first, a second to seventh, an eighth to 13th, a 14th to a 17th, and an 18th . . . subcarriers from among n subcarriers in the null tone candidate positions. It can be said that FIG. 15 is an example in which the single piece of the control information to be transmitted is expressed by a relationship between the positions and the number of subcarriers to which the null tones are allocated.

When determining content of each piece of control information, the control unit 202 expresses the determined control information by the bit sequence ($b_1$ to $b_n$). Then, the OFDM signal generator 211 generates an OFDM signal by allocating the position of the subcarrier corresponding to a bit position to be "1" in the bit sequence to the null tone in the null tone candidate position and setting the position of the subcarrier corresponding to a bit position to be "0" in the same bit sequence as a normal tone signal.

Note that, in FIG. 15, as the control information to be transmitted by the null tone, the SR information such as the presence or absence of the null tone information, the BSS identifier, the remaining transmission time, the transmission power, the UL/DL flag, and the like is exemplified. However, the control information is not limited to this.

For example, the flag indicating whether or not the null tone information exists may be replaced with information such as Capability. Furthermore, if there is necessary SR information other than the BSS identifier, the remaining transmission time, the transmission power, and the UL/DL flag, the information transmission by the null tone may be similarly executed. As the SR information other than the information illustrated in FIG. 15, for example, a packet destination, interfered power at a reception destination, and the like can be exemplified.

Furthermore, in the example illustrated in FIG. 15, the final subcarrier in the null tone candidate positions is allocated to a parity bit that is a simple error detection code. If more null tones can be used for error detection or correction on the control information to be transmitted, the parity bit may be replaced with an advanced error correction code such as cyclic redundancy check (CRC). Furthermore, the control information to be transmitted by the null tone is not limited to the information included in the preamble signal. Of course, various control information other than the SR information can be transmitted by using the null tone.

The remaining transmission time of the control information transmitted by the null tone illustrated in FIG. 15 is a time-varying parameter. However, the flag indicating the presence or absence of the null tone information, the BSS identifier, the transmission power, and the UL/DL flag are fixed parameters. Furthermore, the parity bit changes according to the change of the time-varying parameter. When any control information changes with time in the middle of the packet, a subcarrier corresponding to the control information is switched from the null tone to the normal tone or from the normal tone to the null tone in the middle of the packet.

In FIG. 16, an example of temporal variation of subcarriers according to the present embodiment is illustrated. However, in FIG. 16, the horizontal axis indicates time, and the vertical axis indicates a frequency. Furthermore, in FIG. 16, a data signal portion after the preamble signal is represented, an one square represents a single subcarrier in each OFDM symbol. It is assumed that the control unit 202 of the communication device 200 determine the positions and the number of null tones in the subcarrier in the null tone candidate positions as illustrated, at the time of transmitting the packet.

In the example illustrated in FIG. 16, since the information transmission by the null tone is performed, a first subcarrier in the null tone candidate positions is set as a null tone, and $b_1$="1" is expressed. Moreover, in a case where it is desired to send information "011000" as the BSS identifier, the null tones are allocated to the fifth and the sixth subcarriers among the second to the seventh subcarriers. Furthermore, in a case where it is desired to send information "1001" as the transmission power information, the null tones are allocated to the 14th and 17th subcarriers among the 14th to the 17th subcarriers. Furthermore, in a case where it is desired that the UL/DL flag indicates the UL, the 18th subcarrier is set as the null tone, and $b_{18}$="1" is expressed. Then, regarding these parameters that do not time-vary, the subcarrier to be the null tone is fixed, and the OFDM signal is generated.

On the other hand, regarding information of which the value changes during the packet transmission as the remaining transmission time information, the position of the subcarrier to be the null tone is changed for each certain period. In the example illustrated in FIG. 16, only the 10th subcarrier in the null tone candidate positions is set as the null tone as representing the information "000100" first. However, since the information is changed to "000011" obtained by countdown the information by one at a timing of remaining transmission time information change, the 10th subcarrier is changed to the normal tone signal, and the eighth and the ninth subcarriers are changed to the null tones. Furthermore, the error correction code such as a parity bit is changed according to the temporal variation of the control information, and the N-th subcarrier allocated to transmit the parity bit is changed from the null tone to the normal tone or from the normal tone to the null tone.

Figure 17:
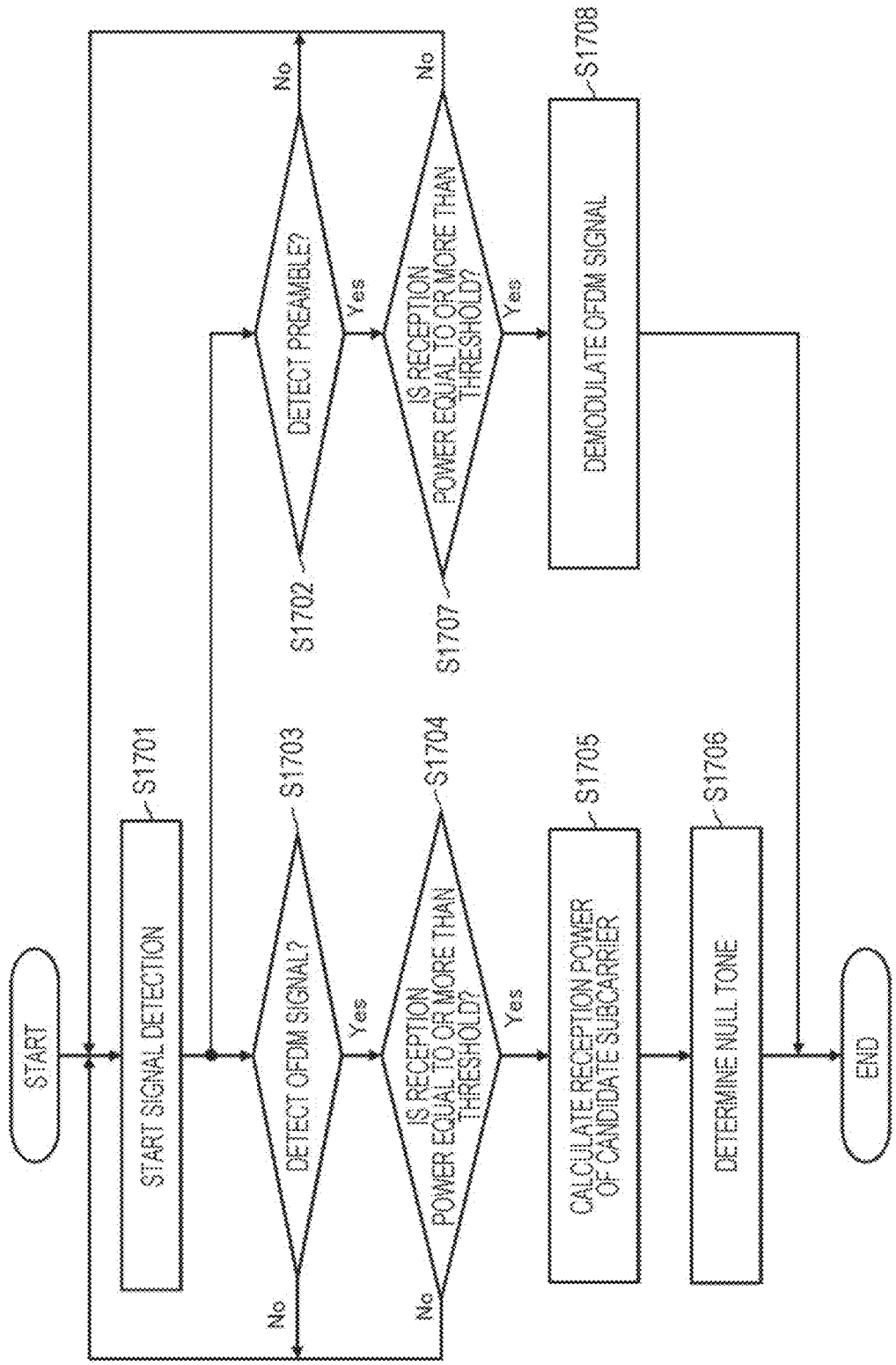
FIG. 17 is a flowchart illustrating an operation procedure at the time of reception by the communication device 200.

Subsequently, an operation of the reception unit 220 of the communication device 200 according to the present embodiment will be described. In FIG. 17, an operation procedure at the time of reception by the communication device 200 is illustrated in a form of a flowchart.

When the reception unit 220 starts to detect a signal (step S1701) and an antenna reception signal is input via the antenna sharing unit 201, the RF reception unit 221 executes processing such as down-conversion, low-noise amplification, and the like, and subsequently, the digital signal converter 222 AD converts an analog received signal into a digital signal. Then, the OFDM signal demodulator 223 starts to perform conventional detection of the preamble signal (step S1702).

In a case where the OFDM signal demodulator 223 can detect the preamble signal from the received signal (Yes in step S1702) and determines that reception power is equal to or more than a reception power threshold of the preamble signal (Yes in step S1707), the OFDM signal demodulator 223 starts to demodulate the OFDM signal as in a conventional operation (step S1708). Then, the demodulation result is output to the control unit 202. On the other hand, in a case where the preamble signal cannot be detected from the received signal (No in step S1702) and in a case where the reception power of the preamble signal is less than the threshold although the preamble signal can be detected (No in step S1707), the procedure returns to step S1701, and signal detection processing is repeatedly executed.

Furthermore, in the reception unit 220, simultaneously with processing by the OFDM signal demodulator 223 (or in parallel), the null tone detector 224 starts to detect the OFDM signal (step S1703).

In step S1703, the simple time synchronization processor 601 and the simple frequency synchronization processor 602 in the null tone detector 224 detect a timing of the OFDM symbol by using the autocorrelation of the guard interval as described above. When the OFDM symbol is successfully detected (Yes in step S1703), the null tone detector 224 checks whether or not the reception power is equal to or more than the threshold (step S1704).

In a case where the reception power is equal to or more than the threshold (Yes in step S1704), the reception power calculation unit 605 in the null tone detector 224 calculates reception power at the position of the subcarrier necessary for acquiring the control information (that is, subcarrier in range of null tone candidate position) (step S1705), and in addition, the null tone determination unit 606 in the null tone detector 224 determines whether or not each subcarrier is a null tone (step S1706). Then, the determination result regarding the null tone is output to the control unit 202.

Furthermore, the procedure returns to step S1701. In a case where the simple time synchronization processor 601 and the simple frequency synchronization processor 602 in the null tone detector 224 cannot detect the OFDM signal (No in step S1703) and in a case where the reception power is less than the threshold although the OFDM signal can be detected (No in step S1704), the signal detection processing is repeatedly executed.

Figure 18:
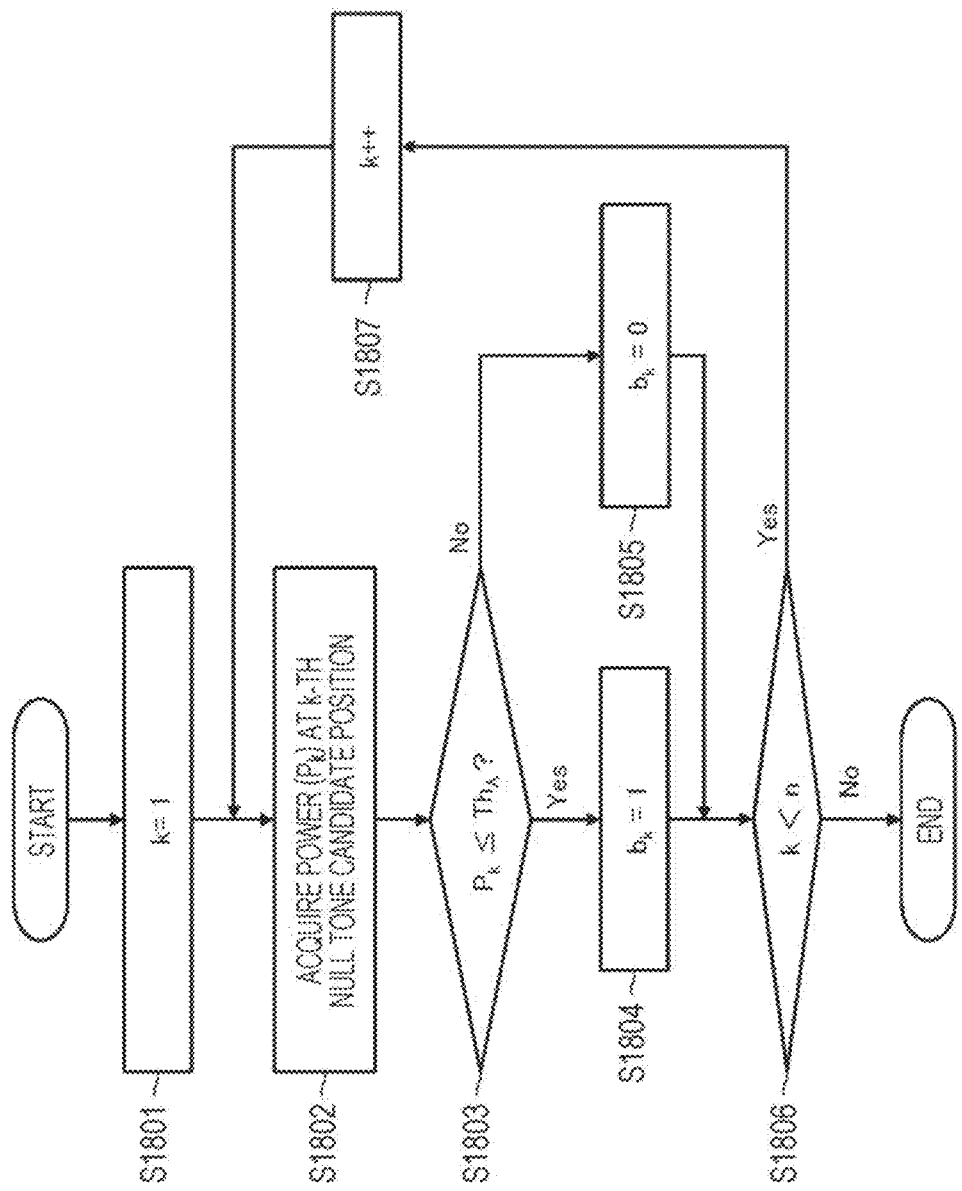
FIG. 18 is a flowchart illustrating a processing procedure for determining the null tone.

In FIG. 18, a processing procedure to determine the null tone executed by the null tone determination unit 606 in the null tone detector 224 in step S1706 in the flowchart illustrated in FIG. 17 is illustrated in a form of a flowchart. However, in FIG. 18, the reference n indicates the number of subcarriers that are null tone candidates, and the reference $Th_A$ indicates a threshold of power used for null tone determination (subcarrier of which reception power is lower than power threshold $Th_A$ is determined as null tone).

First, a variable k is set to an initial value 1 (step S1801). Then, the null tone determination unit 606 acquires reception power $P_k$ of the k-th subcarrier in the null tone candidate positions from information of the reception power of each subcarrier to be a null tone candidate calculated in preceding step S1705 (step S1802) and compares the reception power $P_k$ with the power threshold $Th_A$ (step S1803).

In a case where the reception power $P_k$ is equal to or less than the power threshold $Th_A$ (Yes in step S1803), the null tone determination unit 606 determines the k-th subcarrier in the null tone candidate positions as a null tone and obtains information that the k-th bit in the bit sequence $b_k$=1 (step S1804).

On the other hand, in a case where the reception power $P_k$ is higher than the power threshold $Th_A$ (No in step S1803), the null tone determination unit 606 determines the k-th subcarrier in the null tone candidate positions as a normal tone and obtains that the k-th bit in the bit sequence $b_k$=0 (step S1805).

Then, the null tone determination unit 606 checks whether or not k is less than the number n of subcarriers that are the null tone candidates (step S1806). In a case where k is less than the number n of subcarriers that are the null tone candidates (Yes in step S1806), after incrementing k by only one (step S1807), it is determined whether or not a next subcarrier in the null tone candidate is a null tone according to processing similar to the above processing.

In this way, the null tone determination unit 606 executes null tone determination processing on all the subcarriers (1 to n) in the null tone candidate (No in step S1806) and extracts the result as information regarding a bit sequence in which each of $b_1$ to $b_n$ is one of "1" or "0". Such a determination result by the null tone determination unit 606 is sent to the control unit 202. Then, the control unit 202 converts the extracted information regarding the bit sequences $b_1$ to $b_n$ into each piece of the control information illustrated in FIG. 15.

Note that, as in the example illustrated in FIG. 15, in a case where the flag indicating whether or not the packet performs the information transmission by the null tone is provided in the information regarding the bit sequences $b_1$ to $b_n$, the null tone determination unit 606 may perform the null tone determination on only a subcarrier corresponding to the flag at the time of starting the processing procedure illustrated in FIG. 18, read a value of the bit, and confirm whether or not the packet performs the information transmission by the null tone. Then, in a case where the flag is not set (specifically, $b_1$=0) and it is found that the packet is not the packet that performs the information transmission by the null tone, calculation of the reception power of the other subcarrier that is the null tone candidate and the null tone determination processing illustrated in FIG. 18 may be skipped.

Figure 19:
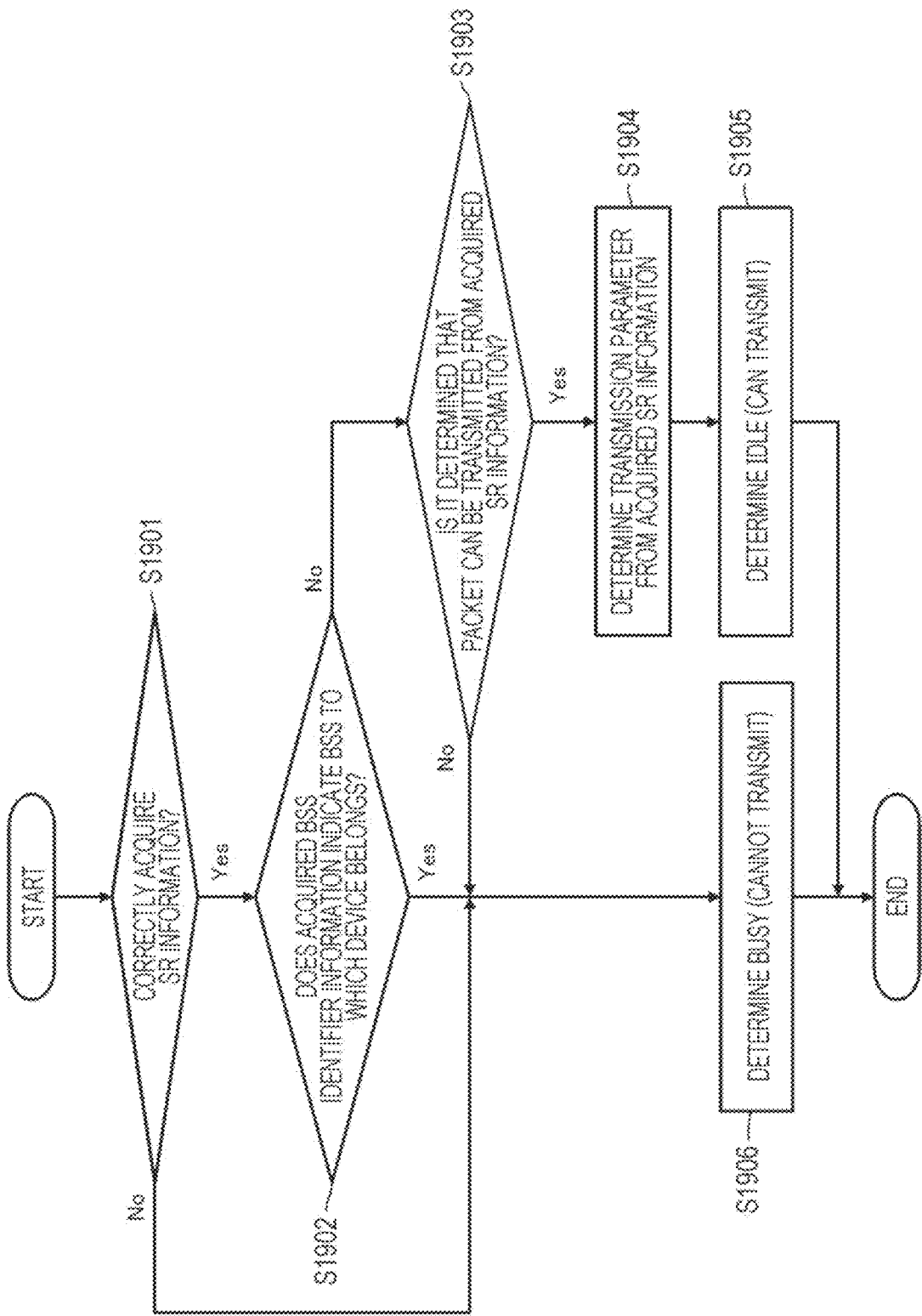
FIG. 19 is a flowchart illustrating a processing procedure to perform a spatial reuse operation by the communication device 200 by using control information transmitted from another wireless terminal by using a null tone.

In FIG. 19, a processing procedure to perform a spatial reuse operation by the communication device 200 according to the present embodiment by using the control information transmitted from the other wireless terminal by the null tone is illustrated in a form of a flowchart. The illustrated processing procedure is performed mainly by the control unit 202.

First, the control unit 202 checks whether or not the SR information can be correctly acquired from the detection result by the null tone detector 224 (step S1901). Specifically, the control unit 202 checks whether or not the head subcarrier in the null tone candidate positions in the OFDM signal is a null tone (that is, $b_1=1$) and whether or not it is indicated that the information transmission by the null tone is performed (however, in a case where similar check has been made by null tone determination unit 606 has checked, this check may be omitted in control unit 202). Then, the control unit 202 performs parity check on the bit sequences $b_1$ to $b_n$ extracted by the null tone determination unit 606 by using the parity bit extracted from the subcarrier at the end of the null tone candidate positions so as to check whether or not the SR information can be correctly acquired.

In a case where the SR information can be correctly acquired from the null tone in the OFDM signal (Yes in step S1901), the control unit 202 checks whether or not the receiving packet coincides with the BSS to which the device belongs by using the BSS identifier included in the acquired SR information (step S1902).

In a case where the BSS identifier indicated by the SR information does not coincide with the BSS to which the device belongs (No in step S1902), the received packet is an OBSS signal arrived from other BSS (OBSS), and there is a possibility that the packet can be transmitted by the spatial reuse. Therefore, the control unit 202 determines whether or not the packet can be transmitted by the spatial reuse by using the other SR information (remaining transmission time, transmission power, UL/DL flag, and the like) (step S1903).

In a case where the control unit 202 determines that the SR packet can be transmitted (Yes in step S1903), the control unit 202 sets an appropriate transmission parameter (transmission power, packet length, and the like) of the SR packet by using the SR information acquired from the information transmitted by the null tone (step S1904).

Then, the control unit 202 shifts the state of the communication device 200 to an IDLE state (radio wave is not used) and restarts the backoff (step S1905). When the backoff ends, the control unit 202 instructs the transmission unit 210 to transmit the SR packet.

On the other hand, in a case where it is determined that the SR information cannot be correctly acquired from the detection result by the null tone detector 224 (for example, in a case where acquisition of information by null tone has failed and in a case where parity check has failed) (No in step S1901), in a case where it is determined that the received OFDM signal coincides with the BSS to which the device belongs (Yes in step S1902), or in a case where it is determined that the SR packet cannot be transmitted on the basis of the acquired SR information (transmission power, UL/DL flag, and the like) although the OBSS signal is received (No in step S1903), the control unit 202 shifts the state of the communication device 200 to a BUSY state (radio waves are used) (step S1906) and waits until the transmission of the packet ends.

Of course, the control unit 202 can perform the similar spatial reuse operation on the basis of the SR information that is described in the preamble signal of the received packet and is obtained by the OFDM signal demodulator 223 as in a conventional way by the OFDM signal demodulator 223, not the control information transmitted by the null tone.

Figure 20:
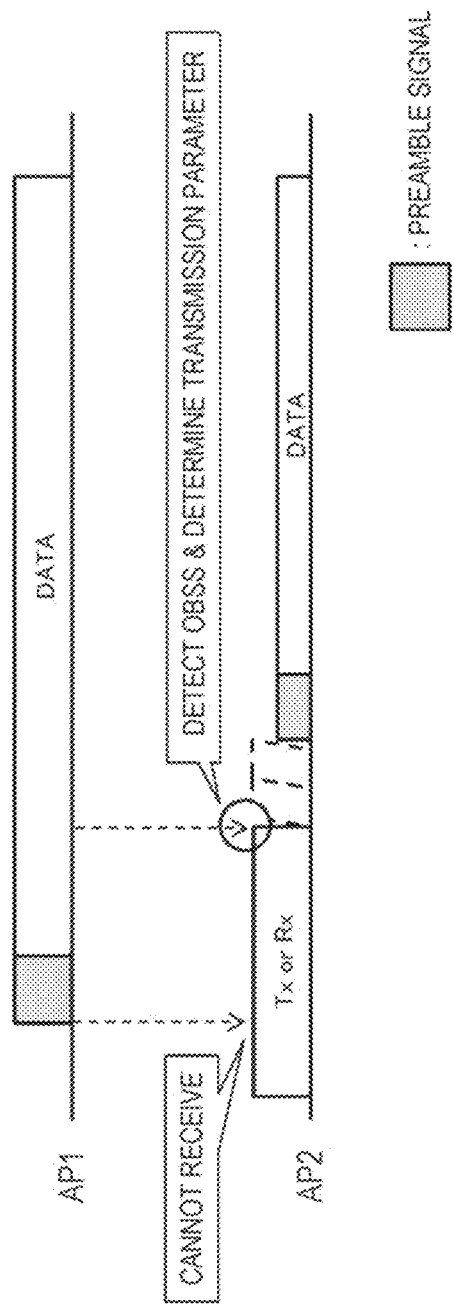
FIG. 20 is a diagram illustrating an exemplary communication sequence in which the space can be reused by using the control information acquired by the null tone.

In FIG. 20, an exemplary communication sequence in which the space can be reused by using the control information acquired by the null tone is illustrated. However, here, the wireless communication environment illustrated in FIG. 1 is assumed. Furthermore, the horizontal axis in FIG. 11 is a time axis, and a white rectangle on each axis indicates a frame transmitted from the communication device at the time corresponding to the position on the horizontal axis. Furthermore, a front end of a dotted arrow vertically extending from the frame indicates a destination of the frame. Furthermore, there is a case where a height of the rectangle indicating the frame expresses transmission power.

When receiving the packet transmitted from the AP 1, in order to determine whether or not the packet can be transmitted and determine a transmission parameter, it is necessary for the AP 2 to receive the preamble signal in the packet and acquire the SR information (as described above). In the example illustrated in FIG. 20, since the AP 2 is executing other processing (for example, during packet transmission (Tx) or packet reception (Rx)) when the AP 1 starts to transmit the packet, the AP 2 cannot acquire the preamble signal of the packet transmitted from the AP 1. Furthermore, at the time of completing the other processing, the AP 2 misses the preamble signal of the transmission packet from the AP 1. Therefore, the AP 2 cannot acquire the SR information from the preamble signal of the transmission packet of the AP 1.

However, unlike the exemplary communication sequence illustrated in FIG. 12, the AP 2 can acquire the SR information on the basis of the arrangement of the subcarriers allocated to the null tones in the OFDM signal (DATA portion of packet) received from the AP 1. Therefore, the AP 2 can detect the transmission packet from the AP 1 (that is, OBSS signal from other BSS) according to the reception power of the packet from the AP 1 and the SR information acquired from the null tone detected from the OFDM signal (DATA portion of packet).

Then, the AP 2 can calculate the transmission parameter such as the transmission power and the transmission time that does not interfere with the packet transmission of the AP 1 and start to transmit the packet (hereinafter, also referred to as "SR packet") using the spatial reuse by using the set transmission power even during the packet transmission by the AP 1. In FIG. 20, a state is illustrated in which the AP 2 lowers the transmission power and transmits a data frame by spatial reuse.

In short, according to the technology disclosed herein, the communication device 200 that operates as the wireless terminal such as an AP, by detecting the OFDM signal even from the middle of the packet transmitted from other station, can determine whether or not the transmission by using the spatial reuse can be performed and can acquire the SR information necessary for setting the transmission parameter for the spatial reuse, and it is possible to enhance an effect of the spatial reuse technology.

Second Embodiment

In a second embodiment, a null tone candidate position setting and a null tone determination method different from those of the first embodiment will be described.

In wireless communication, there is a problem in that frequency selective fading in which effects of fading vary for each frequency component due to multipath and the like occurs and reception quality deteriorates.

In the first embodiment, the ranges of the subcarriers to be allocated to the null tones, that is, the null tone candidate positions are collectively arranged in one place (for example, refer to FIG. 15), and the reception side compares an absolute value of the reception power of each subcarrier with the power threshold $Th_A$ and determines the null tone. However, when the reception power of the subcarrier largely varies for each frequency component due to the effect of the frequency selective fading and the like, with such a null tone determination method, the null tone cannot be accurately detected. As a result, a possibility increases that the control information cannot be extracted from the null tone.

Figure 21:
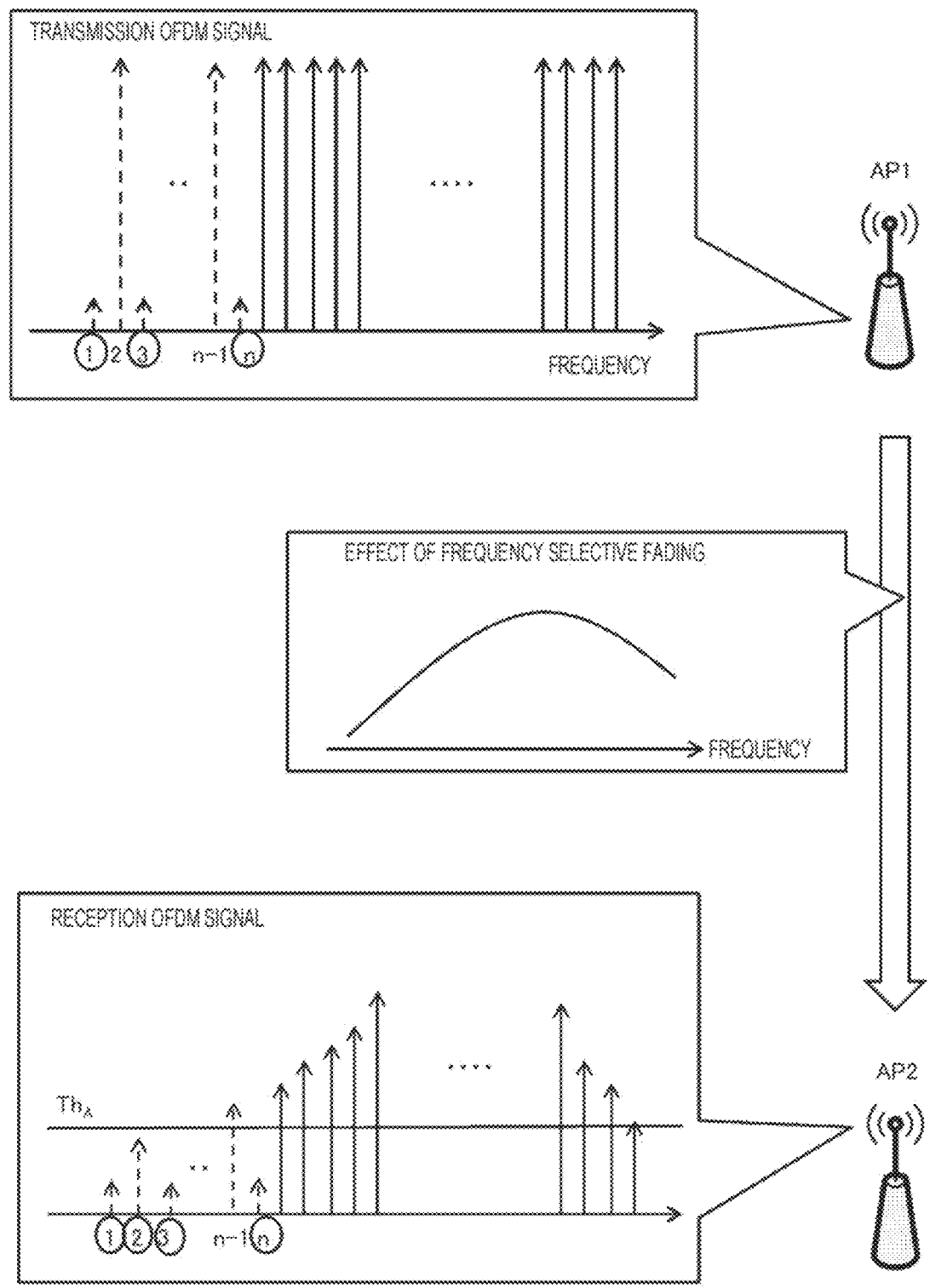
FIG. 21 is a diagram exemplifying an OFDM transmission/reception signal in which a null tone is arranged in a case of being affected by frequency selective fading.

In FIG. 21, an OFDM signal, in which a null tone is arranged, transmitted from an AP 1 and an OFDM signal received by an AP 2 after the frequency selective fading occurs in a propagation path are illustrated. However, regarding each OFDM signal transmitted by the AP 1 and the OFDM signal received by the AP 2 in FIG. 21, a normal tone (subcarrier constantly used in data or pilot signal) is indicated by a solid arrow, and a subcarrier in a null tone candidate position is indicated by a dotted arrow. Furthermore, the vertical axis represents a power level.

In the example illustrated in FIG. 21, an OFDM signal in which a first, a third, . . . , and an n-th subcarriers of the subcarriers in the null tone candidate positions are allocated to null tones is transmitted from the AP 1. In the propagation path between the AP 1 and the AP 2, the frequency selective fading in which a lower frequency side of a frequency band to be used attenuates occurs, and reception power of a subcarrier on the lower frequency side transmitted as a normal tone signal is greatly lowered. For example, a case occurs in which, even though a subcarrier is not the null tone as the second subcarrier in the null tone candidate positions, reception power falls below the absolute power threshold $Th_A$ for null tone detection, and the null tone is wrongly determined. As a result, the AP 2 cannot correctly acquire the control information from the middle of the transmission packet of the AP 1.

In the first embodiment, a subcarrier at the end of the null tone candidate positions is used as a parity bit (refer to FIG. 15). Even if a single subcarrier is wrongly determined, it can be avoided to acquire wrong control information by detecting an error by using the parity bit. However, when wrong determination occurs on the plurality of subcarriers, the wrong determination cannot be detected unless a more advanced error correction code is used, and there is a possibility that a necessary information amount becomes enormous.

In other words, not limited to the frequency selective fading, for example, in a case where other signal is input as noise, and the like, there is constantly a risk of wrongly determining a null tone due to various external factors.

Therefore, in the second embodiment, a method will be introduced for arranging a reference tone to be a relative determination reference of the reception power at the time when the null tone in the null tone candidate position is determined. When the null tone is determined, by comparing the reception power of the subcarrier with a relative threshold $Th_R$ based on reception power of the reference tone in addition to comparing the reception power of the subcarrier with the absolute power threshold $Th_A$, it is possible to reduce an effect of variation in the reception power due to the external factors. However, it is assumed that the reference tone be a tone signal (subcarrier) having power.

Figure 22:
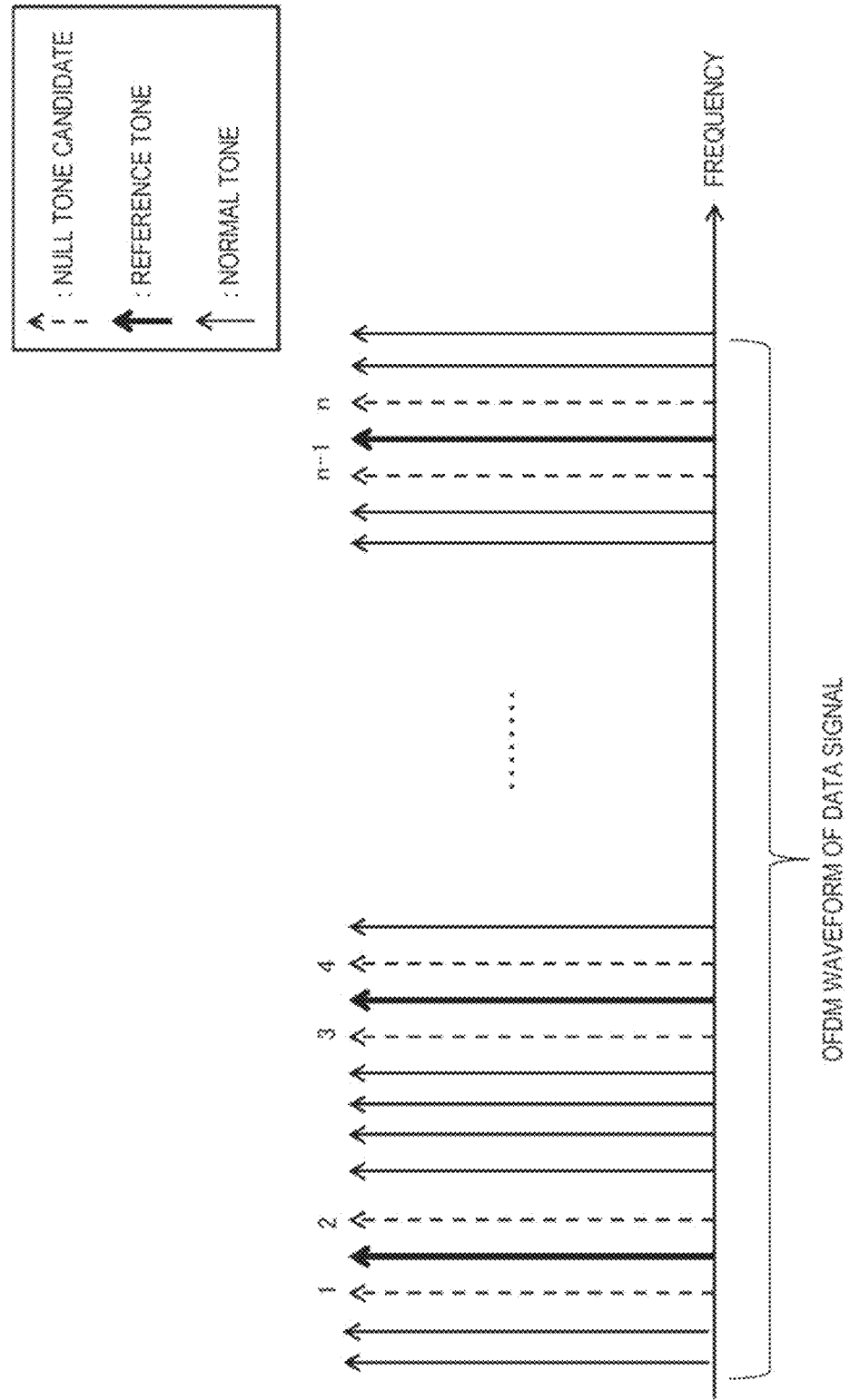
FIG. 22 is a diagram illustrating an example of a null tone candidate position including a reference tone.

In FIG. 22, an exemplary configuration of the subcarrier at the null tone candidate position including the reference tone according to the second embodiment is illustrated. An arrow in FIG. 22 indicates a tone signal on each subcarrier in an OFDM signal. A solid arrow represents a normal tone (subcarrier constantly used for data or pilot signal), and a dotted arrow represents a null tone candidate position (position of subcarrier that may be null tone used for information transmission). Each of numbers 1 to n respectively attached to the dotted arrows in FIG. 22 means the position of the subcarrier at the null tone candidate position. Furthermore, a thick solid arrow represents the reference tone. Furthermore, the vertical axis represents a power level. The reference tone is a subcarrier intended to be used as the relative determination reference of the reception power and a tone signal having power.

In the example illustrated in FIG. 14, n null tone candidate positions are arranged in one place. On the other hand, in the example illustrated in FIG. 22, n null tone candidate positions are dispersedly arranged in the OFDM signal, and the reference tone is arranged near each subcarrier in the null tone candidate position (or adjacent to each subcarrier in null tone candidate position). In the illustrated example, the reference tones are arranged between the first and the second null tone candidate positions, between the third and the fourth null tone candidate positions, . . . , and between the (n−1)-th and the n-th null tone candidate positions. It can be also said that the null tone candidate positions are arranged on both sides of each reference tone.

Although the reference tone is a tone signal (subcarrier) constantly having power, a pilot signal may be used as a reference tone. Of course, the reference tone may be arranged at a place other than the pilot signal.

Arrangement of the null tone candidate positions and the reference tones is not limited to the example illustrated in FIG. 22. For example, it is sufficient that the reception power of the reference tone and the reception power of the null tone candidate position have a positional relationship in which each reception power does not greatly fluctuate due to the frequency selective fading.

Note that, the second embodiment is different from the first embodiment in the method for determining the position where the null tone is arranged at the time when the OFDM signal, in which the null tone is arranged, is transmitted (that is, processing operation for determining arrangement of null tone by control unit 202) and a method for determining the null tone when the OFDM signal, in which the null tone is arranged, is received (that is, processing operation for determining null tone by null tone detector 224). However, other points are similar to those in the first embodiment.

Figure 23:
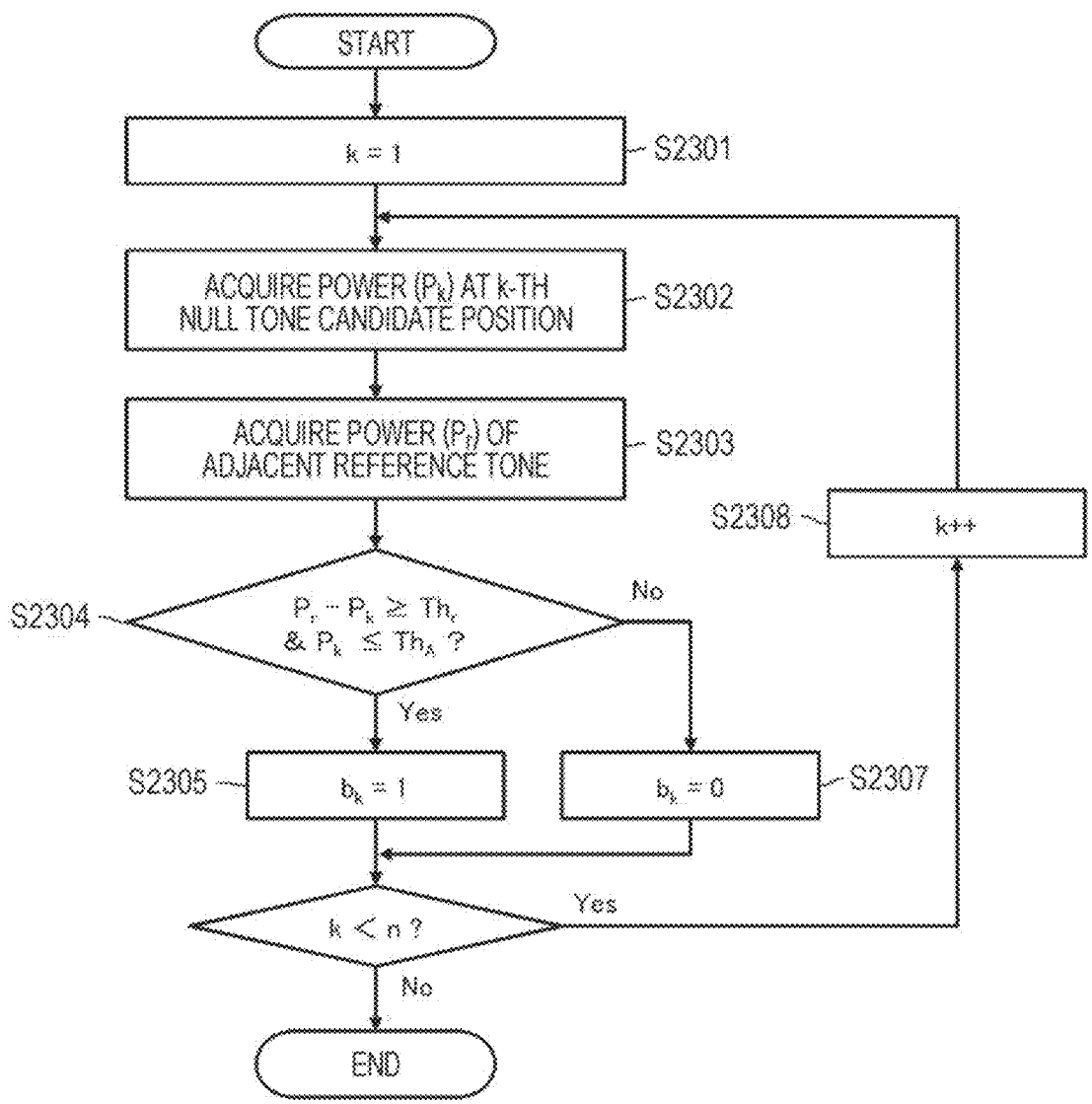
FIG. 23 is a flowchart illustrating a processing procedure for determining a null tone by using the reference tone.

In FIG. 23, a processing procedure for determining a null tone by using the reference tone according to the second embodiment is illustrated in a form of a flowchart. The illustrated processing procedure is performed by a null tone determination unit 606 in the null tone detector 224 at the time when a communication device 200 receives a packet. However, in FIG. 23, the reference n indicates the number of subcarriers that are null tone candidates, and the reference $Th_A$ indicates an absolute power threshold used for null tone determination. The reference $Th_r$ indicates a power threshold used to relatively compare the reception power of the null tone candidate position with the reception power of the reference tone.

First, a variable k is set to an initial value 1 (step S2301). Then, the null tone determination unit 606 acquires reception power $P_k$ of a k-th subcarrier in the null tone candidate positions from information of the reception power of each subcarrier to be a null tone candidate, that has been already calculated, (step S2302) and subsequently acquires reception power $P_r$ of a reference tone near the k-th subcarrier in the null tone candidate position (step S2303).

Then, the null tone determination unit 606 compares a difference $(P_r-P_k)$ between the reception power $P_r$ of the reference tone and the reception power $P_k$ of the null tone candidate position with the power threshold $Th_r$ and compares the reception power $P_k$ of the null tone candidate position with the power threshold $Th_A$ (step S2304).

In a case where the difference $(P_r-P_k)$ between the reception power $P_r$ of the reference tone and the reception power $P_k$ of the null tone candidate position is equal to or more than the power threshold $Th_r$ and the reception power $P_k$ is equal to or less than the power threshold $Th_A$ (Yes in step S2304), the null tone determination unit 606 determines the k-th subcarrier in the null tone candidate position as a null tone and obtains information that the k-th bit in a bit sequence $b_k=1$ (step S2305).

On the other hand, one of threshold determination conditions that the difference $(P_r-P_k)$ between the reception power $P_r$ of the reference tone and the reception power $P_k$ of the null tone candidate position is equal to or more than the power threshold $Th_r$ and the reception power $P_k$ is equal to or less than the power threshold $Th_A$ is not satisfied (No in step S2304), the null tone determination unit 606 determines the k-th subcarrier in the null tone candidate position as a normal tone and obtains information that the k-th bit in the bit sequence $b_k=0$ (step S2307).

Then, the null tone determination unit 606 checks whether or not k is less than the number n of subcarriers that are the null tone candidates (step S2306). In a case where k is less than the number n of subcarriers that are the null tone candidates (Yes in step S2306), after incrementing k by only one (step S2308), it is determined whether or not a next subcarrier in the null tone candidate is a null tone according to processing similar to the above processing.

In this way, the null tone determination unit 606 executes processing on all the subcarriers (1 to n) in the null tone candidate (No in step S2306) and extracts the result as information indicating that each of $b_1$ to $b_n$ is "1" or "0". The determination results are sent to the control unit 202. Then, the control unit 202 converts the extracted information regarding the bit sequences $b_1$ to $b_n$ into, for example, each piece of the control information illustrated in FIG. 15.

Note that, as in the example illustrated in FIG. 15, in a case where a flag indicating whether or not the packet performs the information transmission by the null tone is provided in the information regarding the bit sequences $b_1$ to $b_n$, the null tone determination unit 606 may perform the null tone determination on only a subcarrier corresponding to the flag first, read a value of the bit, and confirm whether or not the information transmission by the null tone is performed. Then, in a case where the flag is not set (specifically, $b_1=0$) and it is found that the packet is not the packet that performs the information transmission by the null tone, calculation of the reception power of the other subcarrier that is the null tone candidate and the reception power of the reference tone and null tone determination may be skipped.

Figure 24:
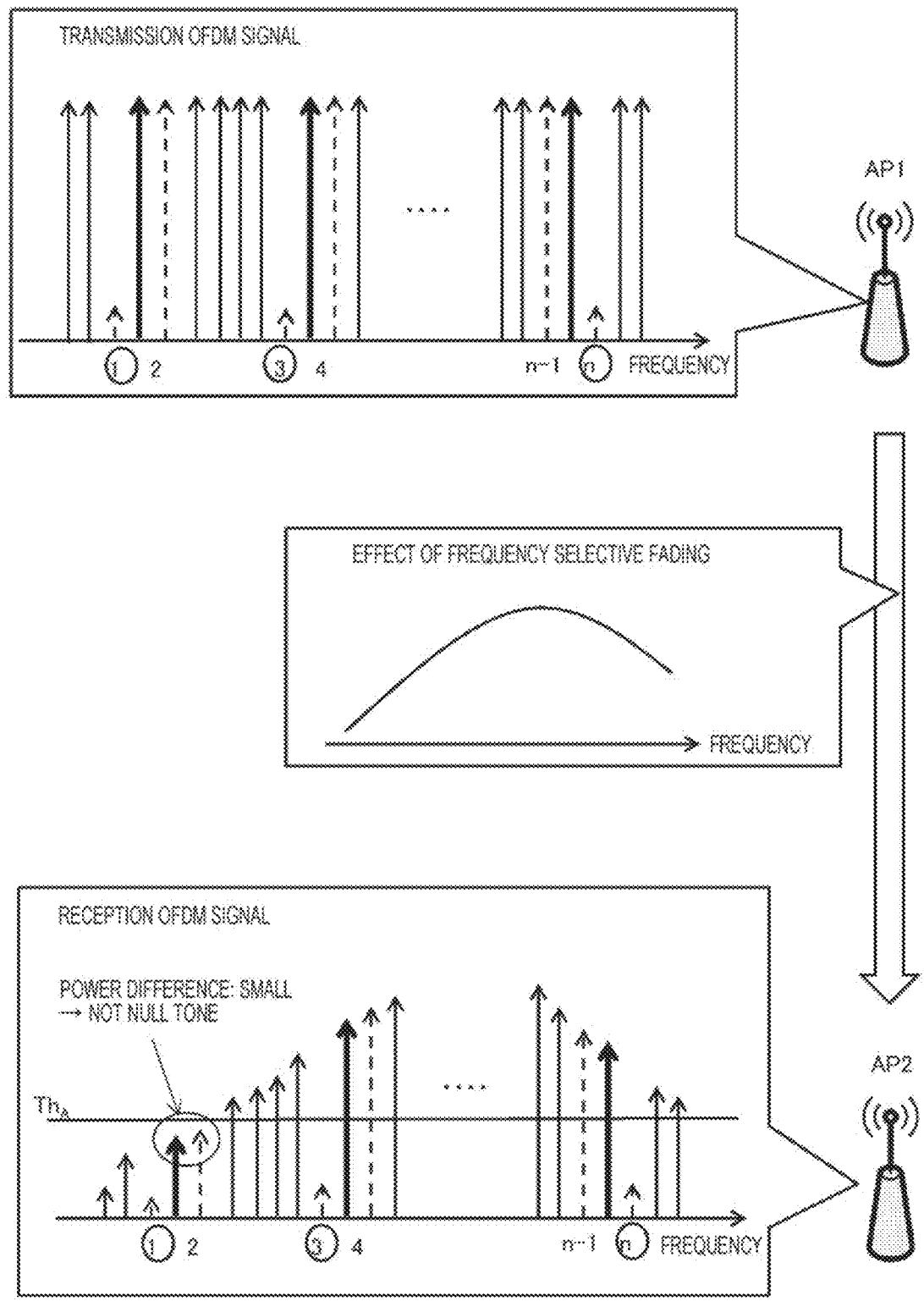
FIG. 24 is a diagram exemplifying an OFDM transmission/reception signal in which a null tone and a reference tone are arranged in a case of being affected by the frequency selective fading.

In FIG. 24, an OFDM signal, in which a null tone is arranged, transmitted from the AP 1 and an OFDM signal received by the AP 2 after the frequency selective fading occurs in the propagation path are illustrated. However, FIG. 24 illustrates an example in which the reference tone is arranged in the OFDM signal. Furthermore, regarding each of the OFDM signal transmitted by the AP 1 and the OFDM signal received by the AP 2 in FIG. 24, the normal tone (subcarrier constantly used in data or pilot signal) is indicated by a solid arrow, the subcarrier in the null tone candidate position is indicated by a dotted arrow, and the reference tone is indicated by a thick solid arrow. Furthermore, the vertical axis represents a power level.

In the example illustrated in FIG. 24, an OFDM signal in which a first, a third, . . . , and an n-th subcarriers of the subcarriers in the null tone candidate positions are allocated to null tones is transmitted from the AP 1.

Here, in the propagation path between the AP 1 and the AP 2, the frequency selective fading in which a lower frequency side of a frequency band to be used attenuates occurs, and reception power of a subcarrier on the lower frequency side transmitted as a normal tone signal is greatly lowered. For example, as the second subcarrier in the null tone candidate positions, the reception power falls below the absolute power threshold $Th_A$ for null tone detection.

In the second embodiment, in addition, the relative value between the reception power of the null tone candidate position and the reception power of the reference tone near the null tone candidate position is compared with the power threshold $Th_r$. When one of the threshold determination conditions is not satisfied, it is determined that the subcarrier is not a null tone. In the example illustrated in FIG. 24, the reception power of the second subcarrier in the null tone candidate positions is less than the power threshold $Th_A$. However, the difference between the above reception power and the reception power of the adjacent reference tone is small and is less than the power threshold $Th_r$. Therefore, it can be correctly determined that the second subcarrier in the null tone candidate position is a normal tone. As a result, the AP 2 can correctly acquire the control information even from the middle of the transmission packet of the AP 1.

In this way, it should be fully understood that, according to the second embodiment, the effect when the frequency selective fading occurs is reduced and the null tone can be accurately determined.

Third Embodiment

In the first embodiment, an information transmission method (for example, refer to FIG. 14) has been introduced in which the null tone candidate positions are arranged in one place in the OFDM signal. On the other hand, in a third embodiment, an information transmission method using all the subcarriers in the OFDM signal as the null tone candidate positions will be introduced.

In FIG. 25, an example of a null tone arrangement candidate in the third embodiment is illustrated. In the third embodiment, since all the subcarriers in the OFDM signal are used as the null tone candidate positions, all the subcarriers in FIG. 25 are indicated by dotted arrows.

In the first embodiment, one piece of the control information is expressed by a relationship between the positions and the number of subcarriers to which the null tones are allocated (for example, refer to FIG. 15). Therefore, in the first embodiment, there are cases where a single piece of the control information is expressed by two or more null tones. On the other hand, in the third embodiment, the number of null tones indicating the single piece of the control information is limited to equal to or less than one, and information is transmitted by using only the position of the subcarrier that is a null tone.

In FIG. 26, a relationship between the position of the null tone and the control information according to the third embodiment is illustrated. In the example illustrated in FIG. 26, as the control information to be transmitted by the null tone, the SR information is exemplified such as a flag indicating presence or absence of null tone information, the BSS identifier (corresponding to six bits), remaining transmission time (corresponding to six bits), transmission power (corresponding to four bits), an UL/DL flag, and the like. Then, the first, the second to the 65th, the 66th to the 129th, the 130th to the 145th, the 146th, . . . subcarriers among all the subcarriers in the OFDM signal are respectively allocated to the null tone candidate positions to transmit each piece of the control information. Furthermore, the final, that is, the N-th subcarrier in the OFDM signal is allocated to a parity bit that is a simple error detection code.

The type of the control information to be transmitted by the null tone in the third embodiment is similar to that in the first embodiment. However, the third embodiment is different from the first embodiment in that, regarding the control information other than information corresponding to one bit, an information value to be transmitted is expressed by, not a bit value, a position of a subcarrier to which a null tone ($b_k=1$) is allocated. That is, in the third embodiment, only a position k of the subcarrier to which the null tone ($b_k=1$) is allocated represents content of the control information (or information value), and all the other subcarriers allocated to the control information are set as normal tones ($b_k=0$).

If the second to the 65th subcarriers that are 64 subcarriers in total are allocated to null tone candidate positions for BSS identifiers, 64 patterns, that is, BSS identifiers corresponding to six bits can be expressed by the position of the only one subcarrier set as a null tone. For example, in a case where it is desired to transmit information "000001" as a BSS identifier corresponding to six bits, only the second subcarrier among the second to the 65th subcarriers allocated to the null tone candidate positions of the BSS identifiers is allocated to the null tone, and all the third to the 65th subcarriers are set as the normal tones. Then, an OFDM signal is generated. Furthermore, in a case where it is desired to transmit information "000011" as a BSS identifier, only the fourth subcarrier is allocated to the null tone, and the second and the third and the fifth to the 65th subcarriers other than the fourth subcarrier are set as the normal tones. Then, an OFDM signal is generated. Content of other control information such as remaining time information, transmission power, and the like can be similarly expressed by the position of the only one subcarrier set as the null tone among the null tone candidate positions allocated to each piece of the control information.

It can be said that the third embodiment is an example in which the control information is expressed by the position of the single subcarrier to which the null tone is allocated in a range of the subcarriers allocated to the single piece of the control information (null tone candidate position). According to the third embodiment, the information to be transmitted is expressed by the position of each null tone, and the total number of null tones arranged in the OFDM signal is fixed.

In the third embodiment, since all the subcarriers in the OFDM signal are set as the null tone candidate positions, it is necessary for the null tone detector 224 to calculate the reception power of all the subcarriers. Therefore, a necessary calculation amount and a necessary calculation time are increased as compared with those in the first embodiment. However, in the third embodiment, the total number of null tones included in a single OFDM symbol is fixed, and the total number of null tones included in the OFDM signal can be reduced as compared with that of the first embodiment.

Therefore, according to the third embodiment, there are advantages such that deterioration in the data caused by the allocation of the null tone can be suppressed to some extent and wrong determination of the null tone due to the external factor such as the frequency selective fading can be more easily detected.

The remaining transmission time of the control information transmitted by the null tone illustrated in FIG. 26 is a time-varying parameter. However, the flag indicating the presence or absence of the null tone information, the BSS identifier, the transmission power, and the UL/DL flag are fixed parameters. When any control information changes with time in the middle of the packet, a subcarrier corresponding to the control information is switched from the null tone to the normal tone or from the normal tone to the null tone in the middle of the packet.

Figure 27:
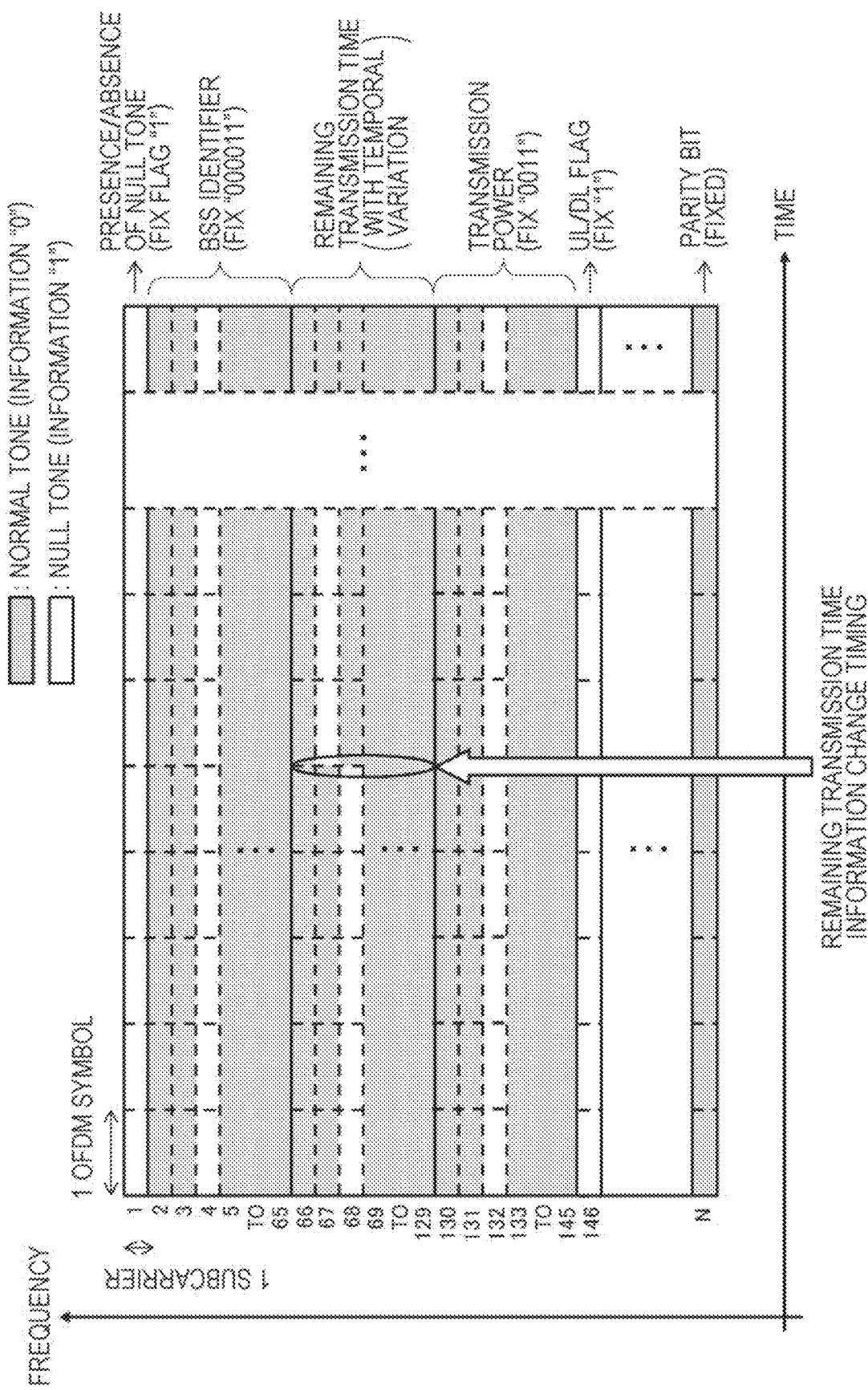
FIG. 27 is a diagram illustrating an example of temporal variation of subcarriers according to a second embodiment.

In FIG. 27, an example of temporal variation of subcarriers according to the present embodiment is illustrated. However, in FIG. 16, the horizontal axis indicates time, and the vertical axis indicates a frequency. Furthermore, in FIG. 16, a data signal portion after the preamble signal is represented, an one square represents a single subcarrier in each OFDM symbol. It is assumed that a control unit 202 of a communication device 200 determine the position of the null tone from among all the subcarriers of the OFDM signal as illustrated at the time of packet transmission. Note that, in the present embodiment, since the total number of null tones allocated in the single OFDM symbol is fixed, the control unit 202 determines only the position of the subcarrier to which the null tone is allocated from the OFDM signal.

In the example illustrated in FIG. 27, since the information transmission by the null tone is performed, a first subcarrier in the null tone candidate positions is set to a null tone, and $b_1=$"1" is expressed. Moreover, in a case where it is desired to transmit information "000011" as a BSS identifier, only a fourth subcarrier among a second to a 65th subcarriers is allocated to a null tone, and all the subcarriers including the second and the third and the fifth to the 65th subcarriers other than the fourth subcarrier are set as normal tones. Furthermore, in a case where it is desired to transmit information "0011" as transmission power information, only a 132nd subcarrier among a 130th to a 145th subcarriers is allocated to the null tone, and all the subcarriers including the 130th and the 131st and the 133rd to the 145th subcarriers other the 132nd subcarrier are set as the normal tones. Furthermore, in a case where it is desired that the UL/DL flag indicates the UL, the 146th subcarrier is set as the null tone, and $b_{145}=$"1" is expressed. Then, regarding these parameters that do not time-vary, the subcarrier to be the null tone is fixed, and the OFDM signal is generated.

On the other hand, regarding information of which the value changes during the packet transmission as the remaining transmission time information, the position of the subcarrier to be the null tone is changed for each certain period. In the example illustrated in FIG. 27, at the beginning, as representing an information value that is remaining transmission time "3", only the 68th subcarrier among the 66th to the 129th subcarriers is allocated to the null tone, and all the subcarriers including the 66th and the 67th and the 69th to the 129th subcarriers other than the 68th subcarrier are set as the normal tones. Thereafter, at a remaining transmission time information change timing, the information is countdown by one and changed to an information value "2". In response to this change, only the 67th subcarrier is allocated to the null tone, and all the subcarriers including the 66th and the 68th to the 129th subcarriers other than the 67th subcarrier are set as the normal tones.

The third embodiment is different from the first embodiment in the method for determining the position where the null tone is arranged at the time when the OFDM signal, in which the null tone is arranged, is transmitted (that is, processing operation for determining arrangement of null tone by control unit 202) and a method for determining the null tone when the OFDM signal, in which the null tone is arranged, is received (that is, processing operation for determining null tone by null tone detector 224). However, other points are similar to those in the first embodiment.

Figure 28:
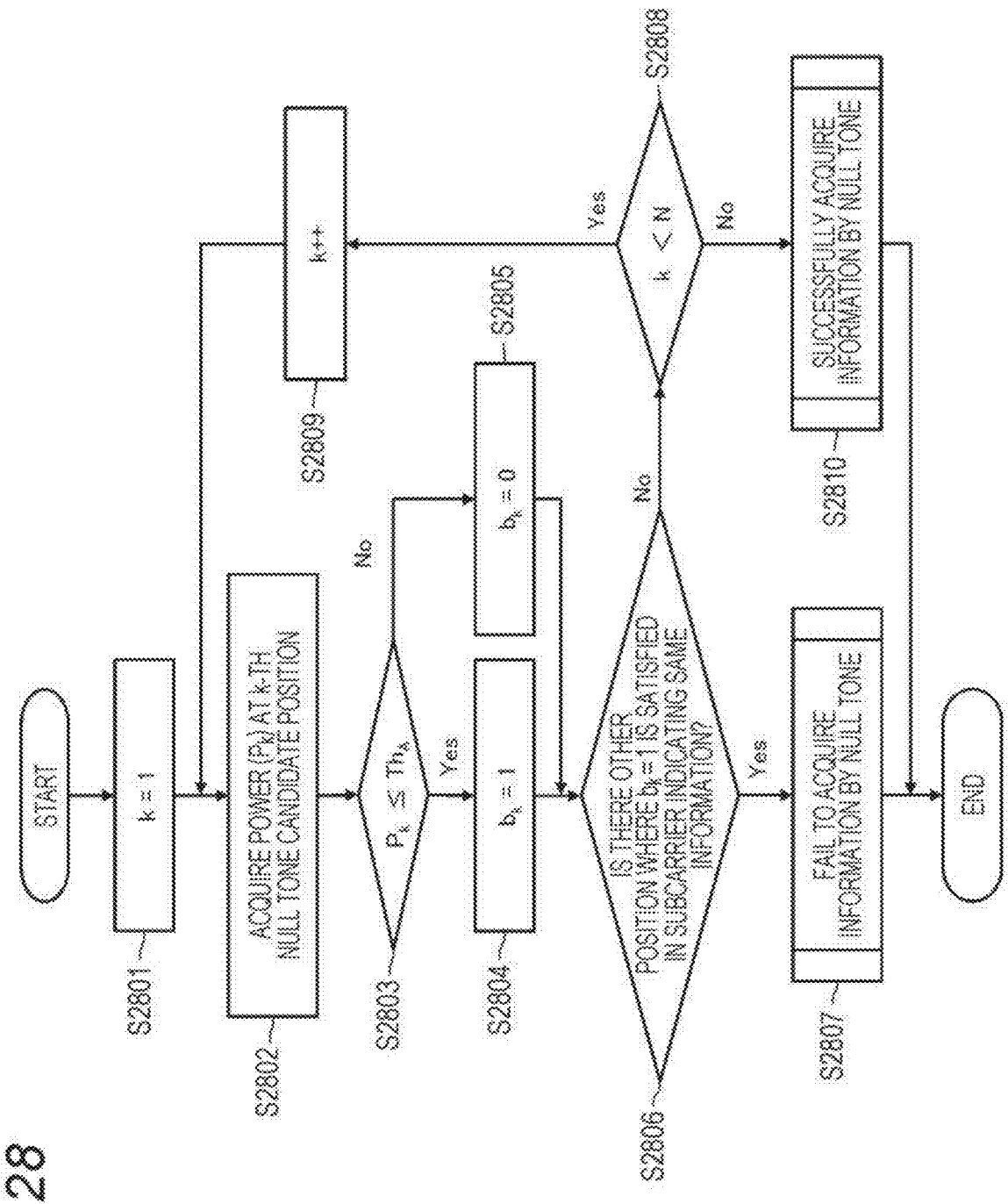
FIG. 28 is a flowchart illustrating a processing procedure for determining the null tone in the third embodiment.

In FIG. 28, in the third embodiment, a processing procedure for determining a null tone when the communication device 200 receives a packet is illustrated in a form of a flowchart. However, in FIG. 28, the reference N indicates the number of all the subcarriers in the OFDM signal (the number of subcarriers that are null tone candidates), and the reference $Th_A$ indicates a threshold of power used for null tone determination (subcarrier of which reception power is lower than power threshold $Th_A$ is determined as null tone).

First, a variable k is set to an initial value 1 (step S2801). Then, the null tone determination unit 606 acquires reception power $P_k$ of the k-th subcarrier calculated by a reception power calculation unit 605 (step S2802) and compares this reception power $P_k$ with a power threshold $Th_A$ (step S2803).

In a case where the reception power $P_k$ is equal to or less than the power threshold $Th_A$ (Yes in step S2803), the null tone determination unit 606 determines the k-th subcarrier in the null tone candidate positions as a null tone and obtains information that the k-th bit in the bit sequence $b_k=1$ (step S2804).

On the other hand, in a case where the reception power $P_k$ is higher than the power threshold $Th_A$ (No in step S2803), the null tone determination unit 606 determines the k-th subcarrier in the null tone candidate positions as a normal tone and obtains that the k-th bit in the bit sequence $b_k=0$ (step S2805).

Then, the null tone determination unit 606 checks whether or not two or more subcarriers determined as null tones exist in the null tone candidate positions allocated to the same control information (step S2806).

In the third embodiment, it is agreed that the number of null tones in the null tone candidate positions allocated to the single piece of the control information is limited to equal to or less than one (as described above), and there is no case where two or more null tones exist in the range. Therefore, when the determination indicating $b_k=1$ is made more than twice in the range of the subcarriers allocated to the same control information (Yes in step S2806), it is found that the made determination is wrong. In such a case, the null tone determination unit 606 determines that information acquisition by the null tone fails (step S2807), and discards all the acquired information and terminates this processing.

Furthermore, in a case where the number of subcarriers that are determined as $b_k=1$ is equal to or less than one (No in step S2806), the null tone determination unit 606 checks whether or not k is less than the total number N of the subcarriers in the OFDM signal (step S2808). In a case where k is less than the total number N of the subcarriers in the OFDM signal (Yes in step S2808), after incrementing k by only one (step S2809), it is determined whether or not a next subcarrier in the null tone candidate is a null tone according to processing similar to the above processing.

Then, when k reaches the total number N of the subcarriers in the OFDM signal (No in step S2808), the null tone determination unit 606 completes the null tone determination processing on all the subcarriers (1 to N) in the OFDM signal and successfully acquires the information by the null tone (step S2810). The determination result of the null tone determination unit 606 is sent to the control unit 202. The control unit 202 converts information regarding the position of the subcarrier that is determined as the null tone into each piece of the control information according to FIG. 26.

Note that, as in the example illustrated in FIG. 26, in a case where the flag indicating whether or not the packet performs the information transmission by the null tone is provided in the OFDM signal, the null tone determination unit 606 may perform the null tone determination on only a subcarrier corresponding to the flag first, read a value of the bit, and confirm whether or not the information transmission by the null tone is performed. Then, in a case where the flag is not set (specifically, $b_1=0$) and it is found that the packet is not the packet that performs the information transmission by the null tone, calculation of the reception power of the other subcarrier that is the null tone candidate and the null tone determination may be skipped.

The control unit 202 can control the operation of the communication device 200 including a spatial reuse operation on the basis of the control information acquired from the determination result according to the processing procedure illustrated in FIG. 28 by the null tone determination unit 606. The spatial reuse operation of the communication device 200 can be performed according to the processing procedure, for example, illustrated in FIG. 19. Here, detailed description of the spatial reuse operation is omitted.

So far, as the first to the third embodiments, some examples regarding the method for transmitting information by the null tone and the null tone detection method have been described. However, the technology proposed here is not limited to these methods. The information transmission by the null tone may be performed by using a combination of two or more embodiments of the first to the third embodiments. For example, the method in the third embodiment in which the number of null tones indicating the single piece of the control information is limited to equal to or less than one and the information is transmitted by only the position of the subcarrier that is the null tone can be combined with the method for using the reference tone in the second embodiment.

Furthermore, in the first to the third embodiments, description is made as assuming that one null tone is allocated to one subcarrier, that is, one subcarrier is used as unit having information. However, for example, the information transmission by the null tone can be performed in a unit of a plurality of subcarriers. In this case, the null tone determination unit 606 determines the null tone in subcarrier units. However, only in a case where the subcarriers included in one unit are set as null tones, information "(bk=)1" may be applied. By performing the information transmission by the null tone in unit of the plurality of subcarriers, an effect of a frequency error and the like can be reduced.

Furthermore, in a case where the communication device 200 transmits a plurality of streams by applying a communication method such as multiple input multiple output (MIMO), it is desirable to apply the same control information to all the streams and to align the positions of the subcarriers to be the null tones between the streams.

Furthermore, it is desirable that a common rule for performing the information transmission by the null tone be used by all wireless terminals in a network. The rule for performing the information transmission by the null tone includes a rule for allocating a null tone to a subcarrier (null tone candidate position and whether or not reference tone is used), a relationship between the position of the null tone and the control information, and the like. In a case where the information transmission by the null tone is performed in a wireless environment closed in a specific network, it is possible to provide a unique rule in the network and operate each wireless terminal.

Fourth Embodiment

So far, as the first to the third embodiments, an embodiment in which the method for transmitting information by the null tone is applied to enhance the effect on the spatial reuse technology has been described. By transmitting information necessary for spatial reuse by the null tone, it is possible to acquire the information even from the middle of the packet without depending on a preamble signal and to determine SR packet transmission and set a transmission parameter. On the other hand, in a fourth embodiment, an embodiment will be introduced in which a method for transmitting information by using the null tone is applied to determination regarding packet transmission to an FD terminal.

Figure 29:
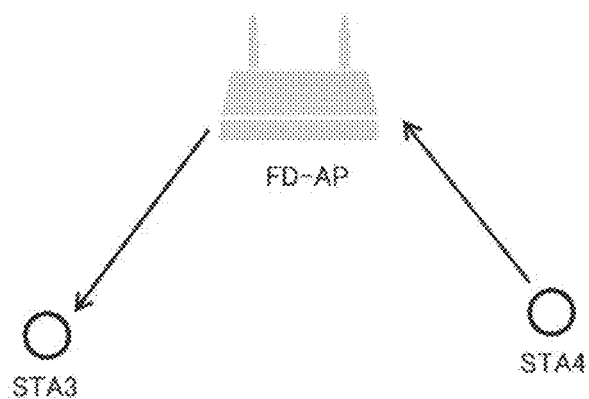
FIG. 29 is a diagram illustrating an exemplary configuration of a wireless communication system according to a fourth embodiment.

In FIG. 29, an exemplary configuration of a wireless communication system according to the fourth embodiment is schematically illustrated. The illustrated system includes a Full Duplex type, that is, an AP (hereinafter, also referred to as "FD-AP") that can simultaneously receive UL packets from subordinate STAs and transmit DL packets to the subordinate STAs and the two STAs that operate under control of the FD-AP, that is, STAs 3 and 4. It is assumed that the FD-AP perform DL communication with the STAs 3 and 4 and the STAs 3 and 4 perform UL communication with the FD-AP. Furthermore, it is assumed that all the FD-AP and the STAs 3 and 4 include the device configuration illustrated in FIG. 2.

Figure 30:
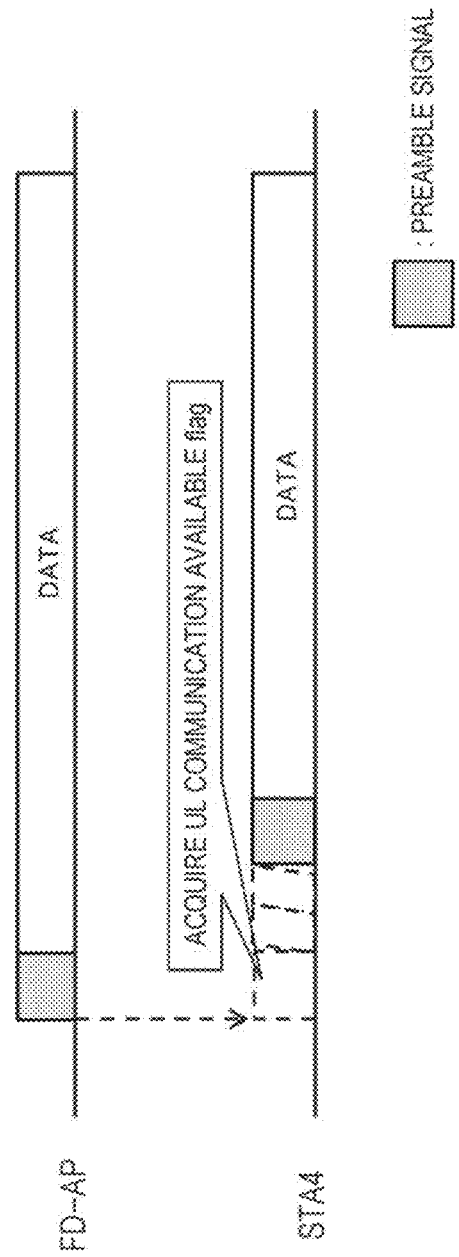
FIG. 30 is a diagram illustrating an exemplary communication sequence for performing Full Duplex communication.

In FIG. 30, an exemplary communication sequence for performing Full Duplex communication between the FD-AP and the STA 4 in the system configuration illustrated in FIG. 29 is illustrated. However, the horizontal axis in FIG. 30 is a time axis, and a white rectangle on each axis indicates a frame transmitted from the communication device at the time corresponding to the position on the horizontal axis. Furthermore, a front end of a dotted arrow vertically extending from the frame indicates a destination of the frame.

When starting to transmit a DL packet to the STA 3, the FD-AP transmits the DL packet as including information representing that an UL packet can be received (hereinafter, referred to as "UL receivable flag") in a preamble signal.

When the STA 4 acquires the preamble signal of the transmission packet of the FD-AP, the STA 4 belonging to the same BSS cancels the reception of the packet in a case of determining that the FD-AP can still receive a UL signal according to the UL receivable flag and performs backoff. Thereafter, the STA 4 can start to transmit the UL packet to the FD-AP. Note that, in a case where the UL receivable flag is not included in the preamble signal, the STA 4 sets an NAV (transmission suppression period) from the information in the preamble signal.

In this way, the FD-AP can simultaneously receive the UL packet and transmit the DL packet in an autonomous decentralized manner by providing the UL receivable flag in the packet preamble signal that is transmitted by the FD-AP.

The FD-AP performs such Full Duplex communication so as to improve transmission opportunities of the subordinate STAs, Therefore, an effect for increasing communication resources can be expected.

Figure 31:
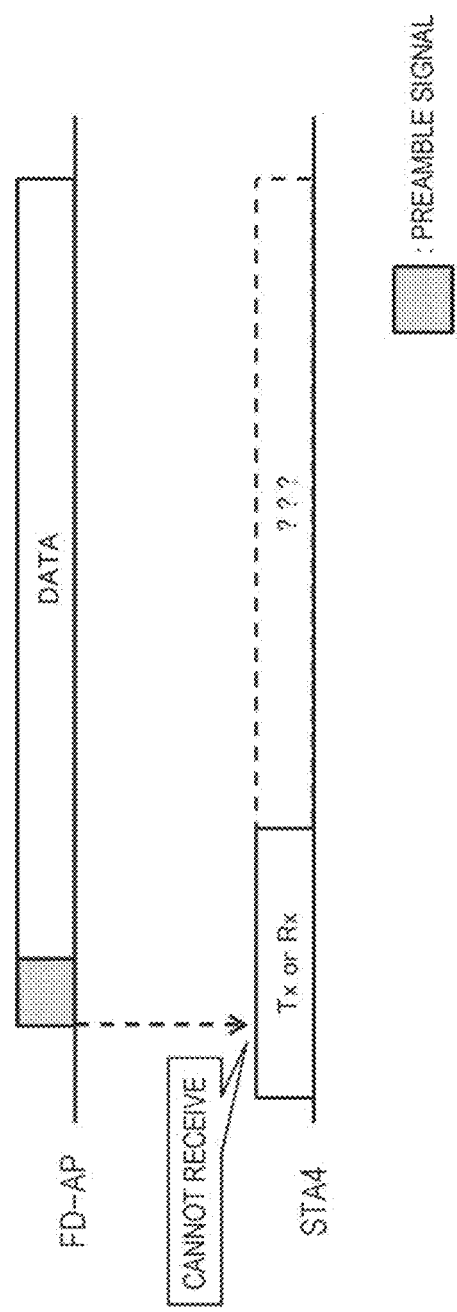
FIG. 31 is a diagram illustrating an exemplary communication sequence in which the Full Duplex communication cannot be performed on the basis of a preamble signal.

In FIG. 31, an exemplary communication sequence in a case where the Full Duplex communication cannot be performed between the FD-AP and the STA 4 on the basis of the UL receivable flag described in the preamble signal is illustrated. However, the horizontal axis in FIG. 30 is a time axis, and a white rectangle on each axis indicates a frame transmitted from the communication device at the time corresponding to the position on the horizontal axis. Furthermore, a front end of a dotted arrow vertically extending from the frame indicates a destination of the frame.

In order to determine whether or not the UL packet can be transmitted to the FD-AP when the local station receives the packet transmitted by the FD-AP that is a connection destination of the STA 4, the STA 4 needs to receive the preamble signal in the packet and detect the UL receivable flag. However, in a case where the STA 4 is executing other processing (for example, during packet transmission (Tx) or reception of other packet (Rx)) when the FD-AP starts to transmit the packet, the STA 4 cannot acquire the preamble signal of the packet transmitted from the FD-AP. Furthermore, at the time when completing the other processing, the STA 4 misses the preamble signal of the transmission packet from the FD-AP. Therefore, the STA 4 does not acquire the UL receivable flag. As a result, although the FD-AP can receive the UL packet, the STA 4 cannot determine whether or not the UL transmission can be performed and loses the transmission opportunity.

In short, even when the STA 4 misses the reception of the preamble signal of the transmission packet from the FD-AP, it is desirable to acquire the UL receivable flag even from the middle of the packet. By acquiring the UL receivable flag even from the middle of the packet, the STA 4 can increase uplink transmission opportunities, and this increases the communication resources.

In the fourth embodiment, the communication device 200 that operates as the FD-AP, at the time of transmission of the DL packet, transmits a packet that can tell information necessary for determining whether or not the UL packet can be transmitted even from the middle of the packet (not preamble signal). Furthermore, in the fourth embodiment, at the time of reception of the DL packet, even if the communication device 200 that operates as the STA under the control of the FD-AP misses the reception of the preamble signal, the communication device 200 can acquire the information necessary for determining whether or not the UL packet can be transmitted from the middle of the packet. Therefore, by forming a wireless communication system by a wireless terminal having a device configuration illustrated in FIG. 2, it is possible to increase the opportunities to perform the spatial reuse in the entire system and improve the throughput.

Specifically, in the fourth embodiment, at the time of transmission of the DL packet, the communication device 200 that operates as the FD-AP determines a subcarrier to be a null tone according to the information to be applied to the DL packet, generates an OFDM signal in which the determined subcarrier is set as a null tone, and transmits the DL packet. The information to be applied to the DL packet is information necessary for determining whether or not the UL packet can be transmitted and information necessary for controlling the transmission of the UL packet and includes a BSS identifier, transmission time information, an UL receivable flag, and the like.

As a method for setting the position and the number of null tones, two patterns can be exemplified. One method is a method for fixing the null tone candidate position and makes the position and the number of actual null tones have information. Another method is a method for fixing the number of null tones and makes the position of the null tone have information.

According to the time-varying information, the positions or the number of null tones can be changed. A minimum unit of the null tone may be a single subcarrier or a plurality of subcarriers. Furthermore, in a case where there is a plurality of streams, the same subcarriers in the respective streams are set as the null tones. This is to prevent a situation in which the subcarriers overlaps due to the plurality of streams and the reception side cannot detect the null tone.

Furthermore, in the fourth embodiment, even if the communication device 200 that operates as the STA under the control of the FD-AP cannot receive the preamble signal at the time of the reception of the DL packet that performs the information transmission by using the null tone as described above, by detecting the OFDM signal (DATA portion) of the DL packet by simple synchronization, measuring the reception power of each subcarrier, and detecting the null tone, the communication device 200 can obtain the information necessary for determining whether or not the UL packet can be transmitted and the information necessary for controlling the transmission of the UL packet (as described above).

Figure 32:
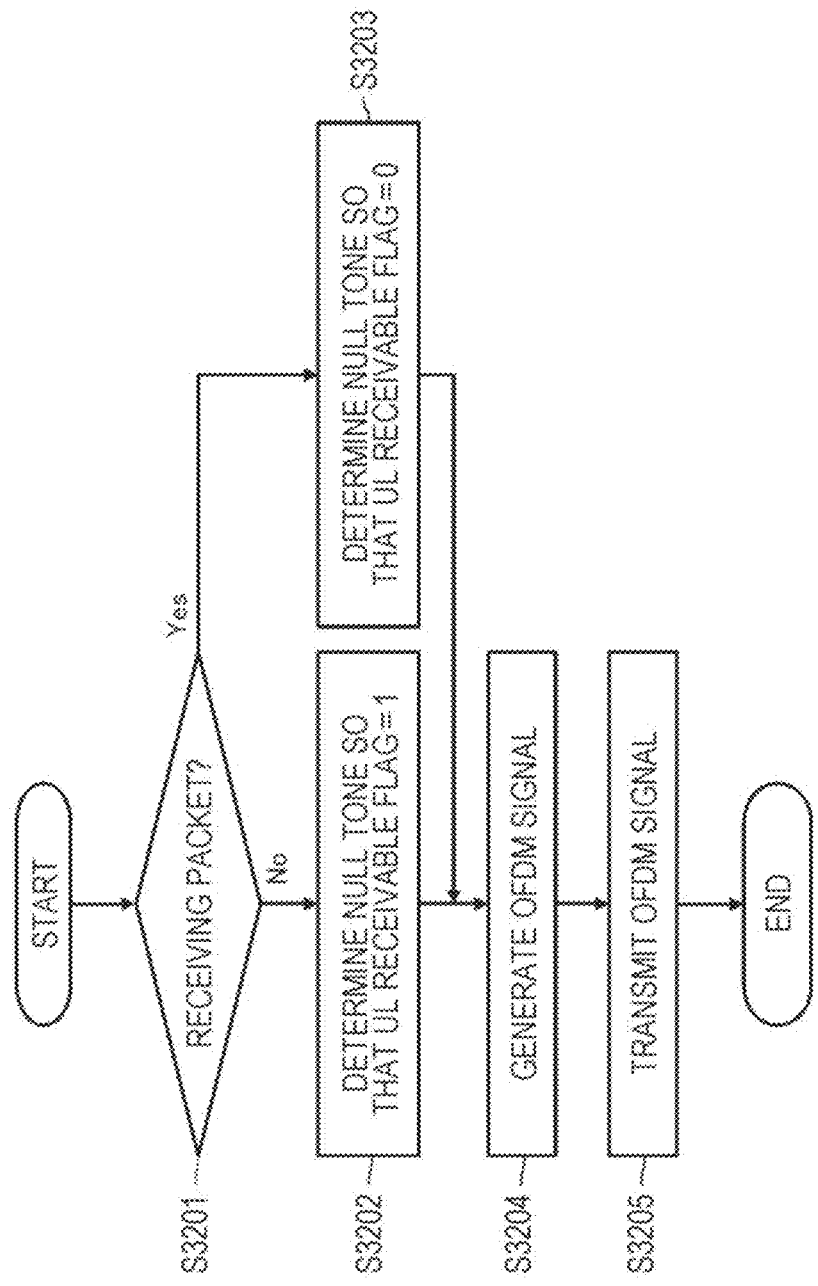
FIG. 32 is a flowchart illustrating a processing procedure performed by a FD-AP according to the fourth embodiment.

In FIG. 32, a processing procedure at the time when the communication device 200 operates as the FD-AP in the fourth embodiment is illustrated in a form of a flowchart.

When the FD-AP is not receiving the packet (No in step S3201), the control unit 202 determines the position of the subcarrier to which the null tone is allocated so that the UL receivable flag indicates one (step S3203).

Furthermore, when the FD-AP is receiving the packet (Yes in step S3201), the control unit 202 determines the position of the subcarrier to which the null tone is allocated so that the UL receivable flag indicates zero (step S3203). Note that the position of the subcarrier to which the null tone is allocated may be determined according to any one of the methods introduced in the first to third embodiments.

Next, the OFDM signal generator 211 generates an OFDM signal such that a subcarrier at the position determined by the control unit 202 in step S3202 or S3203 is set as a null tone (step S3204).

Then, the analog signal converter 212 DA converts the generated OFDM signal into an analog signal, and the RF transmission unit 213 up-converts the analog signal generated by the analog signal converter 212 into an RF signal and performs power amplification. Thereafter, the RF signal is emitted from an antenna into the air via the antenna sharing unit 201 as electromagnetic waves, and the OFDM signal is transmitted after backoff is completed (step S3205).

The processing procedure as illustrated in FIG. 32 is performed as needed when the communication device 200 that operates as the FD-AP generates an OFDM symbol. Depending on the state of the FD-AP, the state of the subcarrier representing the UL receivable flag changes. For example, at the time when the FD-AP starts to transmit the DL packet, the FD-AP does not receive the UL packet. Therefore, the FD-AP transmits the OFDM signal by using the null tone so that the UL receivable flag indicates "1". Thereafter, in a case where the FD-AP starts to receive any packet from the middle of the DL packet transmission, whether or not the null tone exists or the position of the subcarrier set as the null tone is changed so that the UL receivable flag indicates "0" from the next OFDM symbol.

In this way, under a wireless communication environment in which the plurality of STAs exists around (or subordinate to) the FD-AP, each of the plurality of STAs acquires not only the preamble signal of the transmission packet of the FD-AP but also the UL receivable flag from the middle of the packet, determines whether or not the UL packet can be transmitted so as to obtain a transmission opportunity. Furthermore, in a case where any one of the STAs determines the UL packet and starts to transmit the UL packet in advance, the FD-AP changes the UL receivable flag to "0" from the middle of the packet. Therefore, the subordinate STA can determine as needed that the UL packet cannot be transmitted and prevent a collision with the packet for which UL transmission has been already started.

In FIG. 33, an example of a relationship between the position of the null tone and the control information according to the fourth embodiment is illustrated. In FIG. 15, each piece of information to be transmitted is represented by a bit sequence ($b_1$ to $b_n$). Then, in a case where $b_k$="1" is transmitted, in a case where a k-th subcarrier in the null tone candidate position is allocated to the null tone and $b_k$="0" is transmitted, the OFDM signal is generated as setting the k-th subcarrier in the null tone candidate position as a normal tone signal.

In the example illustrated in FIG. 33, as the control information to be transmitted by the null tone, the control information for the Full Duplex communication is exemplified such as a flag indicating presence or absence of null tone information, the BSS identifier (corresponding to six bits), remaining transmission time (corresponding to six bits), the UL receivable flag, . . . , and the like. These pieces of control information are respectively allocated to a first, a second to a seventh, an eighth to a 13th, and a 14th . . . subcarriers from among n subcarriers in the null tone candidate positions. Furthermore, the final subcarrier in the null tone candidate positions is allocated to a parity bit that is a simple error detection code. As in FIG. 15, FIG. 33 is an example in which the single piece of the control information to be transmitted is expressed by the relationship between the number and the positions of the subcarriers allocated to the null tones.

Note that, in the present embodiment, control information other than that illustrated in FIG. 33 may be transmitted by using the null tone. For example, the information necessary for performing the spatial reuse technology such as the transmission power information and the UL/DL flag may be transmitted together with the control information of the Full Duplex communication. With this transmission, the wireless terminal side that receives the information can simultaneously apply the spatial reuse technology and the Full Duplex communication.

When determining content of each piece of control information, the control unit 202 expresses the determined control information by the bit sequence ($b_1$ to $b_n$). Then, the OFDM signal generator 211 generates an OFDM signal by allocating the position of the subcarrier corresponding to a bit position to be "1" in the bit sequence to the null tone in the null tone candidate position and setting the position of the subcarrier corresponding to a bit position to be "0" in the same bit sequence as a normal tone signal.

The remaining transmission time and the UL receivable flag among the control information transmitted by the null tone are time-varying parameters. However, the flag indicating the presence or absence of the null tone information and the BSS identifier are fixed parameters. Furthermore, the parity bit changes according to the change of the time-varying parameter. When any control information changes with time in the middle of the packet, a subcarrier corresponding to the control information is switched from the null tone to the normal tone or from the normal tone to the null tone in the middle of the packet.

Figure 34:
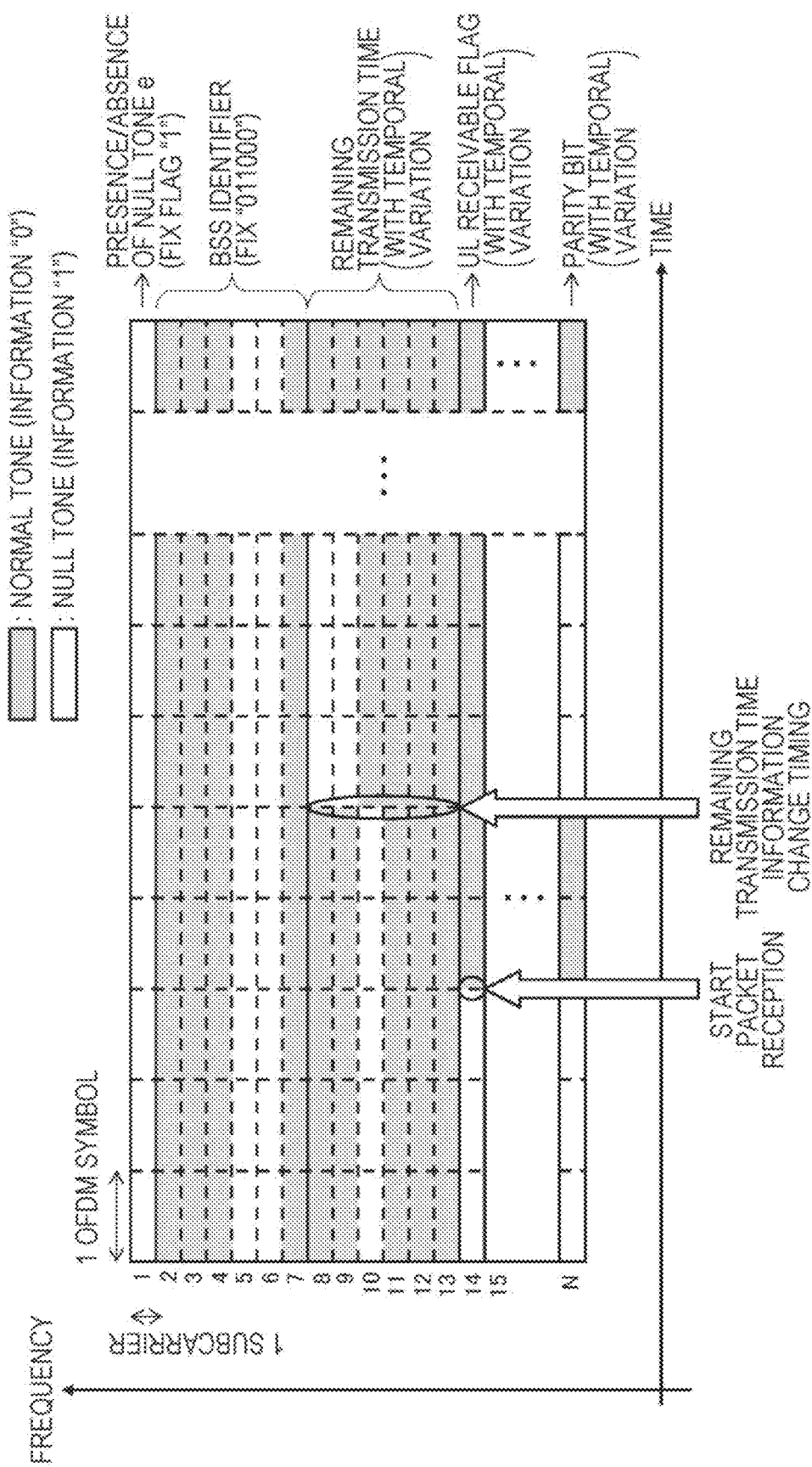
FIG. 34 is a diagram illustrating an example of temporal variation of subcarriers according to the fourth embodiment.

In FIG. 34, an example of temporal variation of subcarriers according to the present embodiment is illustrated. However, in FIG. 16, the horizontal axis indicates time, and the vertical axis indicates a frequency. Furthermore, in FIG. 16, a data signal portion after the preamble signal is represented, an one square represents a single subcarrier in each OFDM symbol. It is assumed that the control unit 202 of the communication device 200 determine the positions and the number of null tones in the subcarrier in the null tone candidate positions as illustrated, at the time of transmitting the packet.

In the example illustrated in FIG. 34, since the information transmission by the null tone is performed, a first subcarrier in the null tone candidate positions is set as a null tone, and $b_1$="1" is expressed. Moreover, in a case where it is desired to send information "011000" as the BSS identifier, the null tones are allocated to the fifth and the sixth subcarriers among the second to the seventh subcarriers. Then, regarding these parameters that do not time-vary, the subcarrier to be the null tone is fixed, and the OFDM signal is generated.

On the other hand, regarding information of which the value changes during the packet transmission as the remaining transmission time information and the UL receivable flag, the position of the subcarrier to be the null tone is changed for each certain period.

In the example illustrated in FIG. 34, as the remaining transmission time information, only the 10th subcarrier in the null tone candidate positions is set as the null tone as representing the information "000100" first. However, since the information is changed to "000011" obtained by countdown the information by one at a timing of remaining transmission time change, the 10th subcarrier is changed to the normal tone signal, and the eighth and the ninth subcarriers are changed to the null tones.

Furthermore, in the example illustrated in FIG. 34, the FD-AP can receive the UL packet first. However, at the time of the fourth OFDM symbol in FIG. 34, the FD-AP starts to receive the packet, and as a result, the state of the FD-AP is changed to a state in which the UL packet cannot be received. Therefore, although the 14th subcarrier in the null tone candidate position is allocated to the null tone up to the third OFDM symbol, the 14th subcarrier is switched to a normal tone signal in the fourth OFDM symbol.

Furthermore, the error correction code such as a parity bit is changed according to the temporal variation of the control information, and the subcarrier allocated to transmit the parity bit is changed from the null tone to the normal tone or from the normal tone to the null tone.

The control unit 202 of the communication device 200 that operates as the FD-AP determines whether or not the UL packet can be received, for example, according to whether or not the local station can receive the packet. Then, in a case where the control unit 202 determines that the UL packet can be received, the control unit 202 determines that the 14th subcarrier in the null tone candidate positions is allocated to the null tone. However, in a case where it is determined that the UL packet cannot be received, the control unit 202 determines to set the subcarrier as a normal tone signal. Then, the control unit 202 notifies an OFDM signal generator 211 of the position of the subcarrier determined to be allocated to the null tone, and the OFDM signal generator 211 generates an OFDM signal in which the designated position of the subcarrier is set as the null tone.

On the other hand, by determining whether or not the 14th subcarrier in the null tone candidate positions in the OFDM signal is the null tone, the STA around (or subordinate to) the FD-AP can determine whether or not the UL packet can be transmitted to the FD-AP even in the middle of the packet transmitted from the FD-AP. Furthermore, even if the state of the 14th subcarrier in the null tone candidate positions time-varies in the middle of the transmission packet from the FD-AP, the STA can accurately determine whether or not the UL packet can be transmitted to the FD-AP in correspondence with the varied state.

Note that, in FIGS. 33 and 34, as in the first embodiment, an example is illustrated in which a single piece of the control information to be transmitted is expressed by a relationship between the positions and the number of subcarriers allocated to the null tone. Of course, in the fourth embodiment, as in the third embodiment, a method can be applied for expressing the control information by the position of the single subcarrier to which the null tone is allocated in a range of the subcarriers allocated to the single piece of the control information (null tone candidate position) and performing the information transmission. Furthermore, as in the second embodiment, a method using the reference tone may be applied.

Figure 35:
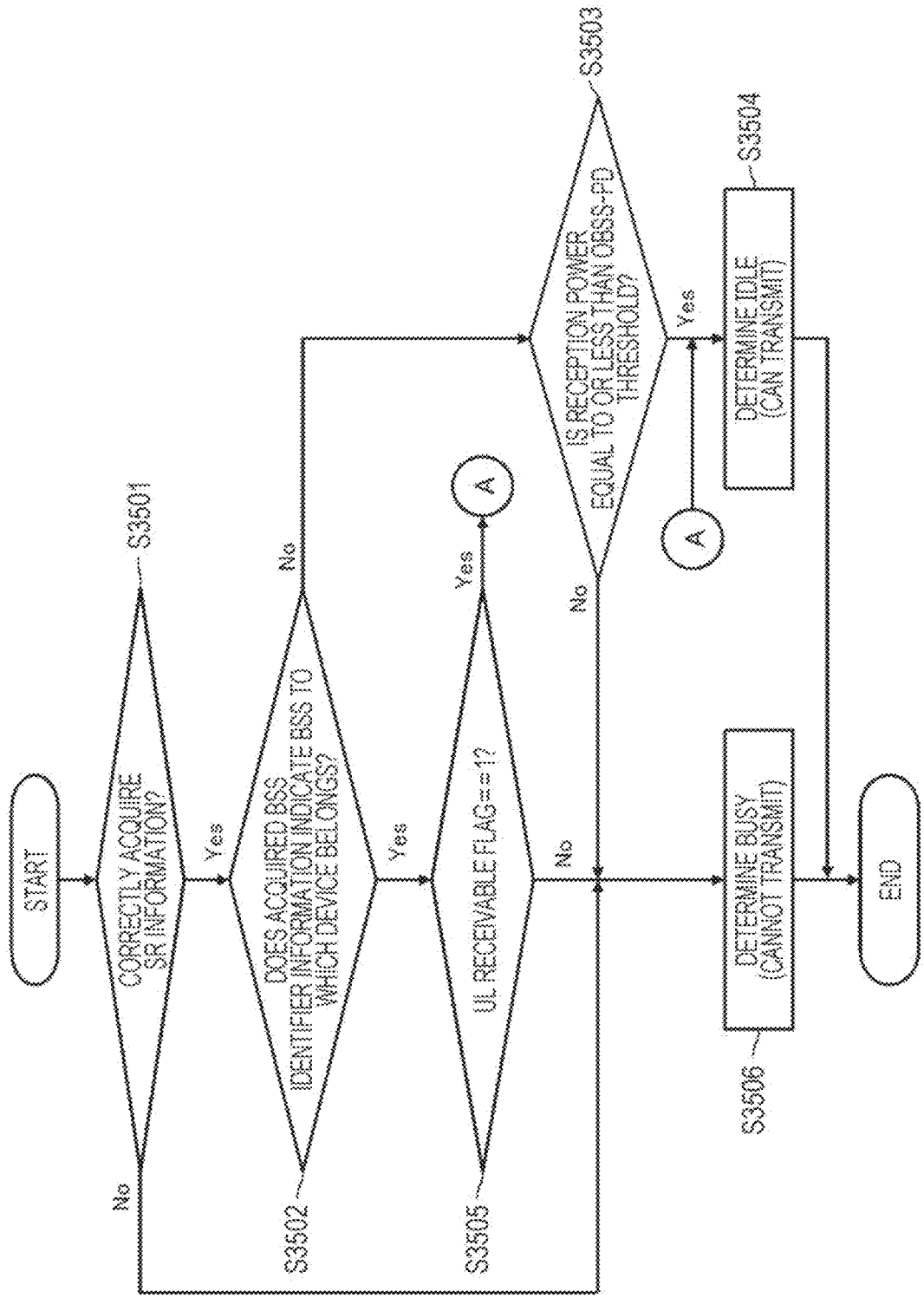
FIG. 35 is a flowchart illustrating a processing procedure for performing a Full Duplex operation by a communication device 200 according to the fourth embodiment.

In FIG. 35, a processing procedure to perform a Full Duplex operation by the communication device 200 according to the present embodiment by using the control information transmitted from the other wireless terminal by the null tone is illustrated in a form of a flowchart. Here, it is assumed that the communication device 200 operate as a STA subordinate to the FD-AP. The illustrated processing procedure is performed mainly by the control unit 202. Note that it is assumed that the null tone determination unit 606 in the null tone detector 224 execute null tone determination processing according to, for example, the processing procedure illustrated in FIG. 18.

First, the control unit 202 checks whether or not the information can be correctly acquired from the detection result by the null tone detector 224 (step S3501). Specifically, the control unit 202 checks whether or not the head subcarrier in the null tone candidate positions in the OFDM signal is a null tone (that is, $b_1$=1) and whether or not the information transmission by the null tone is performed. Furthermore, the control unit 202 performs parity check on the bit sequences $b_1$ to $b_n$ extracted by the null tone determination unit 606 by using the parity bit extracted from the subcarrier at the end of the null tone candidate positions so as to check whether or not it is indicated that the control information can be correctly acquired from the null tone.

Note that, in step S3501, a case where the control information cannot be acquired from the null tone in the OFDM signal includes a case where it is indicated that no information is transmitted by the null tone ($b_1$=0) and a case where a parity error occurs in bit sequences $b_1$ to $b_n$ obtained by the null tone determination.

Then, in a case where the control information can be acquired from the null tone in the OFDM signal (Yes in step S3501), the control unit 202 checks whether or not the receiving packet coincide with the BSS to which the device belongs by using the BSS identifier included in the acquired control information (step S3502).

In a case where the BSS identifier indicated by the control information transmitted by the null tone does not coincide with the BSS to which the device belongs (No in step S3502), the received packet is an OBSS signal arrived from other BSS, and there is a possibility that the packet can be transmitted by the spatial reuse. Therefore, the control unit 202 compares the reception power of the received packet with a predetermined power threshold and determines whether or not the packet can be transmitted by the spatial reuse (step S3503). The power threshold here is OBSS-PD, for example, for detecting power of a signal from other BSS (Power Detection).

In a case where the reception power of the received OBSS signal is equal to or less than the OBSS-PD (Yes in step S3503), the control unit 202 determines that the transmission of the SR packet to which the spatial reuse technology is applied can be performed. At this time, the control unit 202 sets an appropriate transmission parameter (transmission power, packet length, and the like) of the SR packet by appropriately using the information transmitted by the null tone. Then, the control unit 202 shifts the state of the communication device 200 to an IDLE state (radio wave is not used) and restarts the backoff (step S3504). When the backoff ends, the control unit 202 instructs the transmission unit 210 to transmit the SR packet.

On the other hand, in a case where the reception power of the received OBSS signal exceeds the OBSS-PD (No in step S3503), the control unit 202 determines that the transmission of the SR packet to which the spatial reuse technology is applied cannot be performed. At this time, the control unit 202 shifts the state of the communication device 200 to a BUSY state (radio waves are used) (step S3506) and terminates the present processing without starting the spatial reuse operation.

Furthermore, in a case where the BSS identifier indicated by the control information transmitted by the null tone coincides with the BSS to which the BSS identifier belongs (Yes in step S3502), the control unit 202 further checks whether or not the UL receivable flag included in the control information is set to "1" and a FD-AP that is a packet transmission source can receive the packet (step S3505).

Here, in a case where the UL receivable flag is set to "1" and it is found that the UL packet can be transmitted to the FD-AP (Yes in step S3505), the control unit 202 shifts the state of the communication device to an IDLE state (radio waves are not used) and restarts the backoff (step S3504). When the backoff ends, the control unit 202 instructs the transmission unit 210 to transmit the UL packet.

Furthermore, in a case where the UL receivable flag is set to "0" and it is found that the FD-AP cannot receive a packet (No in step S3505) and in a case where the control information cannot be acquired from the null tone in the OFDM signal (No in step S3501), the control unit 202 shifts the state of the communication device 200 to the BUSY state (radio waves are used) (step S3506) and waits until the transmission of the packet ends.

Furthermore, even in a case where it is determined in step S3505 once that the UL packet can be transmitted to the FD-AP, in a case where the UL receivable flag is time-varied to "0" while waiting for random time in step S3504, similarly, the control unit 202 shifts the state of the communication device 200 to the BUSY state (radio waves are used) (step S3506) and waits until the transmission of the packet ends.

Figure 36:
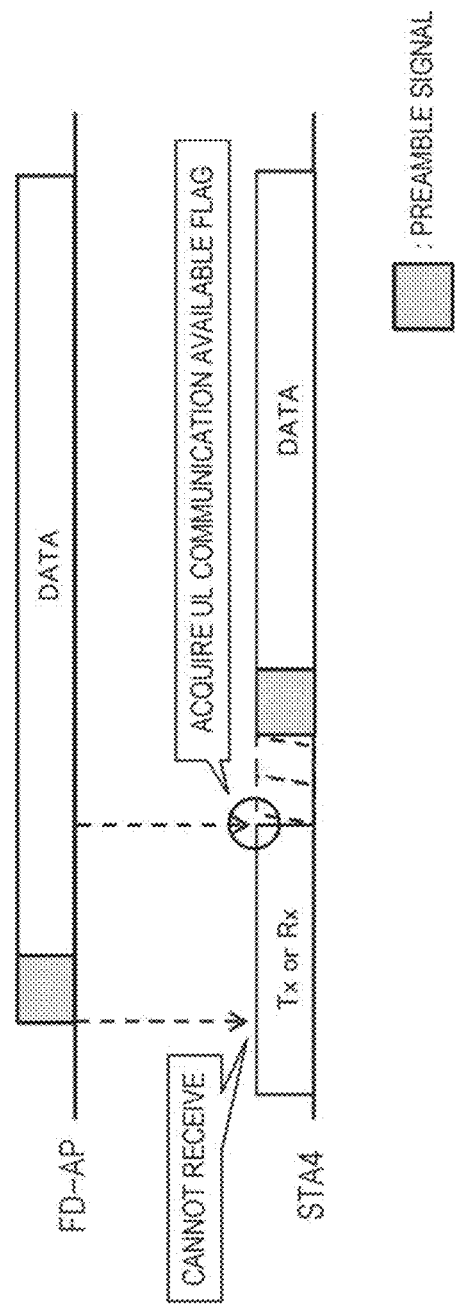
FIG. 36 is a diagram illustrating an exemplary communication sequence in which an UL packet can be transmitted by using the control information acquired by using the null tone.

In FIG. 36, an exemplary communication sequence in which an UL packet can be transmitted by using the control information acquired by using the null tone is illustrated. However, here, the wireless communication environment illustrated in FIG. 29 is assumed. Furthermore, the horizontal axis in FIG. 11 is a time axis, and a white rectangle on each axis indicates a frame transmitted from the communication device at the time corresponding to the position on the horizontal axis. Furthermore, a front end of a dotted arrow vertically extending from the frame indicates a destination of the frame.

In order to determine whether or not the UL packet can be transmitted to the FD-AP when the local station receives the packet transmitted by the FD-AP that is a connection destination of its station, the STA 4 needs to receive the preamble signal in the packet and detect the UL receivable flag (as described above). Here, in a case where the STA 4 is executing other processing (for example, during packet transmission (Tx) or reception of other packet (Rx)) when the FD-AP starts to transmit the packet, the STA 4 cannot acquire the preamble signal of the packet transmitted from the FD-AP. Furthermore, at the time when completing the other processing, the STA 4 misses the preamble signal of the transmission packet from the FD-AP. Therefore, the STA 4 cannot acquire the UL receivable flag from the preamble signal.

However, the STA 4 can acquire the UL receivable flag from the information transmitted by the null tone in the OFDM signal (DATA portion of DL packet) received from the FD-AP. Therefore, the STA 4 can start to transmit the UL packet, even during the packet transmission by the FD-AP, according to the UL receivable flag acquired on the basis of the null tone detected from the OFDM signal (DATA portion of DL packet) after the preamble signal.

In short, according to the technology disclosed herein, the communication device 200 that operates as the STA subordinate to the FD-AP detects the OFDM signal even from the middle of the packet transmitted from other station so as to determine whether or not the UL packet can be transmitted, to obtain more transmission opportunities, and in addition, to increase the communication resources.

Note that the system configuration for simultaneously performing DL packet transmission by the FD-AP and UL packet transmission by the subordinate STA is not limited to the configuration illustrated in FIG. 29. It is sufficient that a plurality of wireless terminals to which connection is established exists and that a peripheral wireless terminal exists for each wireless terminal. The positional relationship between the wireless terminals does not matter as long as the above conditions are satisfied.

According to the technology disclosed herein, the wireless terminal that transmits a packet can transmit the information that is originally described in the preamble signal during the packet transmission. Furthermore, in a case where the information to be transmitted time-varies during the packet transmission, the information to be transmitted by using the null tone can be changed from the middle of the packet in response to the change.

Furthermore, according to the technology disclosed herein, the wireless terminal that receives a packet can acquire necessary information from the middle of the packet even in a case where the wireless terminal has missed the preamble signal. For example, by using the information transmitted by the null tone, the wireless terminal can, at the time of applying the spatial reuse technology, determine whether or not the packet of the local station can be transmitted, adjust the transmission parameter, and determine whether or not the packet can be transmitted to the FD terminal. Therefore, the wireless terminal can obtain more transmission opportunities, and the communication resources are increased, and in addition, throughput of the entire system is improved.

INDUSTRIAL APPLICABILITY

The technology disclosed in the present specification has been described above in detail with reference to the specific embodiments. However, it is obvious that those skilled in the art can amend and substitute the embodiment without departing from the scope of the technology disclosed in the present specification.

According to the technology disclosed herein, the information that is originally transmitted by using the preamble signal can be transmitted by using the OFDM signal after the preamble signal. Therefore, the wireless terminal on the reception side can acquire the information even from the middle of the packet even if the wireless terminal has missed the preamble signal. According to the technology disclosed herein, for example, information necessary for performing the spatial reuse technology and the packet transmission to the FD terminal can be acquired even from the middle of the packet. Therefore, the wireless terminal can obtain more transmission opportunities, the communication resources are increased, and the throughput of the entire system is improved.

Furthermore, here, the embodiment that transmits the SR information according to the position and the number of subcarriers in which the null tone is arranged in the packet has been mainly described. However, various control information other than the SR information can be transmitted even from the middle of the packet according to the similar method.

The technology disclosed herein can be applied to, for example, a wireless communication system complying with IEEE802.11ax, and of course, can be similarly applied to systems complying with other various communication standards.

In a word, although the technology disclosed in the present specification has been described as an example, the described matter in the present specification should not be restrictively interpreted. Claims should be considered in order to determine the scope of the technology disclosed in the present specification.

Note that the technology disclosed in the present specification can have the following configuration.

(1) A communication device including:
a control unit configured to determine a subcarrier to be a null tone according to information applied to a packet; and
a transmission unit configured to generate a multi-carrier signal in which the determined subcarrier is set as a null tone and wirelessly transmit the signal.

(2) The communication device according to (1), in which
the control unit determines a position of a subcarrier and the number of subcarriers to be null tone in correspondence with the information.

(2-1) The communication device according to (2), in which
the control unit determines the position of the subcarrier and the number of subcarriers to be the null tones in a range of a null tone candidate position that is determined in the multi-carrier signal in advance.

(3) The communication device according to claim 1, in which
the control unit determines a position of a subcarrier to be a null tone in correspondence with the information.

(3-1) The communication device according to (3), in which
the control unit fixes the number of subcarrier to be a null tone and determines the position of the subcarrier to be the null tone corresponding to the information.

(4) The communication device according to any one of (1) to (3), in which
the control unit changes a subcarrier to be a null tone according to temporal variation of the information.

(5) The communication device according to any one of (1) to (4), in which
the control unit determines a subcarrier to be a null tone in units of a single subcarrier or a plurality of subcarriers.

(6) The communication device according to any one of (1) to (5), in which
the transmission unit sets a same subcarrier as a null tone in each stream when transmitting a plurality of streams.

(7) The communication device according to any one of (1) to (6), in which
the control unit determines a subcarrier to be a null tone according to the information including at least one of a BSS identifier, transmission time information, transmission power information, a flag that identifies uplink communication or downlink communication, or a flag indicating whether or not a packet can be received.

(7-1) The communication device according to (7), in which
the control unit allocates a null tone to a specific subcarrier when the information is transmitted by a null tone.

(8) The communication device according to any one of (1) to (7), in which
the control unit determines a subcarrier to be a null tone according to the information further including a code for detecting or correcting an error in the information transmitted by a null tone.

(9) The communication device according to any one of (1) to (8), in which
the transmission unit inserts a null tone into a subcarrier that is determined to be a null tone after data is applied to each subcarrier.

(10) The communication device according to any one of (1) to (8), in which
the transmission unit replaces a subcarrier determined to be a null tone with a null tone after data is applied to each subcarrier.

(11) A communication method including:
a control step of determining a subcarrier to be a null tone according to information applied to a packet; and
a transmission step of generating a multi-carrier signal in which the determined subcarrier is set as a null tone and wirelessly transmitting the signal.

(12) A communication device including:
a determination unit configured to determine a subcarrier to be allocated to a null tone from a received multi-carrier signal; and
a control unit configured to acquire information on the basis of a null tone determination result by the determination unit.

(13) The communication device according to (12), in which
the control unit further performs packet transmission control on the basis of the acquired information.

(14) The communication device according to (12), in which
the control unit determines whether or not packet transmission by spatial reuse can be performed or adjusts a transmission parameter of the packet on the basis of the acquired information.

(15) The communication device according to any one of (12) to (14), in which
the control unit determines whether or not a packet can be transmitted to a Full Duplex terminal or adjusts a transmission parameter of the packet on the basis of the null tone determination result by the determination unit on a multi-carrier signal received from the Full Duplex terminal.

(16) The communication device according to any one of (12) to (15), in which the control unit acquires the information on the basis of a position of a subcarrier and the number of subcarriers determined to be a null tone by the determination unit.

(17) The communication device according to any one of (12) to (15), in which the control unit acquires the information on the basis of a position of a subcarrier determined to be a null tone by the determination unit.

(17-1) The communication device according to (17), in which in a case where the number of subcarriers to be null tones by the determination unit is other than an expected number, the control unit determines that determination is wrong.

(18) The communication device according to any one of (12) to (17), in which the control unit determines whether or not the information is successfully acquired on the basis of a code for detecting or correcting an error included in the acquired information.

(19) The communication device according to any one of (12) to (18), in which the determination unit determines a subcarrier to be allocated to a null tone on the basis of reception power for each subcarrier.

(20) The communication device according to (19), in which the determination unit determines whether or not a subcarrier is a null tone on the basis of a result of comparison between the reception power of each subcarrier and a first threshold.

(21) The communication device according to (19), in which the determination unit determines a subcarrier having reception power that is higher than a first threshold and is lower than reception power of an adjacent reference tone by a second threshold or more as a null tone.

(22) A communication method including:

a determination step of determining a subcarrier to be allocated to a null tone from a received multi-carrier signal; and a control step of acquiring information on the basis of a null tone determination result by the determination step.

REFERENCE SIGNS LIST

200 Communication device
201 Antenna sharing unit
202 Control unit
203 Data processor
210 Transmission unit
211 OFDM signal generator
212 Analog signal converter
213 RF transmission unit
220 Reception unit
221 RF reception unit
222 Digital signal converter
223 OFDM signal demodulator
224 Null tone detector
301 Encoder
302 Mapping unit
303 Serial/parallel converter
304 Null tone generator
305 Pilot insertion unit
306 Inverse Fourier transform (IFFT) unit
307 Guard interval (GI) insertion unit
308 Parallel/serial converter
501 Time synchronization processor
502 Frequency synchronization processor
503 Guard interval (GI) remover
504 Fast Fourier transform (FFT) unit
505 Channel estimation unit
506 Channel equalizer
507 Phase tracking unit
508 Phase rotation corrector
509 Subcarrier demodulator
510 Decoder
601 Simple time synchronization processor
602 Simple frequency synchronization processor
603 Guard interval (GI) remover
604 Fast Fourier transform (FFT) unit
605 Reception power calculation unit
606 Null tone determination unit
801, 802 Delay device group
803 Multiplier group
804 Adder
805 Delay device
806 Multiplier
807 Peak determination unit
1001 Delay device
1002 Divider
1003 Phase shifter
1004 Frequency converter

The invention claimed is:

1. A communication device comprising:
control circuitry configured to:
upon determining that a received packet is from a basic service set (BSS) not associated with the communication device, determine to perform a spatial reuse (SR) operation in a multi-carrier signal,
wherein the SR operation comprises:
setting a plurality of subcarriers of the multi-carrier signal to be null tones; and
embedding information from the BSS not associated with the communication device in the null tones; and
transmission circuitry configured to:
receive the packet from the BSS not associated with the communication device; and
generate and wirelessly transmit the multi-carrier signal, the multi-carrier signal including:
the information embedded in the null tones, and
other information, for a BSS that is associated with the communication device, in tones of the multi-carrier signal not set to be null tones.

2. The communication device according to claim 1, wherein the control circuitry determines positions of the plurality of subcarriers of the OFDM signal to be the null tones and a number of subcarriers to be the null tones in correspondence with the information applied to the packet.

3. The communication device according to claim 1, wherein a power level of the transmission of the information embedded in the null tones is less than a power level of the transmission of the other information in the tones of the OFDM signal not set to be null tones.

4. The communication device according to claim 1, wherein the control circuitry changes a subcarrier to be a null tone according to temporal variation of information to be embedded in the null tone.

5. The communication device according to claim 1, wherein the transmission of the information embedded in the null tones also includes reference tones having a power level to compensate for frequency selective fading.

6. The communication device according to claim 1, wherein the transmission circuitry sets a same subcarrier as a null tone in each stream when transmitting a plurality of streams.

7. The communication device according to claim 1, wherein the embedded information includes, within a predetermined null tone pattern, each of a BSS identifier, transmission time information, transmission power information, a flag that identifies uplink communication or downlink communication, and a flag indicating whether or not a packet can be received.

8. The communication device according to claim 7, wherein the predetermined null tone pattern further includes a null tone location used for a code for detecting or correcting an error in the embedded information.

9. The communication device according to claim 1, wherein the transmission circuitry determines to perform the SR operation after the other information is determined to be transmitted.

10. The communication device according to claim 1, wherein the other information is transmitted with a predetermined preamble configured to enable preamble detection, while the information embedded in the null tones is transmitted without any predetermined preamble configured to enable preamble detection,
the transmission circuitry replaces a subcarrier determined to be a null tone with a null tone after data is applied to each subcarrier.

11. A communication method performed by a communication device that includes a processor and a transmitter, the method comprising:
receiving a packet;
upon determining that the received packet is from a basic service set (BSS) not associated with the communication device, determining to perform a spatial reuse (SR) operation in multi-carrier signal,
wherein the SR operation comprises:
setting a plurality of subcarriers of the multi-carrier signal to be null tones; and
embedding information from the BSS not associated with the communication device in the null tones; and
generating and wirelessly transmitting a multi-carrier signal, the multi-carrier signal including:
the information embedded in the null tones, and
other information, for a BSS that is associated with the communication device, in tones of the multi-carrier signal not set to be null tones.

12. A communication device comprising:
a receiver configured to receive, from a relay device, a spatial reuse (SR) multi-carrier signal, the SR multi-carrier signal including:
information from a first basic service set (BSS) that is embedded in null tones of the SR multi-carrier signal to be null tones, and
other information from a second BSS located in tones of the SR multi-carrier signal not set to be null tones; and
control circuitry configured to:
detect, via power detection, the information from the first BSS that is embedded in the null tones; and
detect, via preamble detection, the other information from the second BSS that is in the tones of the OFDM signal not set to be null tones.

13. The communication device according to claim 12, wherein the control circuitry is configured to:
further detect the information from the first BSS that is embedded in the null tones based on a corresponding null tone power level analysis; and
further detect the other information from the second BSS that is in the tones of the OFDM signal not set to be null tones based on a corresponding reception power level analysis.

14. The communication device according to claim 12, wherein the embedded information includes, within a predetermined null tone pattern, each of a BSS identifier, transmission time information, transmission power information, a flag that identifies uplink communication or downlink communication, and a flag indicating whether or not a packet can be received.

15. The communication device according to claim 14, wherein the predetermined null tone pattern further includes a null tone location for a code for detecting or correcting an error in the embedded information.

16. The communication device according to claim 13, wherein the null tone power level analysis includes determining a subcarrier having a reception power that is higher than a first threshold and is lower than a reception power of an adjacent reference tone by a second threshold or more as a null tone.

17. A communication method performed by a communication device that includes a processor and a receiver, the method comprising:
receiving, from a relay device, a spatial reuse (SR) multi-carrier signal, the SR multi-carrier signal including:
information from a first basic service set (BSS) that is embedded in null tones of the SR multi-carrier signal to be null tones, and
other information from a second BSS located in tones of the SR multi-carrier signal not set to be null tones; and
detecting, via power detection, the information from the first BSS that is embedded in the null tones; and
detecting, via preamble detection, the other information from the second BSS that is in the tones of the OFDM signal not set to be null tones.

18. The method of claim 17, further comprising:
further detecting the information from the first BSS that is embedded in the null tones based on a corresponding null tone power level analysis; and
further detecting the other information from the second BSS that is in the tones of the OFDM signal not set to be null tones based on a corresponding reception power level analysis.

* * * * *